US009684545B2

(12) United States Patent
Beale

(10) Patent No.: US 9,684,545 B2
(45) Date of Patent: Jun. 20, 2017

(54) DISTRIBUTED AND CONTINUOUS COMPUTING IN A FABRIC ENVIRONMENT

(71) Applicant: Andrew Ward Beale, Mission Viejo, CA (US)

(72) Inventor: Andrew Ward Beale, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 130 days.

(21) Appl. No.: 14/669,351

(22) Filed: Mar. 26, 2015

(65) Prior Publication Data

US 2015/0277974 A1    Oct. 1, 2015

Related U.S. Application Data

(60) Provisional application No. 61/970,575, filed on Mar. 26, 2014.

(51) Int. Cl.
G06F 11/00 (2006.01)
G06F 9/50 (2006.01)
G06F 9/48 (2006.01)
G06F 11/14 (2006.01)
G06F 13/28 (2006.01)
(Continued)

(52) U.S. Cl.
CPC .......... *G06F 9/5088* (2013.01); *G06F 9/4856* (2013.01); *G06F 9/5077* (2013.01); *G06F 11/1464* (2013.01); *G06F 11/1469* (2013.01); *G06F 13/28* (2013.01); *G06F 15/17331* (2013.01); *G06F 17/30091* (2013.01);
(Continued)

(58) Field of Classification Search
CPC .... G06F 9/4856; G06F 9/5077; G06F 9/5088; G06F 11/1458; G06F 11/1464; G06F 11/1469
See application file for complete search history.

(56) References Cited

U.S. PATENT DOCUMENTS 8,539,488 B1 * 9/2013 Havemose .......... G06F 11/1415 718/100
8,880,473 B1 * 11/2014 Havemose ........ G06F 17/30088 707/649

(Continued)

*Primary Examiner* — Michael Maskulinski
(74) *Attorney, Agent, or Firm* — Robert P. Marley

(57) ABSTRACT

Systems and methods for continuous computing are disclosed. One such system includes a plurality of communicatively interconnected computing systems, and a workload including a plurality of tasks executing on a first computing system of the plurality of communicatively interconnected computing systems. The system includes a task management system executing on at least one of the plurality of communicatively interconnected computing systems, the task management component configured to encapsulate a task of the plurality of tasks with a current system state of the first computing system, wherein encapsulating the task includes associating metadata defining an association between the task and resources of the first computing system. The task management system is configured to transfer the encapsulated task to a second computing system among the plurality of communicatively interconnected computing systems for execution, the metadata used to associate the task with resources of a second computing system.

24 Claims, 40 Drawing Sheets

(51) Int. Cl.
*G06F 15/173* (2006.01)
*H04L 29/06* (2006.01)
*G06F 17/30* (2006.01)
*H04L 29/08* (2006.01)

(52) U.S. Cl.
CPC ........ *G06F 17/30203* (2013.01); *H04L 67/42* (2013.01); *G06F 2201/84* (2013.01); *H04L 67/10* (2013.01)

(56) References Cited

U.S. PATENT DOCUMENTS

| | | | |
|---|---|---|---|
| 2011/0047554 A1* | 2/2011 | Lakshmanan | G06F 9/5088 718/105 |
| 2011/0265084 A1* | 10/2011 | Knowles | G06F 9/461 718/1 |
| 2012/0254355 A1* | 10/2012 | Kihara | G06F 9/4856 709/217 |
| 2014/0082630 A1* | 3/2014 | Ginzburg | G06F 15/7807 718/105 |
| 2015/0301848 A1* | 10/2015 | Roehrig | G06F 9/45508 718/1 |
| 2015/0347183 A1* | 12/2015 | Borthakur | G06F 9/5088 718/105 |

* cited by examiner

```
Wrapped Process (Application)

<System SYSTEM />
<SourceProcessor VERSION />

<AppName NAME />
<AppString INSTRUCTION MEMORY />
...
<Stack STACK />
<StackSize SIZE />
<StackAttribs VALUES />
...
<MemSpace NAME />
<MemSize VALUE />
<MemAttribs VALUES />
...
```

DISTRIBUTED AND CONTINUOUS COMPUTING IN A FABRIC ENVIRONMENT

CROSS-REFERENCE TO RELATED APPLICATIONS

The present application claims priority from U.S. Provisional Patent Application No. 61/970,575, filed on Mar. 26, 2014, the disclosure of which is hereby incorporated by reference in its entirety.

TECHNICAL FIELD

The present application relates generally to computing system architectures and distributed computing systems; in particular, the present application relates to a distributed and continuous computing arrangement in a fabric computing system.

BACKGROUND

Computing system hardware and software are both prone to error. Such errors may be due to various causes, for example data corruption, hardware malfunction, or software errors. Such errors may be correctable, meaning that an operating system or executing software can recover from such errors and continue operation, or uncorrectable, in which case the computing system itself is incapable of continuing operation.

To address such errors, owners of such computing systems who require system reliability typically obtain that reliability through some combination of hardware redundancy to ensure availability of a computing system in the event one malfunctions, due to the unlikelihood of concurrent system errors across the redundant hardware systems. However, increasingly, as third-party server computing systems (e.g., cloud computing arrangements) become more relied upon, it becomes more important to be able to rely on such computing resources being available despite not necessarily having control over the full extent of hardware redundancy (which is selected and implemented by an owner of the computing resources).

In addition to error concerns, server systems are often overloaded with workloads over time ad computing needs of an organization change. Again, since increasingly third party providers deliver computing services, customers of such services have less control over the extent to which, and the manner in which, workloads can be transferred among computing systems. Furthermore, even those third party computing providers may implement computing system availability on a system-by-system basis or platform-by-platform basis, which limits their flexibility to allocate tasks across computing systems.

Existing systems that employ distributed and continuous computing concepts, and which do not solely rely in hardware redundancy, utilize computer system virtualization concepts to improve computing flexibility. Computer system virtualization allows multiple operating systems and processes to share the hardware resources of a host computer. Ideally, the system virtualization provides resource isolation so that each operating system does not realize that it is sharing resources with another operating system and does not adversely affect the execution of the other operating system. Such system virtualization enables applications including server consolidation, co-located hosting facilities, distributed web services, applications mobility, secure computing platforms, and other applications that provide for efficient use of underlying hardware resources.

However, existing virtualization systems have drawbacks. Generally, many such systems virtualize an entire operating environment within a specific, allocated partition, and provide little to no access to that operating environment to external software. Accordingly, it can be difficult to migrate workloads to/from such operating environments. Furthermore, existing virtualization systems are typically constructed to provide a substantial disconnection between a structure of an underlying hardware system and the hardware seen by the virtualized software. That is, a virtualization system may host a partition that includes an operating system that sees a processor and a predetermined amount of memory. In such a scenario, that processor, or memory, may be shared with other partitions, such that the partition may only receive a time-divided portion of the overall processing or access time of that resource. For critical software workloads, this represents a substantially sub-optimal scenario, since the partition hosting that critical workload cannot indicate that the workload is critical or otherwise requires some special attention. Furthermore, it may be difficult to, in cases where a workload is not initially critical but becomes so during operation, offload other workloads from the partition hosting that critical workload.

Moving workloads among computing systems introduces numerous challenges, regardless of whether physical or virtualized systems are used. For example, in the case of data storage, a workload may originally be located on the same system where associated files or other data are stored; however, if the workload is migrated to another system and the data is not, the manner in which the data may be accessed typically changes. For example, local data may be accessed via a data bus of an I/O subsystem, while remote data may require access via a communication interface. As such, an operating system of the physical or virtualized subsystem typically would need to be able to handle I/O operations irrespective of a location of the data being retrieved. Furthermore, in cases where only a portion of a workload is offloaded to a different computing system, the workload itself cannot easily be modified to address both local and remote memory access scenarios or local/remote I/O operations. Accordingly, the underlying system, such as the operating system or virtualization system, would need such insight into the portability of the hosted workload. Due to such complexities, portability of workloads is not easily attempted or implemented, particularly in virtualization systems, which can themselves be ported to different systems instead.

For these and other reasons, improvements are desirable.

SUMMARY

In accordance with the following disclosure, the above and other issues are addressed by the following:

In a first aspect, a system for continuous computing are disclosed. The system includes a plurality of communicatively interconnected computing systems, and a workload including a plurality of tasks executing on a first computing system of the plurality of communicatively interconnected computing systems. The system includes a task management system executing on at least one of the plurality of communicatively interconnected computing systems, the task management component configured to encapsulate a task of the plurality of tasks with a current system state of the first computing system, wherein encapsulating the task includes associating metadata defining an association between the task and resources of the first computing system. The task management system is configured to transfer the encapsulated task to a second computing system among the plurality of communicatively interconnected computing systems for execution, the metadata used to associate the task with resources of a second computing system.

In a second aspect, a method of maintaining continuous computing in a fabric of communicatively interconnected computing systems is disclosed. The method includes encapsulating at least one task included in a workload executing on a first computing system of a fabric of communicatively interconnected computing systems with a current system state of the first computing system, the workload including a plurality of tasks, wherein encapsulating the at least one task includes associating metadata defining an association between the task and instructions included in the task, a memory state of the first computing system at a time of execution of the task, and a definition of system features of the first computing system. The method also includes transferring the encapsulated at least one task to a second computing system in the fabric of communicatively interconnected computing systems.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

FIG. 20 illustrates a schematic sample markup language file including a wrapped version of a task or application as captured from a first computing system and which is distributable to a remote computing system within a fabric computing environment, according to an example embodiment;

DETAILED DESCRIPTION

Figure 1:
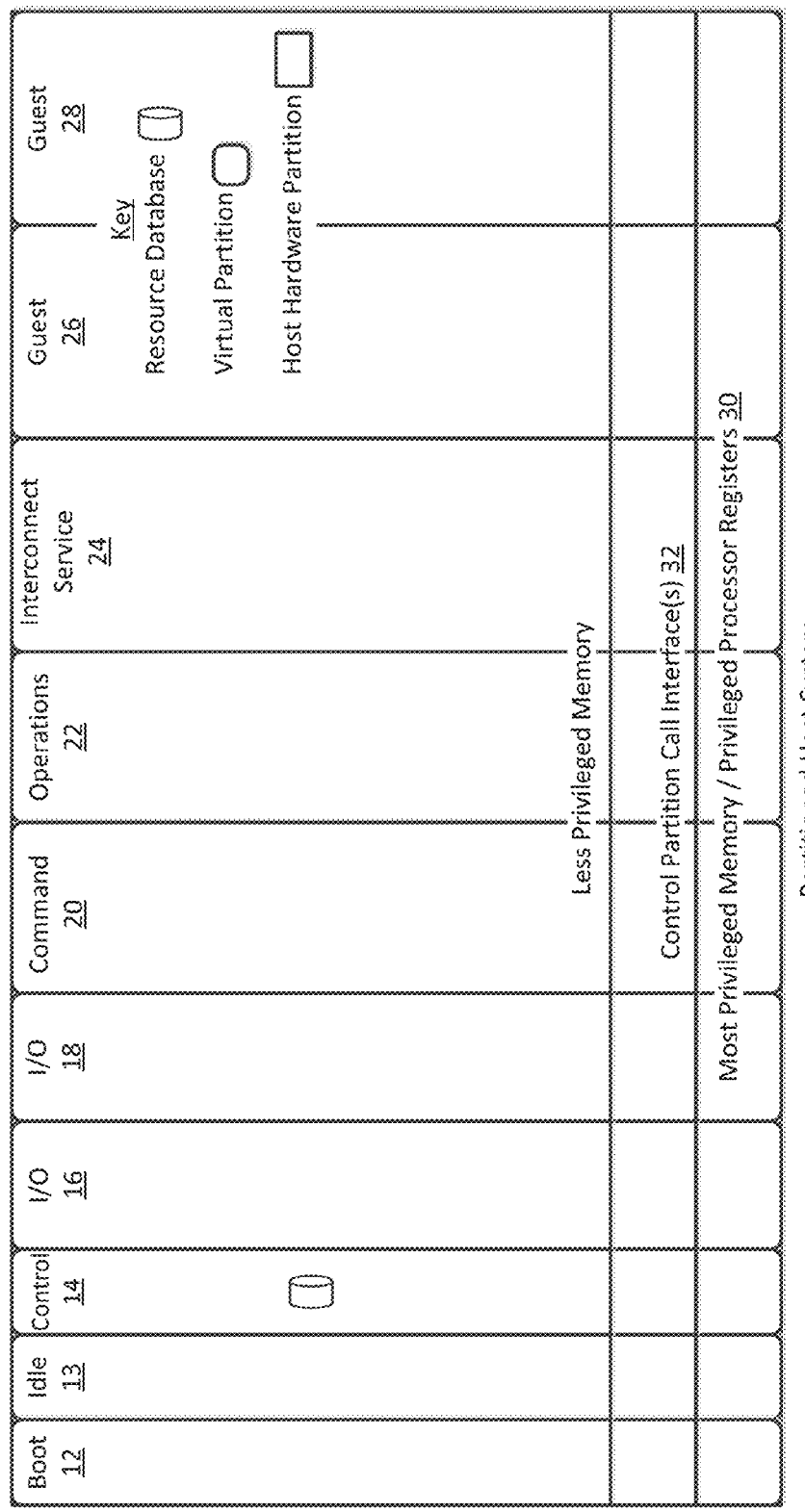
FIG. 1 illustrates system infrastructure partitions in an exemplary embodiment of a host system partitioned using the para-virtualization system of the present disclosure.

Various embodiments of the present invention will be described in detail with reference to the drawings, wherein like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

The logical operations of the various embodiments of the disclosure described herein are implemented as: (1) a sequence of computer implemented steps, operations, or procedures running on a programmable circuit within a computer, and/or (2) a sequence of computer implemented steps, operations, or procedures running on a programmable circuit within a directory system, database, or compiler.

In general the present disclosure relates to methods and systems for distributed and continuous computing within a fabric. In example embodiments discussed herein, specific tasks or procedures can be exchanged among computing systems, thereby allowing for distribution of sub-portions of an executable workload among computing platforms without distributing an entire workload. In some embodiments, a distributable computation unit is distributed alongside a self-contained portion of code, such as a procedure or other section and associated memory that may be affected, such that the resulting package can be executed on a remote system of any type of computing system or architecture. In alternative embodiments, some additional portions of a task can be encapsulated by capturing a system state that includes a state of all resources, wrapped with a descriptor of each resource and including its state or value. Such an encapsulated task can then be transferred to a separate system or platform for execution, where that separate system or platform is capable of reading the wrapped descriptors and executing code in a manner consistent with the system from which the task is offloaded.

In some additional embodiments, file access and other I/O operations are managed as well, in a manner that addresses possible error scenarios and/or file access issues in a fabric computing system. In such embodiments, an I/O operation, such as a file access, can be received by a local I/O manager, such as a dedicated partition. That local partition can manage file access or I/O operations to distinguish between local I/O or other file access operations and remote I/O or file access operations. In some cases, an I/O control block can be generated at the local I/O partition and routed to a remote I/O partition for management and handling, with the results of that I/O operation returned to the original system. Analogous operations can be performed with respect to file access requests; use of such a dedicated partition for managing file access requests allows for use of I/O channels rather than a communication interface to access remote files. Accordingly, remote I/O and/or file access operations can be achieved using low-latency interconnections among partitions on a hardware platform and/or among platforms. Furthermore, in case of error occurrences, such error occurrences can be managed remotely with a status returned regarding whether such errors are correctable; in other words, a remote system can manage error conditions with respect to I/O operations, thereby avoiding a requirement of local management of such I/O or file operations.

In various embodiments discussed herein, the continuous and distributed computing concepts of the present disclosure can be implemented in a multi-partition virtualization system implemented using a plurality of computing platforms, thereby allowing for flexible distribution of virtual systems in partitions allocated among the various platforms. In some instances, one or more physical (hardware-based, non-virtualized) systems can be used as well.

I. Para-Virtualization System Architecture

Referring first to FIGS. 1-8, an example para-virtualization system architecture is described in which the continuous and distributed computing concepts of the present disclosure can be employed. The para-virtualization system of the present disclosure implements a particular arrangement of virtualization software in which dedicated hardware resources of a platform can be allocated to a virtual partition. In the context of the present disclosure, virtualization software generally corresponds to software that executes natively on a computing system, through which non-native software can be executed by hosting that software. In such cases, the virtualization software exposes those native resources in a way that is recognizable to the non-native software. By way of reference, non-native software, otherwise referred to herein as "virtualized software" or a "virtualized system", refers to software not natively executed on a particular hardware system, for example due to it being written for execution by a different type of microprocessor configured to execute a different native instruction set. In some of the examples discussed herein, the native software set can be the x86-32, x86-64, or IA64 instruction set from Intel Corporation of Sunnyvale, Calif., while the non-native or virtualized system might be compiled for execution on an OS2200 system from Unisys Corporation of Blue Bell, Pa. However, it is understood that the principles of the present disclosure are not thereby limited; rather, non-native software simply can correspond to software not hosted or executed directly on hardware resources in the absence of a monitor system used to manage such execution, and to provide an abstraction layer between the application or workload to be executed and the underlying hardware resources.

In the context of the present disclosure, various special-purpose partitions can be established based on the computing requirements of a particular system, including, for example, raw data or database partitions that can be provided as service partitions that can grant access to data by one or more guest partitions or other service partitions. In alternative arrangements, other special-purpose service partitions, such as particular types of data service, network service, or processing service partitions can be established. An interconnect service partition could be hosted on one or more platforms as well, to control communicative access to data across partitions, and intercommunication among partitions. These partitions can be, for example, allocated resources of a host computing system that are customized for the particular resource need of that partition, and according to the anticipated workload to be executed using that partition. Furthermore, the allocated resources can be located across one or more host computing systems. In example embodiments, a data partition can be allocated a large portion of system memory of one or more host computing systems and optionally a database service (e.g., a database management system), thereby allowing for a large-scale database to be maintained entirely in system memory. In alternative embodiments, a single service partition can be focused on particular processing tasks, and can accordingly be assigned a large number of processing cores across one or more host computing systems.

Those skilled in the art will appreciate that use of the virtualization design of the present disclosure provides a robust, failure-tolerant, and flexible system due to the distributed functionality that can be provided across partitions, as well as the various configurations of hardware that can be used to implement the various systems disclosed. Furthermore, based at least in part on the interconnect systems implemented in the para-virtualization system disclosed herein, a low-latency interconnect, and application programming interface, allows for low latency communication among partitions. In example embodiments, partitions co-located on a host can transfer data using direct memory access techniques without requiring additional layers of communication resources, such as may be required in a clustered storage arrangement as may be required in host bus adapters provided by Mellanox Technologies of Sunnyvale, Calif., thereby avoiding TCP/IP or other communications having a high potential latency.

Referring to FIG. 1, an example arrangement of a paravirtualization system is shown that can be used to accomplish the features mentioned above. In some embodiments, the architecture discussed herein uses the principle of least privilege to run code at the lowest practical privilege. To do this, special infrastructure partitions run resource management and physical I/O device drivers. FIG. 1 illustrates system infrastructure partitions on the left and user guest partitions on the right. Host hardware resource management runs as a control application in a special control partition. This control application implements a server for a command channel to accept transactional requests for assignment of resources to partitions. The control application maintains the master in-memory database of the hardware resource allocations. The control application also provides a read only view of individual partitions to the associated partition monitors.

In FIG. 1, partitioned host (hardware) system (or node), shown as host computing system 10, has lesser privileged memory that is divided into distinct partitions including special infrastructure partitions such as boot partition 12, idle partition 13, control partition 14, first and second I/O partitions 16 and 18, command partition 20, operations partition 22, and interconnect service partition 24, as well as virtual guest partitions 26 and 28. As illustrated, the partitions 12-28 do not directly access the underlying privileged memory and processor registers 30 but instead accesses the privileged memory and processor registers 30 via a hypervisor system call interface 32 that provides context switches amongst the partitions 12-28 in a conventional fashion. Unlike conventional VMMs and hypervisors, however, the resource management functions of the partitioned host computing system 10 of FIG. 1 are implemented in the special infrastructure partitions 12-22. Furthermore, rather than requiring re-write of portions of the guest operating system, drivers can be provided in the guest operating system environments that can execute system calls. As explained in further detail in U.S. Pat. No. 7,984,104, assigned to Unisys Corporation of Blue Bell, Pa., these special infrastructure partitions 12-24 control resource management and physical I/O device drivers that are, in turn, used by operating systems operating as guests in the guest partitions 26-28. Of course, many other guest partitions may be implemented in a particular host computing system 10 partitioned in accordance with the techniques of the present disclosure.

A boot partition 12 contains the host boot firmware and functions to initially load the control, I/O and command partitions (elements 14-20). Once launched, the resource management "control" partition 14 includes minimal firmware that tracks resource usage using a tracking application referred to herein as a control or resource management application. Host resource management decisions are performed in command partition 20 and distributed decisions amongst partitions in one or more host computing systems 10 are managed by operations partition 22. I/O to disk drives and the like is controlled by one or both of I/O partitions 16 and 18 so as to provide both failover and load balancing capabilities. Operating systems in the guest partitions 24, 26, and 28 communicate with the I/O partitions 16 and 18 via memory channels (FIG. 3) established by the control partition 14. The partitions communicate only via the memory channels. Hardware I/O resources are allocated only to the I/O partitions 16, 18. In the configuration of FIG. 1, the hypervisor system call interface 32 is essentially reduced to context switching and containment elements (monitors) for the respective partitions.

Figure 2:
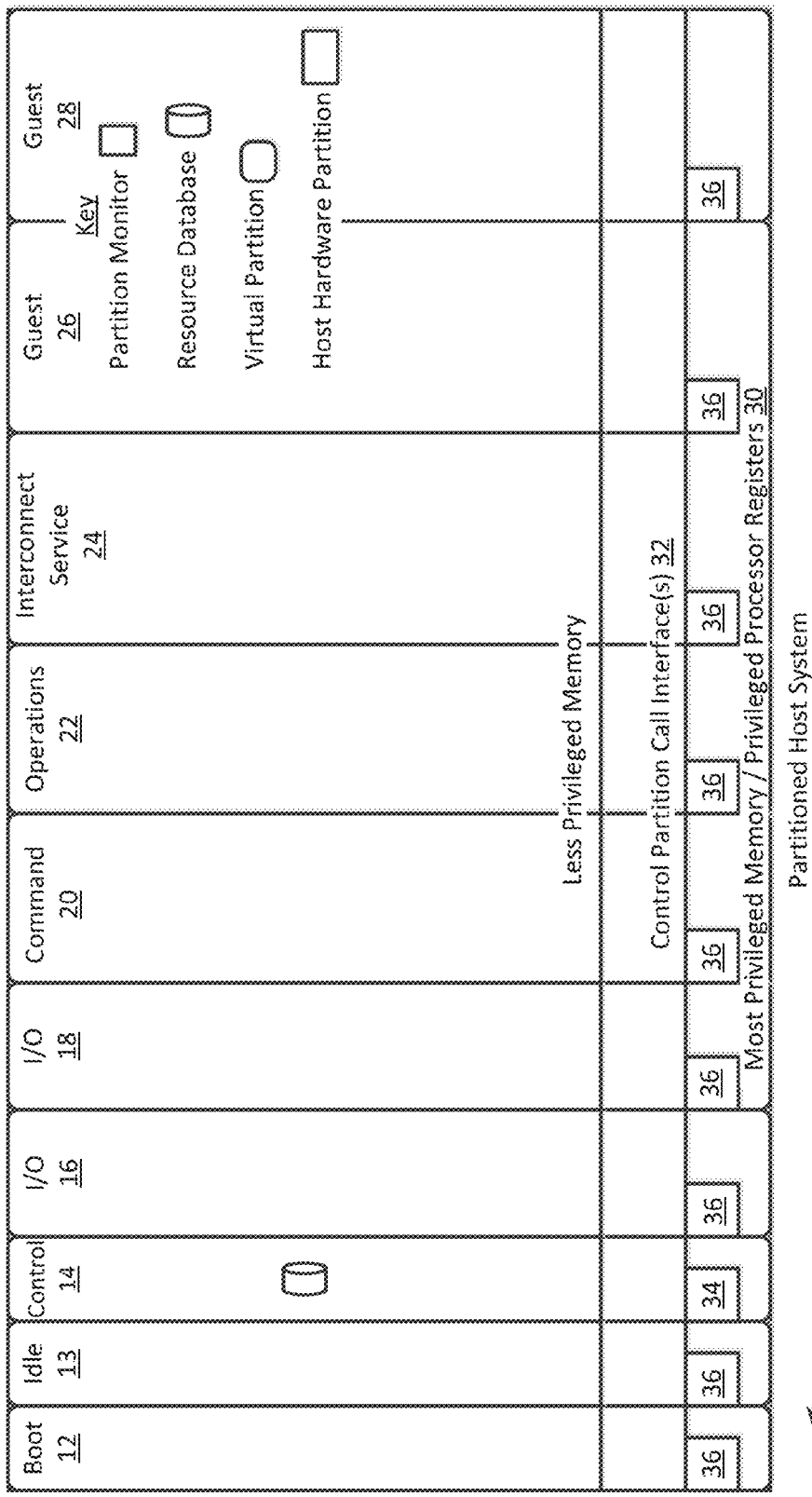
FIG. 2 illustrates the partitioned host of FIG. 1 and the associated partition monitors of each partition.
Figure 3:
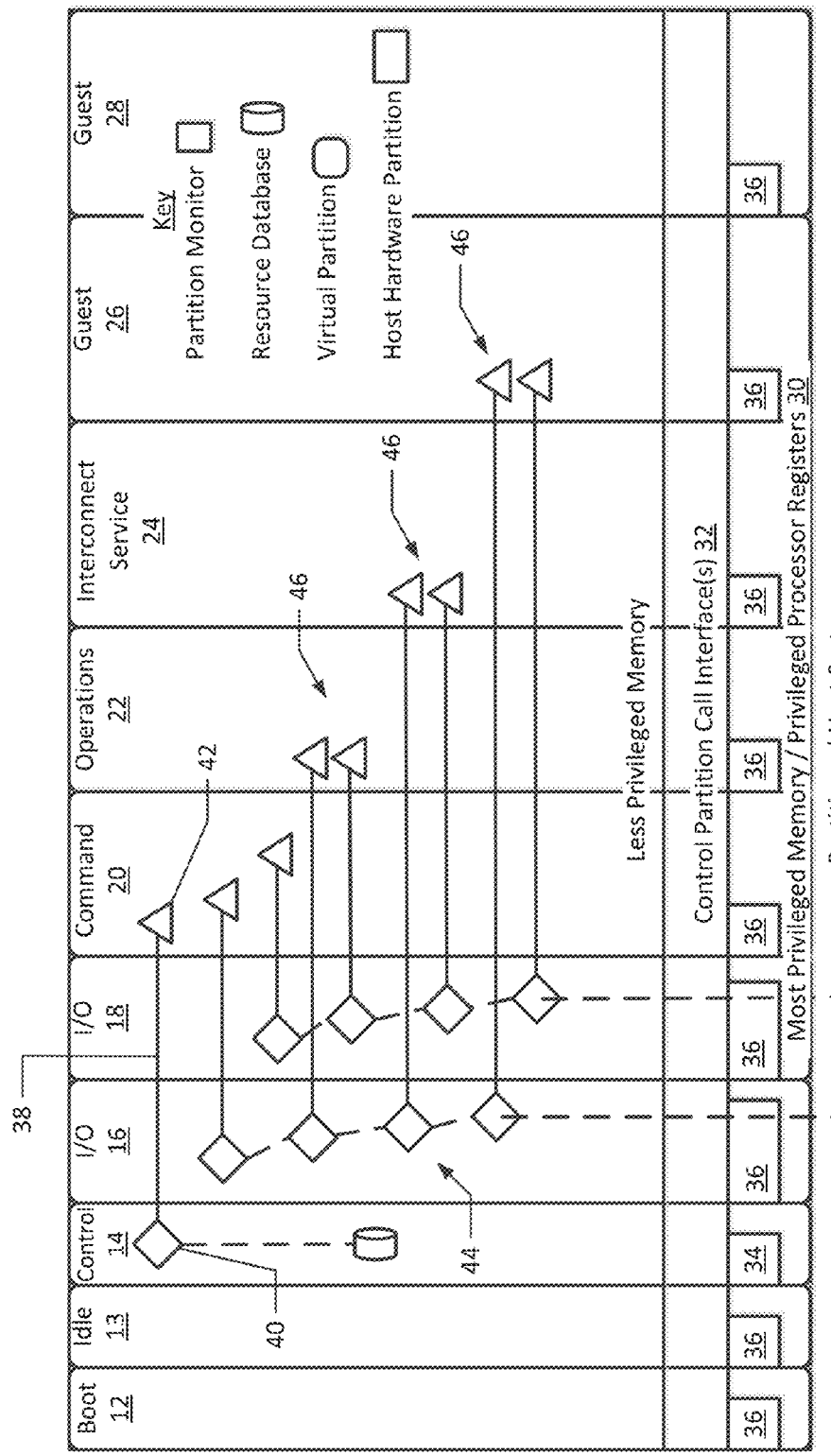
FIG. 3 illustrates memory mapped communication channels amongst various partitions of the para-virtualization system of FIG. 1.

The resource manager application of the control partition 14, shown as application 40 in FIG. 3, manages a resource database 33 that keeps track of assignment of resources to partitions and further serves a command channel 38 to accept transactional requests for assignment of the resources to respective partitions. As illustrated in FIG. 2, control partition 14 also includes a partition (lead) monitor 34 that is similar to a virtual machine monitor (VMM) except that it provides individual read-only views of the resource database in the control partition 14 to associated partition monitors 36 of each partition. Thus, unlike conventional VMMs, each partition has its own monitor 36 such that failure of the monitor 36 does not bring down the entire host computing system 10. As will be explained below, the guest operating systems in the respective partitions 26, 28 (referred to herein as "guest partitions") are modified to access the associated partition monitors 36 that implement together with hypervisor system call interface 32 a communications mechanism through which the control, I/O, and any other special infrastructure partitions 14-24 may initiate communications with each other and with the respective guest partitions.

The partition monitors 36 in each partition constrain the guest OS and its applications to the assigned resources. Each monitor 36 implements a system call interface 32 that is used by the guest OS of its partition to request usage of allocated resources. The system call interface 32 includes protection exceptions that occur when the guest OS attempts to use privileged processor op-codes. Different partitions can use different monitors 36. This allows support of multiple system call interfaces 32 and for these standards to evolve over time. It also allows independent upgrade of monitor components in different partitions.

The monitor 36 is preferably aware of processor capabilities so that it may be optimized to utilize any available processor virtualization support. With appropriate monitor 36 and processor support, a guest OS in a guest partition (e.g., 26, 28) need not be aware of the control system of the invention and need not make any explicit 'system' calls to the monitor 36. In this case, processor virtualization interrupts provide the necessary and sufficient system call interface 32. However, to optimize performance, explicit calls from a guest OS to a monitor system call interface 32 are still desirable.

The monitor 36 also maintains a map of resources allocated to the partition it monitors and ensures that the guest OS (and applications) in its partition use only the allocated hardware resources. The monitor 36 can do this since it is the first code running in the partition at the processor's most privileged level. The monitor 36 boots the partition firmware at a decreased privilege. The firmware subsequently boots the OS and applications. Normal processor protection mechanisms prevent the firmware, OS, and applications from ever obtaining the processor's most privileged protection level.

Unlike a conventional VMM, a monitor 36 has no I/O interfaces. All I/O is performed by I/O hardware mapped to I/O partitions 16, 18 that use memory channels to communicate with their client partitions. A responsibility of a monitor 36 is instead to protect processor provided resources (e.g., processor privileged functions and memory management units). The monitor 36 also protects access to I/O hardware primarily through protection of memory mapped I/O. The monitor 36 further provides channel endpoint capabilities which are the basis for I/O capabilities between guest partitions.

The monitor 34 for the control partition 14 is a "lead" monitor with two special roles. It creates and destroys monitors 36, and also provides services to the created monitors 36 to aid processor context switches. During a processor context switch, monitors 34, 36 save the guest partition state in the virtual processor structure, save the privileged state in virtual processor structure and then invoke the control monitor switch service. This service loads the privileged state of the target partition monitor and switches to the target partition monitor which then restores the remainder of the guest partition state.

The most privileged processor level (e.g., x86 ring 0) is retained by having the monitors 34, 36 running below the system call interface 32. This is most effective if the processor implements at least three distinct protection levels: e.g., x86 ring 1, 2, and 3 available to the guest OS and applications. The control partition 14 connects to the monitors 34, 36 at the base (most privileged level) of each partition. The monitor 34 grants itself read only access to the partition descriptor in the control partition 14, and the control partition 14 has read only access to one page of monitor state stored in the resource database 33.

Those skilled in the art will appreciate that the monitors 34, 36 of the invention are similar to a classic VMM in that they constrain the partition to its assigned resources, interrupt handlers provide protection exceptions that emulate privileged behaviors as necessary, and system call interfaces are implemented for "aware" contained system code. However, as explained in further detail below, the monitors 34, 36 of the invention are unlike a classic VMM in that the master resource database 33 is contained in a virtual (control) partition for recoverability, the resource database 33 implements a simple transaction mechanism, and the virtualized system is constructed from a collection of cooperating monitors 34, 36 whereby a failure in one monitor 34, 36 need not result in failure of all partitions and need not result in the failure of a multiprocessor/multi-core partition; in particular, any symmetric multiprocessing system can, due to use of a monitor per execution core, preserve operation of the partition using remaining execution cores. Furthermore, failure of a single physical processing unit need not result in failure of all partitions of a system, since partitions are affiliated with different processing units.

The monitors 34, 36 of the invention are also different from classic VMMs in that each partition is contained by its assigned monitor(s), partitions with simpler containment requirements can use simpler and thus more reliable (and higher security) monitor implementations, and the monitor implementations for different partitions may, but need not be, shared. Also, unlike conventional VMMs, a lead monitor 34 provides access by other monitors 36 to the control partition resource database 33.

Partitions in the control environment include the available resources organized by host computing system 10. Available computing resources in a host node, also referred to herein as a host computing system are described by way of example in FIGS. 4-5. Generally, a partition is a software construct (that may be partially hardware assisted) that allows a hardware system platform (or hardware partition) to be "partitioned," or separated, into independent operating environments. The degree of hardware assist (e.g., physical hardware separation) is platform dependent but by definition is less than 100% (since by definition a 100% hardware assist provides hardware partitions). The hardware assist may be provided by the processor or other platform hardware features. For example, each partition may be associated with a separate processing core or cores, but may each be associated with a separate portion of the same system memory, networking resources, or other features. Or, partitions may time-share processing resources, but be associated with separate memory, networking, and/or peripheral devices. In general from the perspective of the control partition 14, a hardware partition is generally indistinguishable from a commodity hardware platform without partitioning hardware.

Unused physical processors are assigned to a special 'Idle' partition 13. The idle partition 13 is the simplest partition that is assigned processor resources. It contains a virtual processor for each available physical processor, and each virtual processor executes an idle loop that contains appropriate processor instructions to minimize processor power usage. The idle virtual processors may cede time at the next control time quantum interrupt, and the monitor 36 of the idle partition 13 may switch processor context to a virtual processor in a different partition. During host bootstrap, the boot processor of the boot partition 12 boots all of the other processors into the idle partition 13.

In some embodiments, multiple control partitions 14 are also possible for large host partitions to avoid a single point of failure. Each would be responsible for resources of the appropriate portion of the host computing system 10. Resource service allocations would be partitioned in each portion of the host system 10. This allows clusters to run within a host computing system 10 (one cluster node in each zone) and still survive failure of a control partition 14.

As illustrated in FIGS. 1-3, each page of memory in a control partition-enabled host computing system 10 is owned by one of its partitions. Additionally, each hardware I/O device is mapped to one of the designated I/O partitions 16, 18. These I/O partitions 16, 18 (typically two for redundancy) run special software that allows the I/O partitions 16, 18 to run the I/O channel server applications for sharing the I/O hardware. Alternatively, for I/O partitions executing using a processor implementing Intel's VT-d technology, devices can be assigned directly to non-I/O partitions. Irrespective of the manner of association, such channel server applications include Virtual Ethernet switch (provides channel server endpoints for network channels) and virtual storage switch (provides channel server endpoints for storage channels). Unused memory and I/O resources are owned by a special 'Available' pseudo partition (not shown in figures). One such "Available" pseudo partition per node of host computing system 10 owns all resources available for allocation, and as such is tracked by resource database 33.

In the embodiments discussed herein, control partition 14 concentrates on server input/output requirements. Plug and Play operating systems function with appropriate virtual port/miniport drivers installed as boot time drivers. The hypervisor system call interface 32 may, in some embodiments, include an Extensible Firmware Interface (EFI) to provide a modern maintainable firmware environment that is used as the basis for the virtual firmware. The firmware provides standard mechanisms to access virtual Advanced Configuration and Power Interface (ACPI) tables. These tables allow operating systems to use standard mechanisms to discover and interact with the virtual hardware.

The boot partition 12 may provide certain Basic Input/ Output System (BIOS) compatibility drivers if and when necessary to enable boot of operating systems that lack EFI loaders. The boot partition 12 also may provide limited support for these operating systems.

Different partitions may use different firmware implementations or different firmware versions. The firmware identified by partition policy is loaded when the partition is activated. During an upgrade of the monitor associated with the control partition, running partitions continue to use the loaded firmware, and may switch to a new version as determined by the effective partition policy the next time the partition is reactivated.

As noted above, monitors 36 provide enforcement of isolation from other partitions. The monitors 36 run at the most privileged processor level, and each partition has one or more monitors mapped into privileged address space. Each monitor 36 uses protection exceptions as necessary to monitor software within the virtual partition and to thwart any (inadvertent) attempt to reference resources not assigned to the associated virtual partition. Each monitor 36 constrains the guest OS and applications in the guest partitions 26, 28, and the lead monitor 34 constrains the resource management application in the control partition 14 and uses its access and special hypervisor system call interface 32 with the resource management application to communicate individual partition resource lists with the associated partition monitors 36.

According to some embodiments, there are two main categories of partitions in the virtualization system of the present disclosure. The 'user' partitions run guest operating systems for customer applications, and the system infrastructure partitions provide various platform infrastructure services. For reliability, the virtualization system architecture minimizes any implementation that is not contained within a partition, since a failure in one partition can be contained and need not impact other partitions.

As will be explained in more detail below, system partition, or service partition, types can include:
Boot 12
Idle 13
Control 14
Command 20
Operations 22
I/O 16, 18
Interconnect 24
Each of these types is briefly discussed below.

Boot Partition 12

The boot partition 12 has assigned thereto one virtual CPU (corresponding to a physical processing core or a fractional/timeshared part thereof), and contains the hardware partition boot firmware. It is used during recovery operations when necessary to boot and reboot the command partition 20 and the I/O partitions 16, 18. During bootstrap, the boot partition 12 reserves available memory and constructs the control partition 14 and the initial resource map in resource database 33 with all memory assigned either to the boot partition 12, the control partition 14, or the 'available' partition. The boot partition 12 initiates transactions to the resource manager application until it has also booted the command partition 20. At this point the control partition 14 is attached to the command partition 20 and accepts only its command transactions. The boot partition boot processor also initializes all additional processors to run the idle partition 13.

Idle Partition 13

In example embodiments, the idle partition 13 has one virtual CPU for each physical CPU. These virtual CPUs are used as place holders in the system's CPU schedule. If the control partition 14 or partition monitor 34 error recovery must remove a CPU/partition from the schedule, it is replaced with a reference to one of these virtual CPUs. Idle processors 'run' in the idle partition 13, rather than the control partition 14, to reduce the scope of error recovery should a hardware error occur while a hardware processor is idle. In actuality, the idle partition suspends a processor (to reduce power and cooling load) until the next virtual quantum interrupt. In typical scenarios, processors can be idle a significant fraction of time. The idle time is the current shared processor headroom in the hardware partition.

Control Partition 14

The control partition 14 owns the memory that contains the resource database 33 that stores the resource allocation maps. This includes the 'fractal' map for memory, the processor schedule, and mapped I/O hardware devices. For Peripheral Component Interconnect (PCI) I/O hardware, this map would allocate individual PCI devices, rather than require I/O partitions 16, 18 to enumerate a PCI bus. Different devices on the same PCI bus can be assigned to different I/O partitions 16, 18. A resource allocation application in the control partition 14 tracks the resources, applies transactions to the resource database 33, and is also the server for the command and control channels. The resource allocation application runs in the control partition 14 with a minimal operating environment. All state changes for the resource manager application are performed as transactions. If a processor error occurs when one of its virtual CPUs is active, any partial transactions can be rolled back. The hypervisor system call interface 32, which is responsible for virtual processor context switches and delivery of physical and virtual interrupts, does not write to the master resource maps managed by the application. It constrains itself to memory writes of memory associated with individual partitions and read only of the master resource maps in the resource database 33.

It is noted that, when multiple control partitions 14 are used, an associated command partition 20 is provided for each. This allows the resource database 33 of a large host to be (literally) partitioned and limits the size of the largest virtual partition in the host while reducing the impact of failure of an control partition 14. Multiple control partitions 14 are recommended for (very) large host partitions, or anytime a partitioned virtualized system can contain the largest virtual partition.

Command Partition 20

In example embodiments, the command partition 20 owns the resource allocation policy for each hardware partition 10. The operating environment is, for example, XP embedded which provides a .NET Framework execution environment. Another possibility is, for example, Windows CE and the .NET Compact Framework.

The command partition 20 maintains a synchronized snapshot of the resource allocation map managed by the resource management application, and all changes to the map are transactions coordinated through the command channel 38 (FIG. 3) with the control partition 14. The resource management application implements the command channel 38 to accept transactions only from the command partition 20.

It is noted that in a multiple host hardware partition environment, a stub command partition 20 in each host 10 could simply run in the EFI environment and use an EFI application to pipe a command channel 38 from the control partition 14, through a network, to a shared remote command partition 20. However, this would have an impact on both reliability and recovery times, while providing only a modest cost advantage. Multiple command partitions 20 configured for failover are also possible, especially when multiple control partitions 14 are present. Restart of a command partition 20 occurs while other partitions remain operating with current resource assignments.

In accordance with the present disclosure, only a resource service in the command partition 20 makes requests of the resource manager application in the control partition 14. This allows actual allocations to be controlled by policy. Agents representing the partitions (and domains, as described below) participate to make the actual policy decisions. The policy service provides a mechanism for autonomous management of the virtual partitions. Standard and custom agents negotiate and cooperate on the use of physical computing resources, such as processor scheduling and memory assignments, in one or more physical host partitions. There are two cooperating services. The partition resource service is an application in the command partition 20 that is tightly coupled with the control resource manager application and provides services to a higher level policy service that runs in the operations partition 22 (described below) and is tightly coupled with (i.e. implements) a persistent partition configuration database, and is a client of the resource service. The resource service also provides monitoring services for the presentation tier. The partition resource objects are tightly controlled (e.g. administrators cannot install resource agents) since the system responsiveness and reliability partially depends on them. A catastrophic failure in one of these objects impacts responsiveness while the server is restarted. Recurring catastrophic failures can prevent changes to the resource allocation.

Operations Partition 22

In some embodiments, the operations partition 22 owns the configuration policy for the domains in one or more host computing systems 10. The operations partition 22 is also where a data center operations (policy) service runs. As will be explained below, at least one host computing system 10 in a given virtual data center will have an operations partition 22. Not all host computing systems 10 run an operations partition 22. An operations partition 22 may be provided by multiple hosts in a virtual data center for load balancing and failover. The operations partition 22 does not need to run within a given hardware partition, and need not run as a virtual partition. The operating environment within the operations partition 22 can be, for example, MICROSOFT WINDOWS XP Professional or Windows Server, or analogous operating environments. This partition (cluster) can be shared across multiple hardware partitions. The configuration policy objects and ASP.NET user interface components run in the operations partition 22. These components can share a virtual partition with the command partition 20 to reduce cost for single host deployments.

For availability reasons, customization of partition resource agents is discouraged in favor of customization of policy agents. This is because a failure in a policy agent has less impact than a resource agent to the availability and responsiveness of the resource mechanisms. The policy agents make requests of the standard resource agents. The standard policy agents can also be extended with custom implementations. In simple single hardware partition installations, the services of the operations partition 22 can be hosted in the command partition 20.

The partition definition/configuration objects are intended to be a purpose of customization. The partition policy objects are clients of the resource objects. The policy service provides configuration services for the presentation tier.

The operations partition user interface components are typically integrated within the operations partition 22. An exemplary implementation may use Hypertext Markup Language (HTML) Version 4, CSS, and Jscript. The operations partition user interface is principally a web interface implemented by an ASP.NET application that interacts with the policy service. The user interface interacts directly with the Partition Policy Service and indirectly with a partition database of the operations partition 22.

A .NET smart client may also be provided in the operations partition 22 to provide a rich client interface that may interact directly with the policy and resource services to present a rich view of current (enterprise) computing resources.

A resource service in the command partition 20 selects appropriate resources and creates a transaction to assign the resources to new partitions. The transaction is sent to the control partition 14 which saves transaction request to un-cached memory as a transaction audit log entry (with before and after images). The transaction is validated and applied to the resource database 33.

An audit log tracks changes due to transactions since the last time the resource database 33 was backed up (flushed to memory), thereby allowing transactions to be rolled back without requiring the resource database 33 to be frequently flushed to memory. The successful transactions stored in the audit log since the last resource database 33 backup may be reapplied from the audit log to restart a failed partition. A resource also may be recovered that has been reserved by a completed transaction. A transaction that has not completed has reserved no resource. The audit log may be used by the resource allocation software to rollback any partially completed transaction that survived the cache. It should be noted that a transaction that has not completed would have assigned some but not all resources specified in a transaction to a partition and the rollback would undo that assignment if it survived the cache.

I/O Partitions 16, 18

In the embodiment shown, a plurality of I/O partitions 16, 18 are active on a host node 10. I/O partitions 16, 18 allow multi-path I/O from the user partitions 26-28 and allow certain types of failures in an I/O partition 16, 18 to be recovered transparently. All I/O hardware in host hardware partitions is mapped to the IVO partitions 16, 18. These partitions are typically allocated a dedicated processor to minimize latency and allow interrupt affinity with limited overhead to pend interrupts that could occur when the I/O partition 16, 18 is not the current context. The configuration for the I/O partitions 16, 18 determines whether the storage, network, and console components share virtual partitions or run in separate virtual partitions.

Interconnect Service Partition 24

The interconnect service partition 24 coordinates interpartition communication in conjunction with the control partition 14 and the command partition 20. Generally, and as discussed in further detail below, the interconnect service partition 24 defines and enforces policies relating to intercommunication of partitions defined in the command partition, and publishes an application programming interface (API) that acts as a command-based interconnect that provides the various guest partitions and I/O partitions 16, 18 intercommunication capabilities.

In some embodiments, the interconnect service partition 24 defines one or more security policies for each of the partitions included on all platforms, including the platform on which it resides. The interconnect service partition 24 implements permissions defined in such security policies to ensure that partitions intercommunicate only with those other partitions to which they are allowed to communicate. To that end, and as discussed in further detail below, the interconnect service partition 24 can define one or more security zones, each of which defining a "virtual fabric" of platforms capable of intercommunication. As such, each security zone represents a virtual network of interconnected partitions. Each virtual network defined by the interconnect service partition 24 can be configured such that partitions within the virtual fabric can intercommunicate, but partitions not included within that virtual fabric are incapable of communicating with member partitions (e.g., unless both of those partitions are part of a different virtual fabric). By defining a plurality of virtual fabrics within each system, partitions are by default untrusted, or closed, rather than trusted, or open. That is, in the absence of defined virtual fabrics, the partitions are assumed able to intercommunicate. However, with defined virtual fabrics, only those partitions defined as part of a common virtual fabric will intercommunicate, with partitions otherwise, by default, unable to communicate.

In some embodiments, the interconnect service partition 24 defines virtual fabrics by implementing a naming and security software system in which virtual fabrics are assigned a common encryption standard, including shared keys, key updates, and key management. In some embodiments, the interconnect service partition 24 implements a DNSSEC protocol for securing information provided by each of the partitions of a virtual fabric. In such embodiments, the Domain Name Service (DNS) can be used for naming each partition in an overall system including a plurality of platforms and partitions, and can define various security zones as each having a different virtual fabric. Use of DNSSEC allows for partitions to be named by a specific partition, and supports, among other features, security key and virtual fabric management, failover definitions (e.g., use of a master/slave or collective arrangement), and redundant naming services (at different interconnect service partitions 24 on the same platform or different platforms).

In addition, the interconnect service partition 24 defines one or more rights assignable to each virtual fabric by way of the security policy, thereby allowing each virtual fabric to have assigned a variety of types of rights or services to each partition or virtual fabric. As further discussed below, virtual fabrics including one or more guest partitions 26, 28 can be constructed in which a particular quality of service (e.g., reliability, uptime, or dedicated levels of processing and/or memory and/or bandwidth resources) is associated with a particular virtual fabric. To ensure such service uptime, one or more different or redundant partitions can be dynamically added to or subtracted from the virtual fabric.

In some embodiments, the interconnect service partition 24 provides a management application made available by web access to an application executing in that partition, allowing a user to allocate various partitions to virtual fabrics. However, policies, including security zones and quality of service policies for the various zones, can be implemented by either the security partition or by a control partition 14 to which the policy is published, and which acts to enforce that policy. In some embodiments, the interconnect service partition 24 may be entirely eliminated and/or subsumed into the control partition 14, depending on the needs and processing requirements of a particular platform. In such cases where the control partition 14 manages or enforces security policies set, the control partition 14 can equivalently be referred to as the interconnect service partition.

User Partitions 26-28

The user partitions 26, 28 host the workloads that form the purpose of the virtualization system, and are described in normal domains for a user. These are the partitions that a user primarily interacts with. All of the other partition types are described in the system domains and are generally kept out of view of typical users.

Such user partitions 26, 28 as described below host one or more tasks that can be distributed among those partitions, which themselves may be allocated across the same or different physical platforms. In examples discussed below, the tasks hosted by the user partitions 26, 28 can correspond to storage management tasks, or other workloads, which may require file access or I/O operations, or may alternatively include portions that are entirely memory bound. Accordingly, in some embodiments, tasks may be exchanged among the user partitions 26, 28 to implement load-balancing or other features.

It is of course noted that, in some cases discussed below, user partitions 26, 28, and indeed virtualization system overall may not be needed, but rather such continuous computing features may be implemented using hardware platforms. Where such arrangements are possible, it is noted as such.

System Startup

Referring to operation of the virtualization systems discussed herein, startup of such a system is first described, in connection with the present disclosure, which provides redundancy and flexibility with respect to the partitions or platforms to which computing tasks are assigned. In particular, when the host computing system 10 is booted, the EFI firmware is loaded first. The EFI firmware boots the operating system associated with the control partition 14. The EFI firmware uses a standard mechanism to pick the boot target. Assuming the loader is configured and selected, boot proceeds as follows.

The loader allocates almost all of available memory to prevent its use by the firmware. (It leaves a small pool to allow proper operation of the firmware.) The loader then creates the resource database's memory data structures in the allocated memory (which includes a boot command channel predefined in these initial data structures). The loader then uses the EFI executable image loader to load the control monitor 34 and monitoring application into the control partition 14. The loader also jacks the boot monitor underneath the boot partition 12 at some point before the boot loader is finished.

The loader then creates transactions to create the I/O partition 16 and command partition 20. These special boot partitions are loaded from special replicas of the master partition definitions. The command partition 20 updates these replicas as necessary. The boot loader loads the monitor, and firmware into the new partitions. At this point, the boot loader transfers boot path hardware ownership from the boot firmware to the I/O partition 16. The I/O partition 16 begins running and is ready to process I/O requests.

The loader creates transactions to create a storage channel from the command partition 20 to an I/O partition 16, and a command channel 38 from the command partition 20 to the control partition 14. At this point the boot loader sends a final command to the control partition 14 to relinquish the command channel 38 and pass control to the command partition 20. The command partition 20 begins running and is ready to initialize the resource service.

The command partition operating environment is loaded from the boot volume through the boot storage channel path. The operating environment loads the command partition's resource service application. The resource service takes ownership of the command channel 38 and obtains a snapshot of the resources from the control partition's resource database 33.

A fragment of the policy service is also running in the command partition 20. This fragment contains a replica of the infrastructure partitions assigned to this host. The policy service connects to the resource service and requests that the 'boot' partitions are started first. The resource service identifies the already running partitions. By this time, the virtual boot partition 12 is isolated and no longer running at the most privileged processor level. The virtual boot partition 12 can now connect to the I/O partition 16 as preparation to reboot the command partition 20. If all I/O partitions should fail, the virtual boot partition 12 also can connect to the control partition 14 and re-obtain the boot storage hardware. This is used to reboot the first I/O partition 16.

The boot partition 12 remains running to reboot the I/O and command partitions 16, 20 should they fail during operation. The control partition 14 implements watchdog timers to detect failures in these (as well as any other) partitions. The policy service then activates other infrastructure partitions as dictated by the current policy. This would typically start the redundant I/O partition 18.

If the present host computing system 10 is a host of an operations partition 22, operations partition 22 is also started at this time. The command partition 20 then listens for requests from the distributed operations partitions. As will be explained below, the operations partition 22 connects to command partitions 20 in this and other hosts through a network channel and network zone. In a simple single host implementation, an internal network can be used for this connection. At this point, the distributed operations partitions 22 start the remaining partitions as the current policy dictates.

All available (not allocated) memory resources are owned by the special 'available' partition. In the example of FIGS. 1 and 2, the available partition is size is zero and thus is not visible.

Referring to FIG. 3, virtual channels are the mechanism partitions use in accordance with the invention to connect to zones and to provide fast, safe, recoverable communications amongst the partitions. For example, virtual channels provide a mechanism for general I/O and special purpose client/server data communication between guest partitions 26, 28 and the I/O partitions 16, 18 in the same host. Each virtual channel provides a command and I/O queue (e.g., a page of shared memory) between two partitions. The memory for a channel is allocated and 'owned' by the guest partition 26, 28. These queues are discussed in further detail below in connection with the interconnect Application Programming Interface (API) as illustrated in FIGS. 6-9. The control partition 14 maps the channel portion of client memory into the virtual memory space of the attached server partition. The control application tracks channels with active servers to protect memory during teardown of the owner guest partition until after the server partition is disconnected from each channel. Virtual channels can be used for command, control, and boot mechanisms as well as for traditional network and storage I/O.

As shown in FIG. 3, the control partition 14 has a channel server 40 that communicates with a channel client 42 of the command partition 20 to create the command channel 38. The I/O partitions 16, 18 also include channel servers 44 for each of the virtual devices accessible by channel clients 46, such as in the operations partition 22, interconnect service partition 24, and one or all guest partitions 26, 28. Within each guest virtual partition 26, 28, a channel bus driver enumerates the virtual devices, where each virtual device is a client of a virtual channel. The dotted lines in I/O partition 16 represent the interconnects of memory channels from the command partition 20 and operations partitions 22 to the virtual Ethernet switch in the I/O partition 16 that may also provide a physical connection to the appropriate network zone. The dotted lines in I/O partition 18 represent the interconnections to a virtual storage switch. Redundant connections to the virtual Ethernet switch and virtual storage switches are not shown in FIG. 3. A dotted line in the control partition 14 from the command channel server 40 to the transactional resource database 33 shows the command channel connection to the transactional resource database 33.

A firmware channel bus (not shown) enumerates virtual boot devices. A separate bus driver tailored to the operating system enumerates these boot devices as well as runtime only devices. Except for I/O virtual partitions 16, 18, no PCI bus is present in the virtual partitions. This reduces complexity and increases the reliability of all other virtual partitions.

Virtual device drivers manage each virtual device. Virtual firmware implementations are provided for the boot devices, and operating system drivers are provided for runtime devices. The device drivers convert device requests into channel commands appropriate for the virtual device type.

Additional details regarding possible implementation details of a partitioned, para-virtualization system, including discussion of multiple are discussed in U.S. Pat. No. 7,984, 104, assigned to Unisys Corporation of Blue Bell, Pa., the disclosure of which is hereby incorporated by reference in its entirety.

II. Structures for Establishing Low-Latency Interconnect

Figure 4:
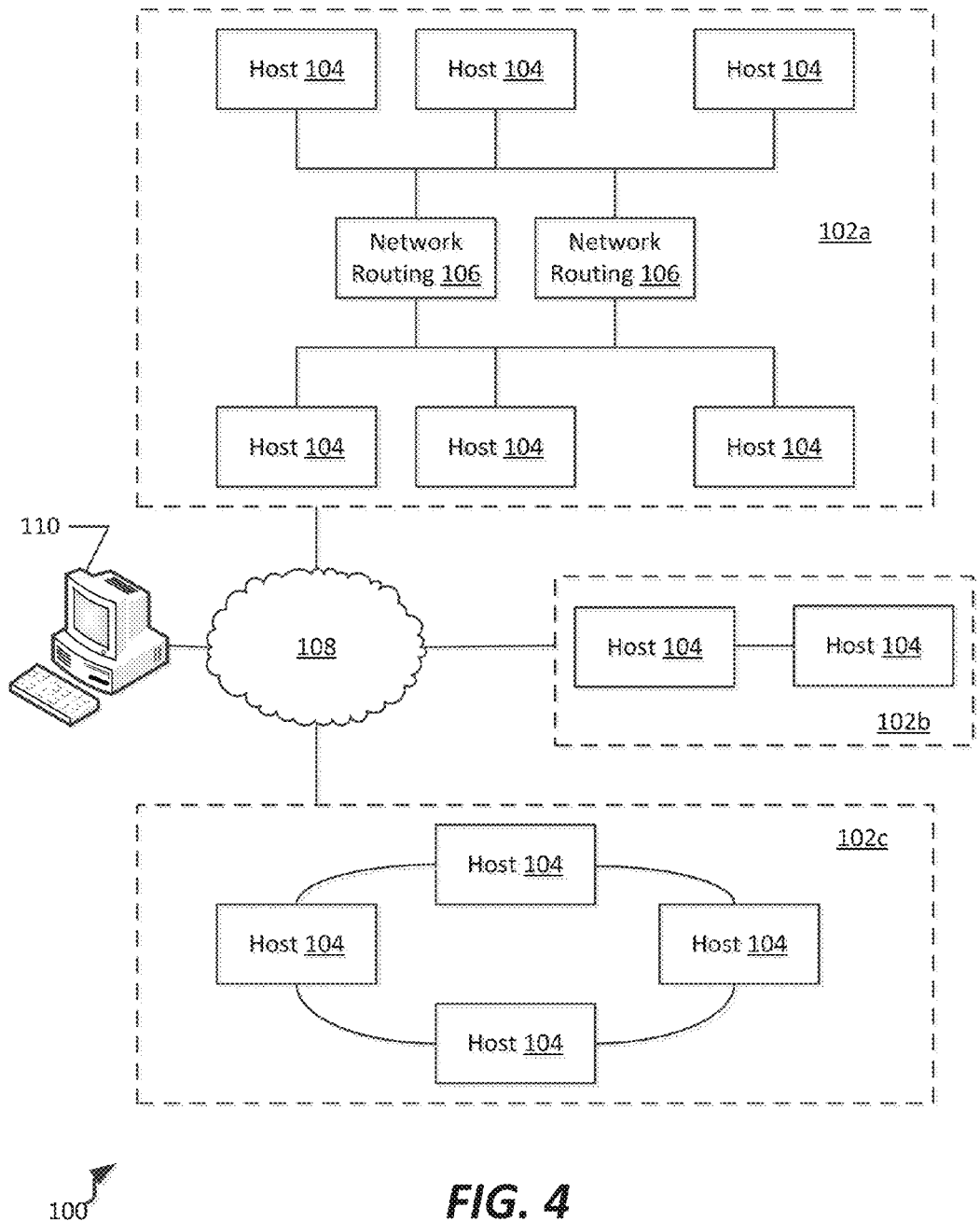
FIG. 4 illustrates a distributed multi-host system in which aspects of the present disclosure can be implemented.
Figure 5:
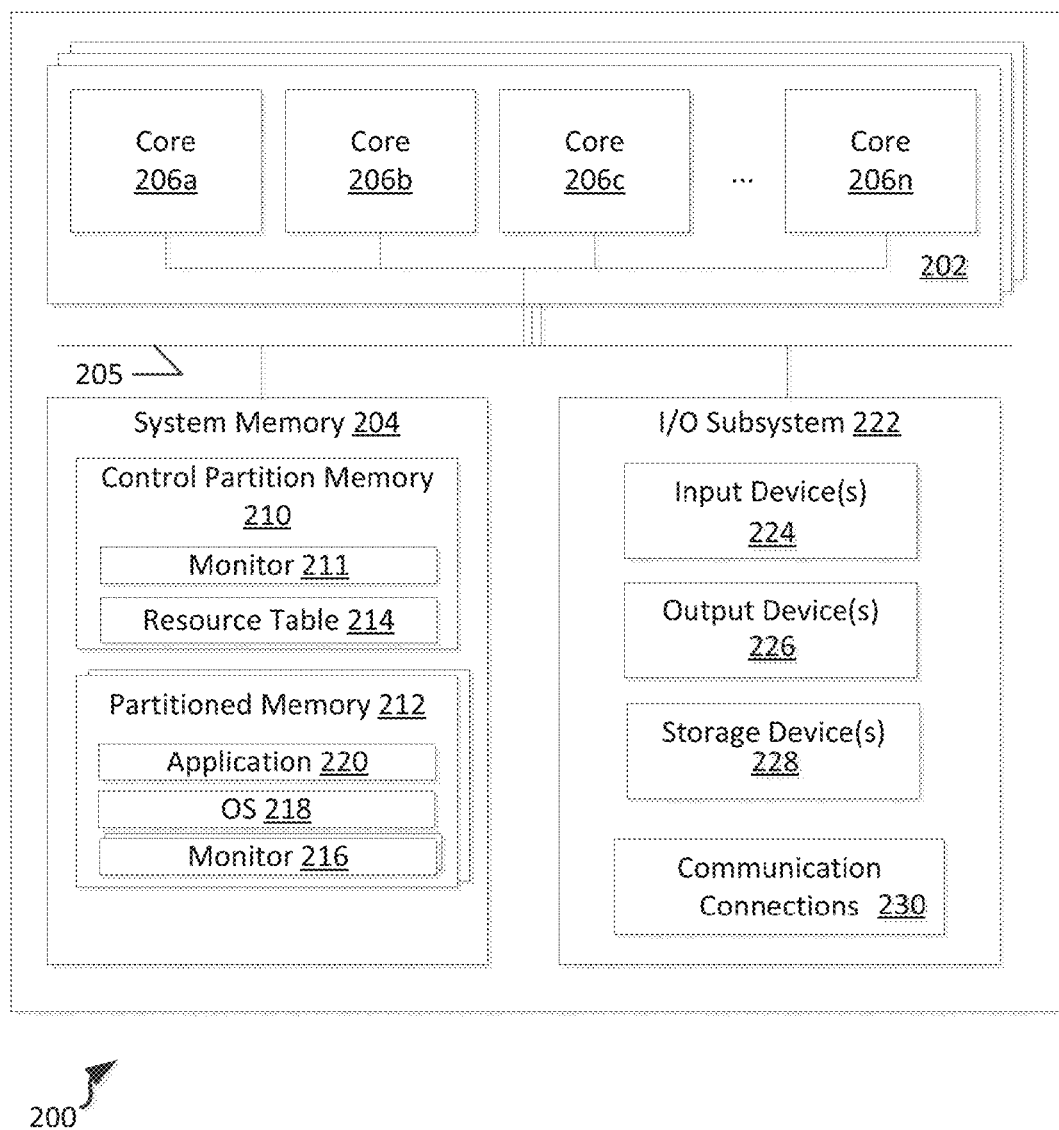
FIG. 5 illustrates an example block diagram of a host computing system useable to implement the para-virtualization systems of FIGS. 1-3, above.

Referring now to FIGS. 4-8, example arrangements of computing resources are illustrated for establishing a para-virtualization system across a plurality of host computing systems, such as host computing systems 10 of FIGS. 1-3, are shown. In particular, FIGS. 4-5 illustrate example computing resources in which the para-virtualization systems described herein can be implemented; FIGS. 6-9 illustrate example interconnection structures useable within particular partitions to establish a low-latency interconnect messaging construct allowing for inter-partition communication without requiring communication interface-speed data transfers between partitions. Such systems allow for building a fabric-based distributed computing system in which the continuous computing arrangements discussed herein can be implemented.

As illustrated in FIG. 4, a system 100 in which the para-virtualization systems of the present disclosure can be implemented is shown. The system 100 is, in the embodiment shown, distributed across one or more locations 102, shown as locations 102*a-c*. These can correspond to locations remote from each other, such as a data center owned or controlled by an organization, a third-party managed computing cluster used in a "cloud" computing arrangement, or other local or remote computing resources residing within a trusted grouping. In the embodiment shown, the locations 102*a-c* each include one or more host systems 104. The host systems 104 represent host computing systems, and can take any of a number of forms. For example, the host systems 104 can be server computing systems having one or more processing cores and memory subsystems and are useable for large-scale computing tasks. In one example embodiment, a host system 104 can be as illustrated in FIG. 5.

As illustrated in FIG. 4, a location 102 within the system 100 can be organized in a variety of ways. In the embodiment shown, a first location 102a includes network routing equipment 106, which routes communication traffic among the various hosts 104, for example in a switched network configuration. Second location 102b illustrates a peer-to-peer arrangement of host systems. Third location 102c illustrates a ring arrangement in which messages and/or data can be passed among the host computing systems themselves, which provide the routing of messages. Other types of networked arrangements could be used as well.

In various embodiments, at each location 102, the host systems 104 are interconnected by a high-speed, high-bandwidth interconnect, thereby minimizing latency due to data transfers between host systems. In an example embodiment, the interconnect can be provided by an Infiniband switched fabric communications link; in alternative embodiments, other types of interconnect technologies, such as Fibre Channel, PCI Express, Serial ATA, or other interconnect could be used as well.

Among the locations 102a-c, a variety of communication technologies can also be used to provide communicative connections of host systems 104 at different locations. For example, a packet-switched networking arrangement, such as via the Internet 108, could be used. Preferably, the interconnections among locations 102a-c are provided on a high-bandwidth connection, such as a fiber optic communication connection.

In the embodiment shown, the various host system 104 at locations 102a-c can be accessed by a client computing system 110. The client computing system can be any of a variety of desktop or mobile computing systems, such as a desktop, laptop, tablet, smartphone, or other type of user computing system. In alternative embodiments, the client computing system 110 can correspond to a server not forming a cooperative part of the para-virtualization system described herein, but rather which accesses data hosted on such a system. It is of course noted that various virtualized partitions within a para-virtualization system could also host applications accessible to a user and correspond to client systems as well.

It is noted that, in various embodiments, different arrangements of host systems 104 within the overall system 100 can be used; for example, different host systems 104 may have different numbers or types of processing cores, and different capacity and type of memory and/or caching subsystems could be implemented in different ones of the host system 104. Furthermore, one or more different types of communicative interconnect technologies might be used in the different locations 102a-c, or within a particular location.

Referring to FIG. 5, an example block diagram of a host computing system 200 useable to implement the para-virtualization systems of FIGS. 1-3, is shown. The host computing system 200 can, in some embodiments, represent an example of a host system 104 of FIG. 4, useable within the system 100. The host computing system 200 includes one or more processing subsystems 202, communicatively connected to a system memory 204. Each processing subsystem 202 can include one or more processing cores 206, shown as processing cores 206a-n. Each processing core can, in various embodiments, include one or more physical or logical processing units capable of executing computer-readable instructions. In example embodiments, the processing cores 206a-n can be implemented using any of a variety of x86 instruction sets, such as x86, x86-64, or IA64 instruction set architectures. In alternative embodiments, other instruction set architectures, such as ARM, MIPS, Power, SPARC, or other types of computing set architectures could be used.

In addition, each of the processing subsystems 202 can include one or more card-based processing subsystems including a plurality of sockets for supporting execution cores 206a-n, or alternatively can support a socket-based or mounted arrangement in which one or more execution cores are included on a single die to be mounted within the host computing system 200. Furthermore, in the embodiment shown, a plurality of processing subsystems 202 can be included in the host computing system, thereby providing a system in which one or more cores could be allocated to different partitions hosted by the same computing hardware; in alternative embodiments, a single processing subsystem including one or more processing cores 206a-n could be included in the host computing system 200, and that processing subsystem 202 could be implemented without separation from system memory 204 by a card-based implementation.

As illustrated, the system memory 204 is communicatively interconnected to the one or more processing subsystems 202 by way of a system bus 205. The system bus is largely dependent upon the architecture and memory speed support of the processing subsystems with which it is implemented; although example systems provide different frequencies and throughputs of such system buses, in general the bus system between processing subsystems 202 and the system memory is a low-latency, high bandwidth connection useable to rapidly retrieve data from the system memory 204. System memory 204 includes one or more computer storage media capable of storing data and/or instructions in a manner that provides for quick retrieval of such data and/or instructions by a corresponding processing core 206. In different embodiments, the system memory 204 is implemented in different ways. For example, the memory 204 can be implemented using various types of computer storage media.

In the embodiment shown, system memory 204 can be allocated to one or more partitions using the software described herein. In the example illustration shown, subsections of the system memory 204 can be allocated to a control partition section 210 and one or more memory partitions 212. The control partition section 210 includes a monitor 211, which in some embodiments can represent monitor 34. The control partition section 210 can also include a resource database 214 that tracks resources allocated to other partitions within the host computing system 200. This can include, for example, a listing of execution cores 206, capacity and location of system memory 204, as well as I/O devices or other types of devices associated with each partition. In example embodiments, the resource database 214 can correspond to database 33 of FIGS. 1-3.

In the embodiment shown, the system memory 204 includes memory partitions 212 which each are associated with different partitions formed within a host computing system 200. The memory partitions 212 can, in the embodiment shown, each include a monitor 216, an associated operating system 218, and one or more applications or workloads 220 to be executed within the partition. Since each memory partition 212 can be associated with one or more execution cores 206 in the resource database 214, the assigned execution cores can be used to access and execute the monitor software 216 as well as the operating system 218 and workloads 220.

It is noted that in some embodiments, the partition 212 may include multiple instances of the monitor software 216.

This may be the case, for example, for partitions that have allocated thereto more than one execution core. For such cases, monitor software 216 may be allocated for and used with each execution core. Therefore, there may be more than one such monitor executing per partition, with each monitor handling various I/O, memory, or interrupt servicing tasks that may be issued with respect to that particular execution core. Each monitor supervises execution of software within a partition as allocated to a particular execution n core; accordingly, if a single partition has multiple execution cores, the operating system 218 may allocate execution of operating system tasks, or the workload(s) 220, to one or both of the execution cores. The host computing device includes an I/O subsystem 222 that includes one or more input devices 224, output devices 226, and storage devices 228. The input devices 224 can include, for example, a keyboard, a mouse, a pen, a sound input device, a touch input device, etc. Output device(s) 226 can include, for example, a display, speakers, a printer, etc. The aforementioned devices are examples and others may be used. Storage devices 228 store data and software instructions not directly accessible by the processing subsystems 202. In other words, the processing subsystems 202 perform an I/O operation to retrieve data and/or software instructions from the storage device 228. In various embodiments, the secondary storage device 228 includes various types of computer storage media. For example, the secondary storage device 228 can include one or more magnetic disks, magnetic tape drives, optical discs, solid state memory devices, and/or other types of computer storage media.

The I/O subsystem 222 further includes one or more communication connections 230. The communication connections 230 enable the computing device 1000 to send data to and receive data from a network of one or more such devices. In different embodiments, the communication connections can be implemented in different ways. For example, the communications connections can include a network interface card implementing an Ethernet interface, a token-ring network interface, a fiber optic network interface, a wireless network interface (e.g., Wi-Fi, WiMax, etc.), or another type of network interface. The communication connections 232 can also include an inter-system communication connection for direct data communication between computing systems, such as a Infiniband switched fabric communications link, or a Fibre Channel, PCI Express, Serial ATA, or other type of direct data communication link.

It is noted that, in some embodiments of the present disclosure, other arrangements of a partition may be included as well, providing various allocations of execution cores 206, system memory 204, and I/O devices 224, 226 within the I/O subsystem 222. For example, a partition may include zero or more execution cores 206; in the event that no processor is included with the partition, the partition may lack a monitor 216, and may instead of having an executable operating system 218 may instead include a library of commands accessible to one or more services partitions, for example useable to provide I/O or memory services to those other service partitions. Furthermore, a particular partition could be allocated access to a storage device 228 or communication connections 230.

It is noted that, in typical hypervisor arrangements, failures occurring in one execution core allocated to the partition result in failure of the partition overall, since the failure results in failure of the monitor associated with the partition. In connection with the present disclosure, partitions including multiple monitors can potentially recover from such failures by restarting the execution core and associated monitor using the remaining, correctly-executing monitor and execution core. Accordingly, the partition need not fail.

As used in this document, a computer storage medium is a device or article of manufacture that stores data and/or computer-executable instructions. Computer storage media may include volatile and nonvolatile, removable and non-removable devices or articles of manufacture implemented in any method or technology for storage of information, such as computer readable instructions, data structures, program modules, or other data. By way of example, and not limitation, computer storage media may include dynamic random access memory (DRAM), double data rate synchronous dynamic random access memory (DDR SDRAM), reduced latency DRAM, DDR2 SDRAM, DDR3 SDRAM, DDR4 SDRAM, solid state memory, read-only memory (ROM), electrically-erasable programmable ROM, optical discs (e.g., CD-ROMs, DVDs, etc.), magnetic disks (e.g., hard disks, floppy disks, etc.), magnetic tapes, and other types of devices and/or articles of manufacture that store data. Computer storage media generally includes at least some tangible, non-transitory media and can, in some embodiments, exclude transitory wired or wireless signals. Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as Wi-Fi, acoustic, radio frequency (RF), infrared, and other wireless media. In accordance with the present disclosure, the term computer readable media as used herein may include computer storage media, but generally excludes entirely transitory embodiments of communication media, such as modulated data signals.

Furthermore, embodiments of the present disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIGS. 4-5 may be integrated onto a single integrated circuit. Such an SOC device may include one or more processing units, graphics units, communications units, system virtualization units and various application functionality all of which are integrated (or "burned") onto the chip substrate as a single integrated circuit. Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

Although particular features are discussed herein as included within a host computing system 200, it is recognized that in certain embodiments not all such components or features may be included within a computing device executing according to the methods and systems of the present disclosure. Furthermore, different types of hardware and/or software systems could be incorporated into such an electronic computing device.

Figure 6:
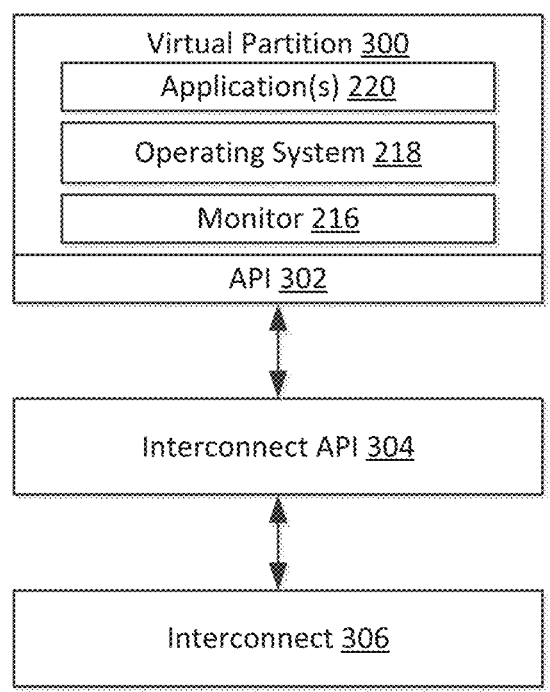
FIG. 6 illustrates a general block diagram of an interface to underlying connectivity layers for a partition allocated within the para-virtualization system of the present disclosure.

Referring now to FIG. 6, a general block diagram of a partition having an interface to underlying connectivity layers is shown, as allocated within the para-virtualization system of the present disclosure. In general, FIG. 6 illustrates a partition 300 that includes partitioned system memory, such as a portion of system memory 204 of FIG. 5. The partition 300 includes, as discussed above, a monitor 216, an associated operating system 218, and one or more applications or workloads 220 to be executed within the partition. The partition 300 further includes an application programming interface (API) instantiation 302 including a plurality of callable functions implemented, for example, via the monitor 216, and useable to interface the virtual partition 300 to an interconnect API 304. The interconnect API 304 in turn controls communication with an interconnect layer 306, which can, for example, correspond to an underlying low-latency interconnect to other partitions included within a particular multi-partition, para-virtualization system.

In some embodiments, the partition 300 can be referred to as a "virtual" partition, indicating that the partition 300 includes some level of abstraction between the hardware computing resources allocated thereto and the applications 220 and operating system 218 executing within that partition. For example, the partition may be virtual in the sense that it shares computing resources with another partition, or that it operates on a different computing architecture than is expected by the operating system 218 (and therefore is hosted by some additional emulation system), or that at least a portion of the computing resources accessed by the partition are in fact emulated. In some embodiments, partitions are at least partially virtual by adding an interconnection layer that abstracts an underlying communications transport used by the partition, such as by using interconnect instantiation 302 and API 304.

Figure 7:
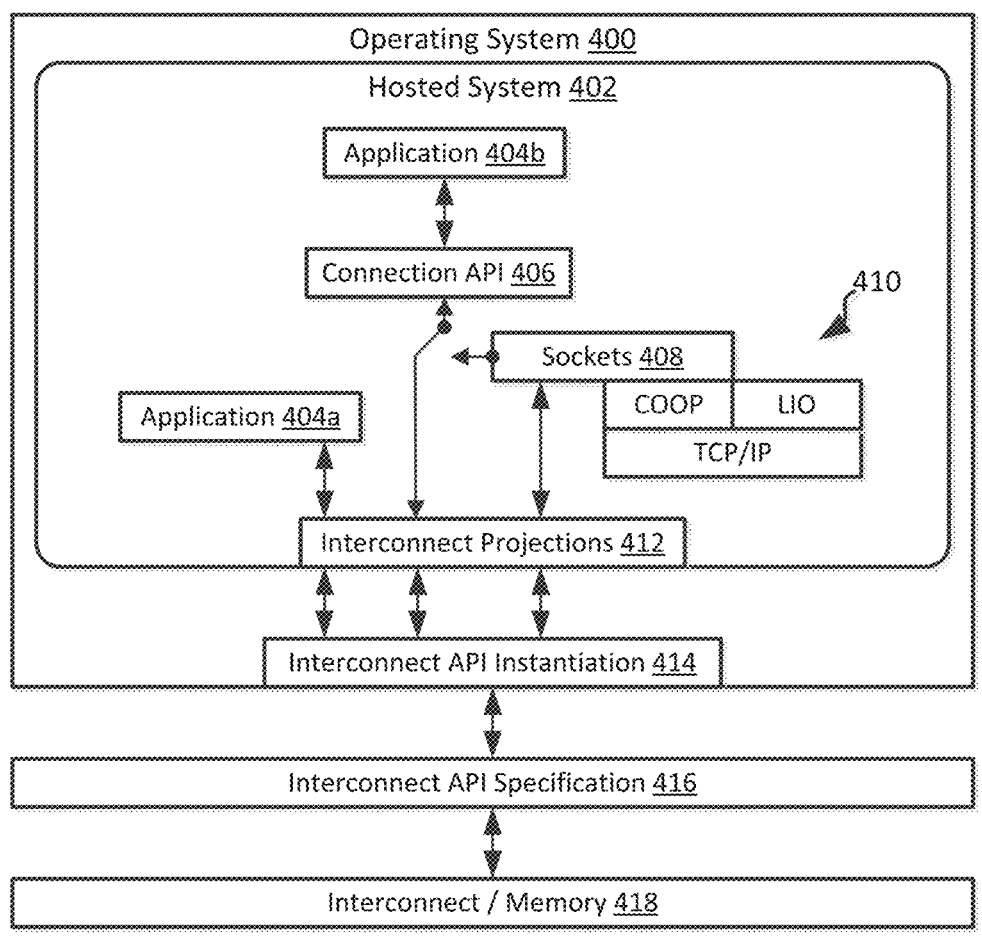
FIG. 7 illustrates a block diagram of interconnection to an application programming interface addressable from a partition allocated within the para-virtualization system of the present disclosure.
Figure 8:
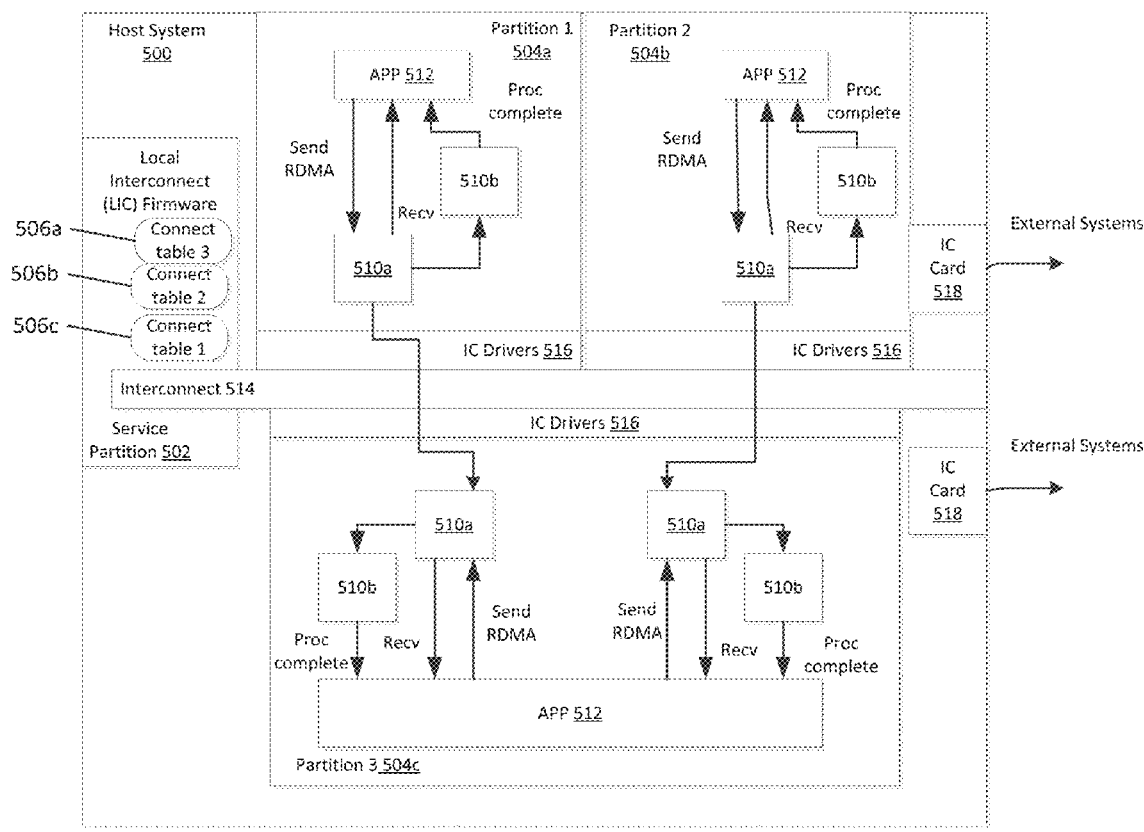
FIG. 8 illustrates a detailed block diagram illustrating functional interconnections among partitions in a host computing system, according to an example embodiment.

As further illustrated in FIGS. 7-8, the API instantiation 302 exposes a plurality of commands included in the interconnect API 304 to the partition 300, and manages communication with the API. These commands can be, in some embodiments, verbs or structures, analogous to commands published by the Open Fabrics Alliance (OFA), as part of the OpenFabrics Enterprise Distribution (OFED) communications structure for Direct Memory Access (DMA) or Remote DMA (RDMA) and kernel bypass. Details regarding such commands are discussed in further detail in Section III, below.

In example embodiments, the API instantiation 302 also provides instantiation of message and/or data queues useable to communicate data among partitions. Interconnect API provides a layer of abstraction between the underlying interconnect layer 306, which corresponds to a hardware layer included within and among host computing systems as illustrated in FIGS. 4-5.

As illustrated in FIG. 7, a block diagram illustrating a particular implementation of interconnection of a partition using an application programming interface specification and associated instantiation is illustrated in the context of a virtualized or hosted system residing on a partition. In the example implementation shown, which can form a portion of the system 10 of FIGS. 1-3, an operating system 400 hosts a hosted system 402, which can include, for example, applications 404a-b, and an associated connection API 406. The applications 404a-b correspond to a workload hosted within the hosted system 402, and which transmits a request for data, or a data set, to a remote system, such as a remote partition. Generally, application 404a transmits requests to remote systems as if it were communicating with local memory, while application 404b transmits requests via the connection API 406, which would normally transmit data via communications sockets 408 (e.g., using a communications stack 410, such as COOP, LIO, TCP/IP communication modules as shown).

The block diagram can, for example, correspond to an interconnect arrangement for a guest partition within the para-virtualization system of FIGS. 1-3, above. In the embodiment shown, for communication to another partition within a para-virtualization system as discussed herein, applications 404a-b connect to interconnect projections 412. The interconnect projections 412 provide a pass-through of an interconnect API instantiation 414 by the operating system 400 (for application 404b, via the communication API 406). The interconnect API instantiation 414 in turn exposes functions provided by the interconnect API specification 416, which defines the interface to an interconnect or memory layer 418. The interconnect API instantiation 414 provides the physical and logical structures required to implement the interconnect API, for example by instantiating memory structures required to manage data transfers among partitions, as well as to support the commands exposed by the API specification 416. In some embodiments, the interconnect API instantiation 414 includes one or more drivers used to support data exchange between the operating system 400 and associated hosted system 402 and any external partitions, such as those that may share memory or be interconnected to the hardware resource hosting the operating system 400, such as via the interconnect or memory layer 418. In an example embodiment, the interconnect API instantiation 414 includes a queue pair architecture useable to schedule direct memory access operations between cores and shared memory, or between partitions on the same host system or different host systems. Such an arrangement is illustrated in FIG. 8. In addition, the interconnect API instantiation 414 includes interconnect firmware managed by a service partition provided across each of the host computing systems to support the drivers that are installed in association with each of the guest partitions.

The API specification 416 defines a plurality of callable functions allowing a given partition to instantiate a connection to another partition as well as schedule data communications between partitions. It is noted that, despite the fact that various possible interconnections are available as part of the interconnect or memory layer 418, common functions are generally available for accessing or transmitting data at a same host computing system or on a different computing system within a network of host computing systems, without requiring that the hosted system 402 or operating system 400 be exposed to details of the interconnect and memory layer 418.

In example embodiments, the API specification 416 defines three general classes of interconnections: an internal interconnect, used to communicate among applications to perform functions to create a system, an external interconnect to communicate to system peripherals (e.g., disk) and external networks (e.g., Internet, systems outside the para-virtualization system), and a local interconnect used by physical interfaces and transparent to the applications executing on the various partitions.

The API specification 416 includes a library with which calling applications can execute various functions, an example listing of which is provided below. It is noted that, because the different host computing systems may be required to transfer address values for such direct memory accesses either within the same host system or different systems, different names are used for different functions based on the connection destination of the particular message.

Referring to FIG. 8, an example implementations of functional interconnections among partitions in one or more host computing systems are shown. In particular, FIG. 8 illustrates a first host computing system 500 depicting functional interconnections among partitions in a single host computing system; it is noted that in alternative arrangements, functional interconnections among partitions across communicatively interconnected host computing systems are possible as well.

In the embodiment shown in FIG. 8, host computing system 500 includes a service partition 502, as well as a plurality of partitions 504a-c supported by the service partition 502. In example embodiments, the partitions 504a-c can correspond to I/O partitions 16,18 or guest partitions 26-28. In the embodiment shown the service partition 502 can correspond to the interconnect service partition 24, optionally in combination with control partition 14, and includes local interconnect firmware implementing connection tables 506a-c, each of which define interconnections among partitions. For example, each of the connection tables 506a-c can be associated with a separate supported partition 504a-c, and define the local interconnect support provided by the service partition 502 for that other partition 504. In particular, connection tables 506a-c can define the memory space mapping associated with a particular partition, allowing for direct memory access into that partition by another partition using a different virtual or physical memory mapping.

Within each partition 504a-c, a pair of queues 510a-b is instantiated for each interconnection to another partition, thereby providing bidirectional communication of virtual and/or physical addresses required to provide for direct memory access operations between partitions. This pair of queues 510a-b is associated with an application 512 at each partition, and performs message send and receive operations for all transfers between two applications 512, and reflect work requests from the sending application. In each pair of queues 510a-b, a first queue 510a is a send queue that includes the work request. The application 512 in that associated partition 504 transmits a DMA/RDMA request to the queue 510a, and receives data from the queue (received from far end queue 510 in another partition to which connection is made. A second queue 510b is a completion queue, and tracks completion status of DMA/RDMA requests.

Interconnect firmware 514 resides between the pairs of queues 510a-b of interconnected partitions (e.g., partitions 504a/504c, or 504b/504c). The interconnect firmware 514 maintains a registration of memory, and performs virtual address and physical address translations as needed for translation/connection tables 506a-c. The interconnect firmware 514 can, in some embodiments, be implemented in or by an interconnect service partition, such as service partition 502 or interconnect service partition 24. Additionally, drivers 516 included in each partition 504a-c supported by the service partition 502 allow for translation of the work requests to a format useable by the interconnect firmware 514, by providing transforms of requests as needed. In addition, interconnect firmware 514 provides security features that may be required for communication of data between host systems. For example, for data transmitted to a remote host system, the interconnect firmware 514 can selectively apply encryption and/or data splitting operations to that data to improve its resiliency and security during transmission.

In addition, in the embodiment shown one or more IC cards 518 can be associated with the host system 500, and can be used to interconnect to an external system, such as a disk, network card, or other component not allocated to the partitions 504a-c.

In alternative arrangements, each host can have its own service partition and associated interconnect. The service partitions 502a-b monitor connections associated with the partitions on those respective host computing systems 502a-b, with service partition 502a including connection tables 506a-b associated with partitions 504a-b, and service partition 502b including connection table 506c associated with partition 504c.

In general, and referring to the systems of FIGS. 6-8, the API illustrated herein, as implemented using the service partition 502, connection tables 506a-c, interconnect firmware 514, and queues 510a-b is designed to be used at the user level, allowing for the normal transfer operations to bypass kernel calls by operating systems in each partition, thereby ensuring low latency. In other words, memory addresses used in the messages are the application's virtual address and translations to physical addresses are done by the hardware/firmware.

In some embodiments, the messages included in queue pairs 510a-b can correspond to verbs, defining commands to be performed relative to DMA/RDMA operations across partitions. In accordance with the present disclosure, memory addresses used in the verbs are first registered, allowing the interconnect firmware and drivers to 'pin' the memory pages and create any translate tables needed by the hardware. Therefore the process of registering a memory segment (and de-registering) may take a large amount of time and should be done by the application during initialization and teardown of that partition, if possible. It is noted that, in embodiments where the operating system associated with a particular partition 504 limits the number of pages that may be 'pinned', the application 512 in that partition may see better performance by copying data buffers in an un-registered memory region to a registered memory region rather than doing a register/de-register of the new memory block.

It is noted that the API calls do not change if all partitions were in the same host computing system or different host computing systems 500a-b. The difference would be managed by the interconnect 514, which would use a memory to memory transfer to transport the data in the arrangement of FIG. 8, rather than using a physical wire.

Furthermore, although in FIG. 8 a single queue pair is illustrated for each partition, it is understood that the queue pair arrangement is effectively a bidirectional, point-to-point connection; accordingly, if a partition is to communicate with other partitions, multiple queue pairs could be used.

Referring to FIGS. 1-8 generally, it is noted that using the implementations of functional interconnections among partitions on the same host platform or different host platforms, the systems of the present disclosure allow for management of both local and remote file access or I/O requests using the low-latency interconnect rather than using a TCP/IP communication interface.

Additional details regarding possible implementation details of a partitioned, para-virtualization system, including discussion of multiple are discussed in U.S. Pat. No. 7,984,104, assigned to Unisys Corporation of Blue Bell, Pa., the disclosure of which is hereby incorporated by reference in its entirety. Example partitioning mechanisms, and additional details regarding partitioning within such a computing arrangement, are described in U.S. Provisional Patent Application No. 61/827,775, filed on May 28, 2013, as well as copending U.S. patent application Ser. No. 14/133,803 and Ser. No. 14/133,808, the disclosures of each of which are hereby incorporated by reference in their entireties.

III. Continuous Computing Concepts

Referring to FIGS. 9-23 generally, using either virtualization systems as described above or via traditional hardware-based execution approaches, various techniques for distributing computing tasks at differing granularities are described. In particular, the systems and methods of FIGS. 9-23 provide methods by which less than an entire partition, or in some cases less than an entire executable task, can be transferred to a remote system, of either a same type, a different general purpose system, or a special-purpose system, for execution and handling. Accordingly, in cases where it may not be advantageous to move an entire task to a remote system, it may still be possible to distribute a particular workload across different platforms or partitions as needed for throughput, redundancy, or other reasons. As noted above, in some cases the continuous computing features described herein are implemented a virtualized system such as is discussed above in connection with FIGS. 1-8. In some other instances, features discussed herein may be implemented natively on computing systems having either homogeneous instruction set architectures or heterogeneous instruction set architectures (e.g., in the case of the Distributed Computational Units of FIGS. 9-11, discussed below).

IV. Distributed Computational Units

Figure 9:
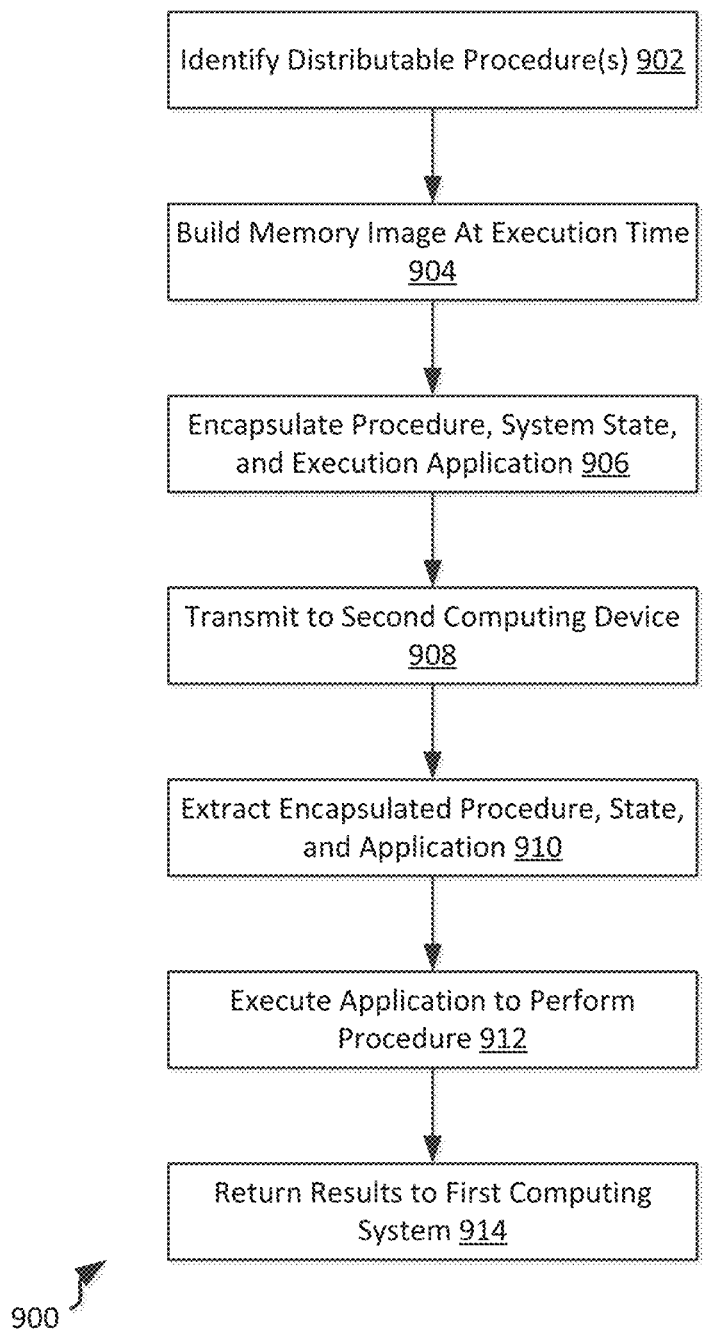
FIG. 9 illustrates a flowchart of a method of distributing procedures among heterogeneous computing systems using a distributable computational unit, according to an example embodiment.
Figure 10A:
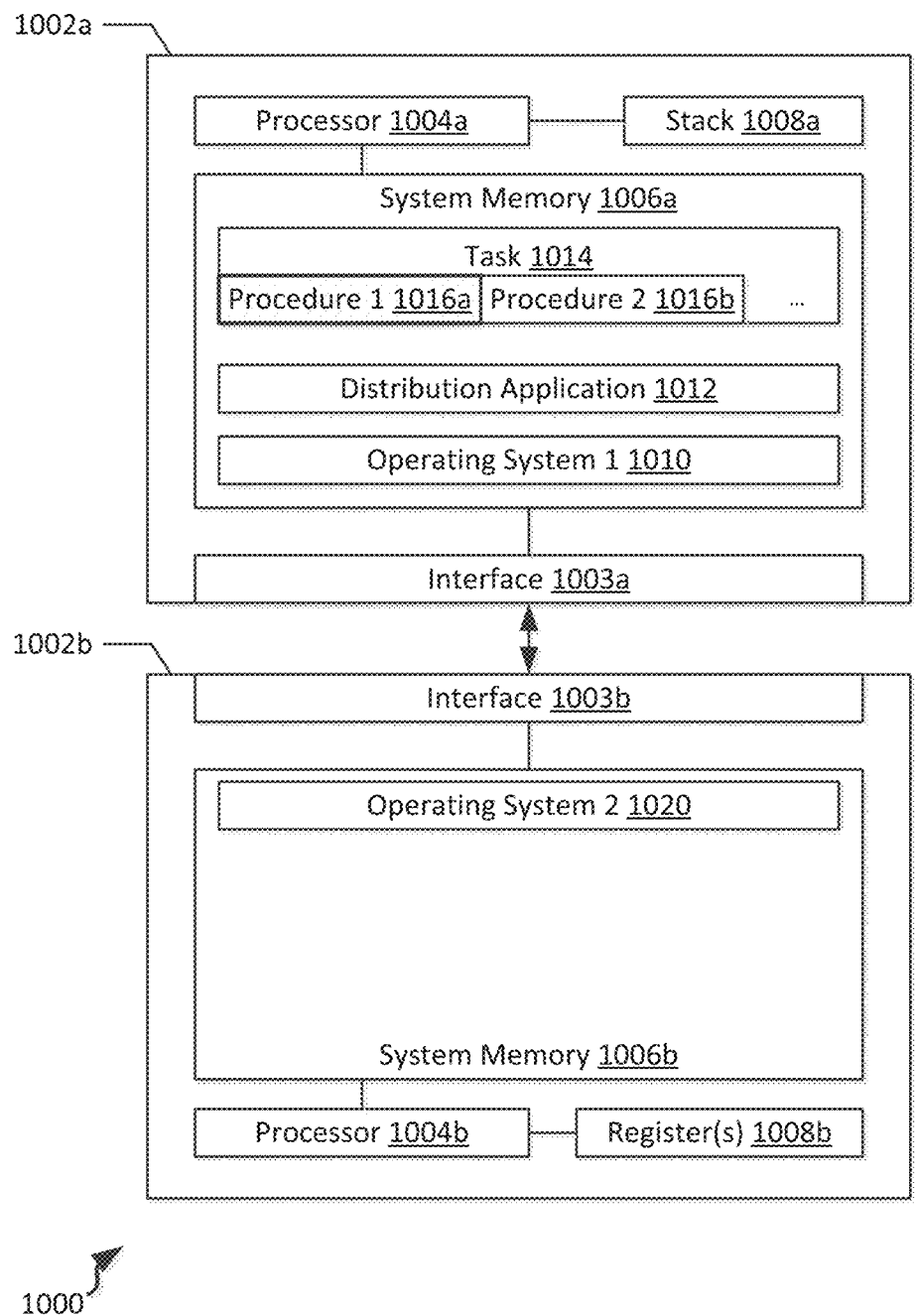
FIGS. 10A-10D illustrate a sequence of operations in an arrangement illustrating first and second computing systems and distributing a distributable computational unit from the first computing system to the second computing system including a procedure.
Figure 10B:
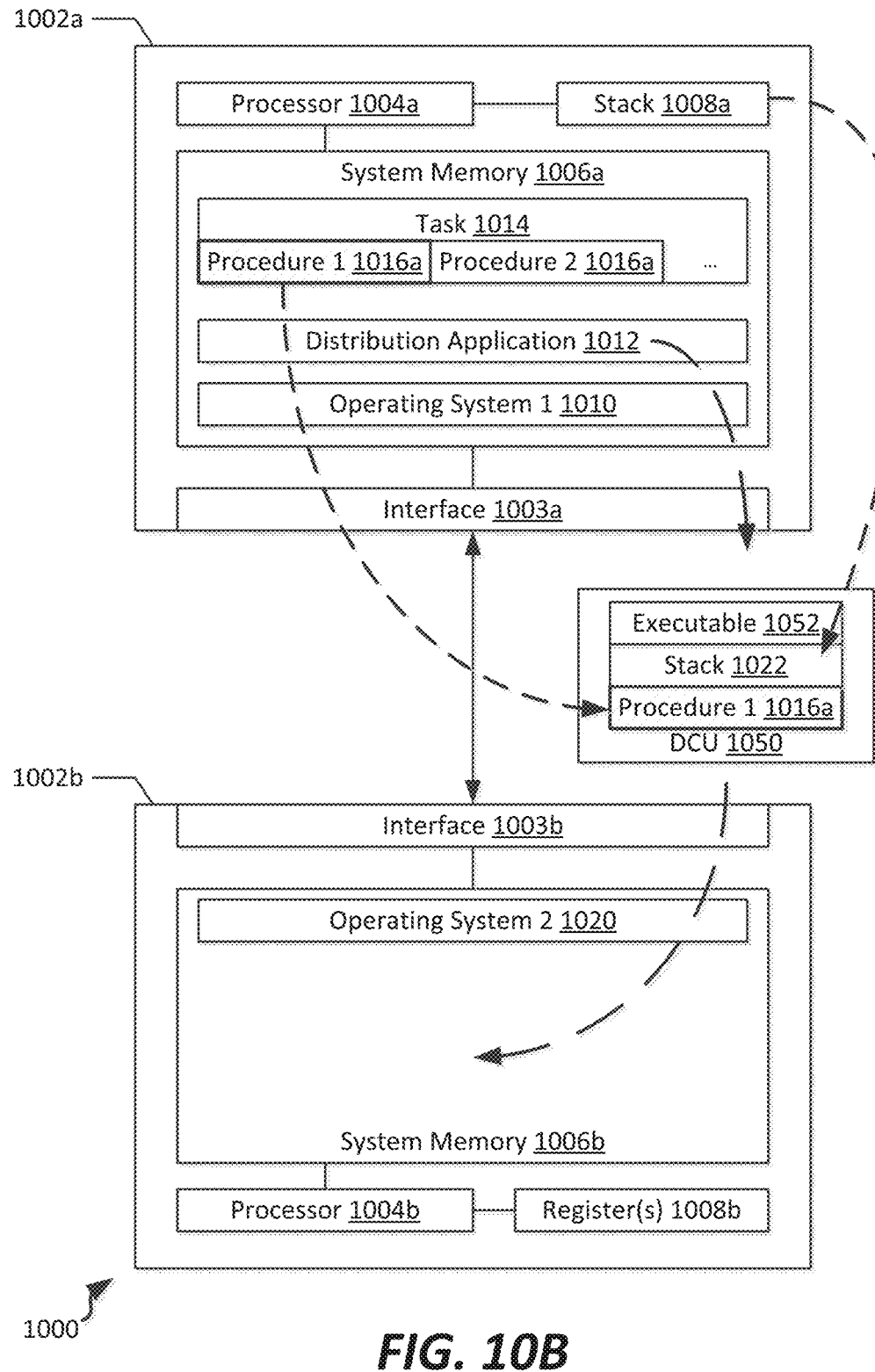
Figure 10C:
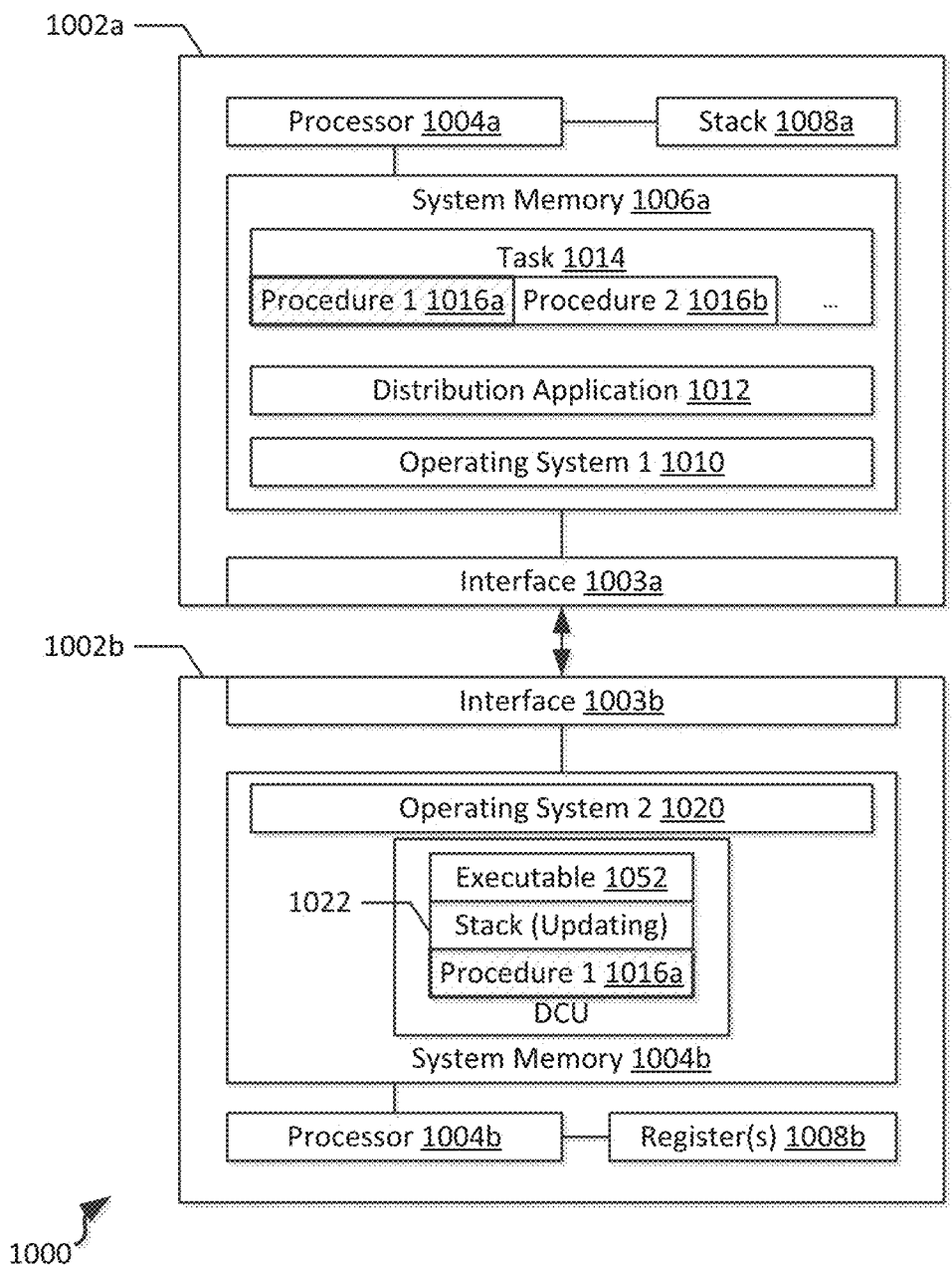
Figure 10D:
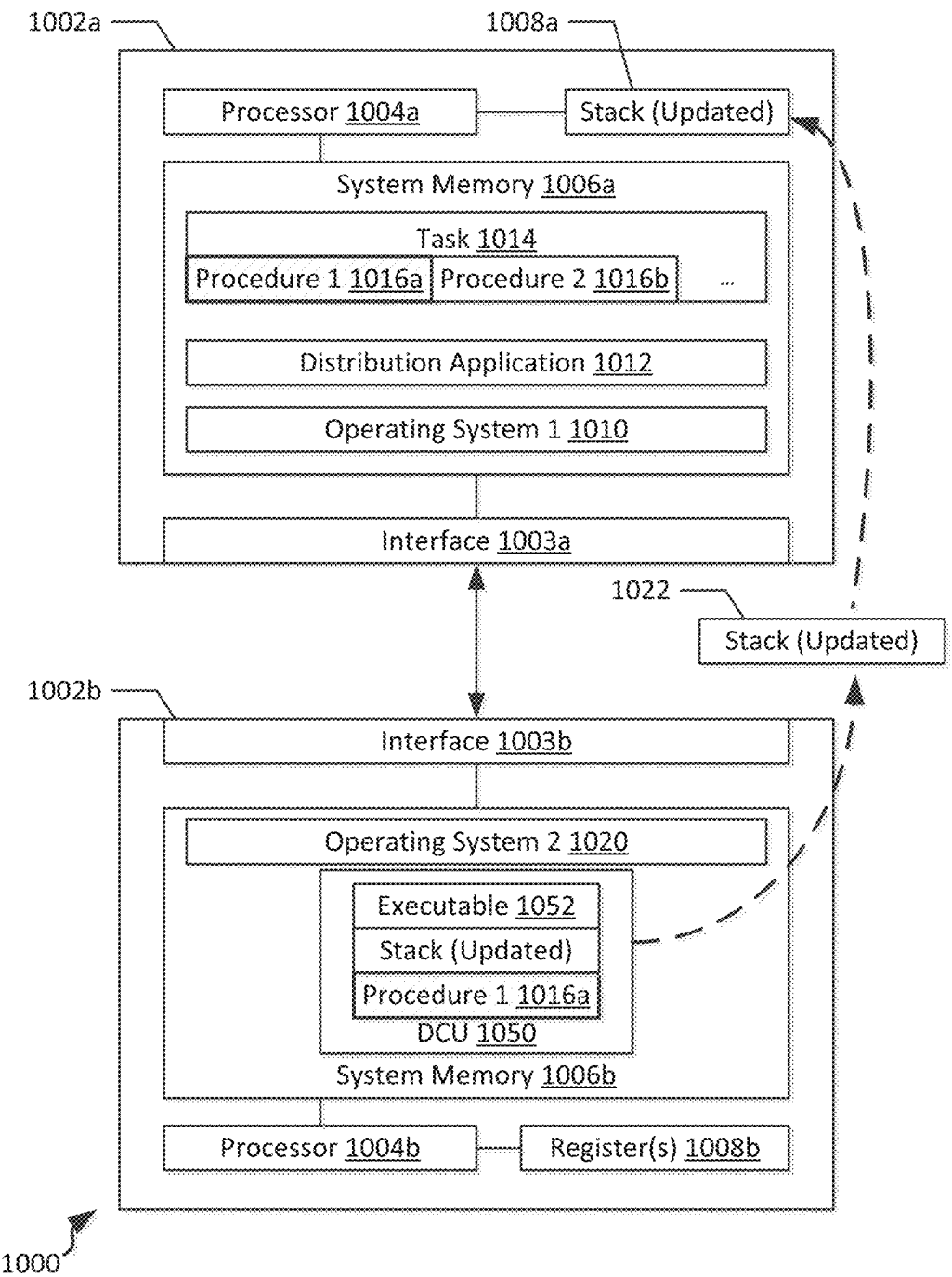
Figure 11:
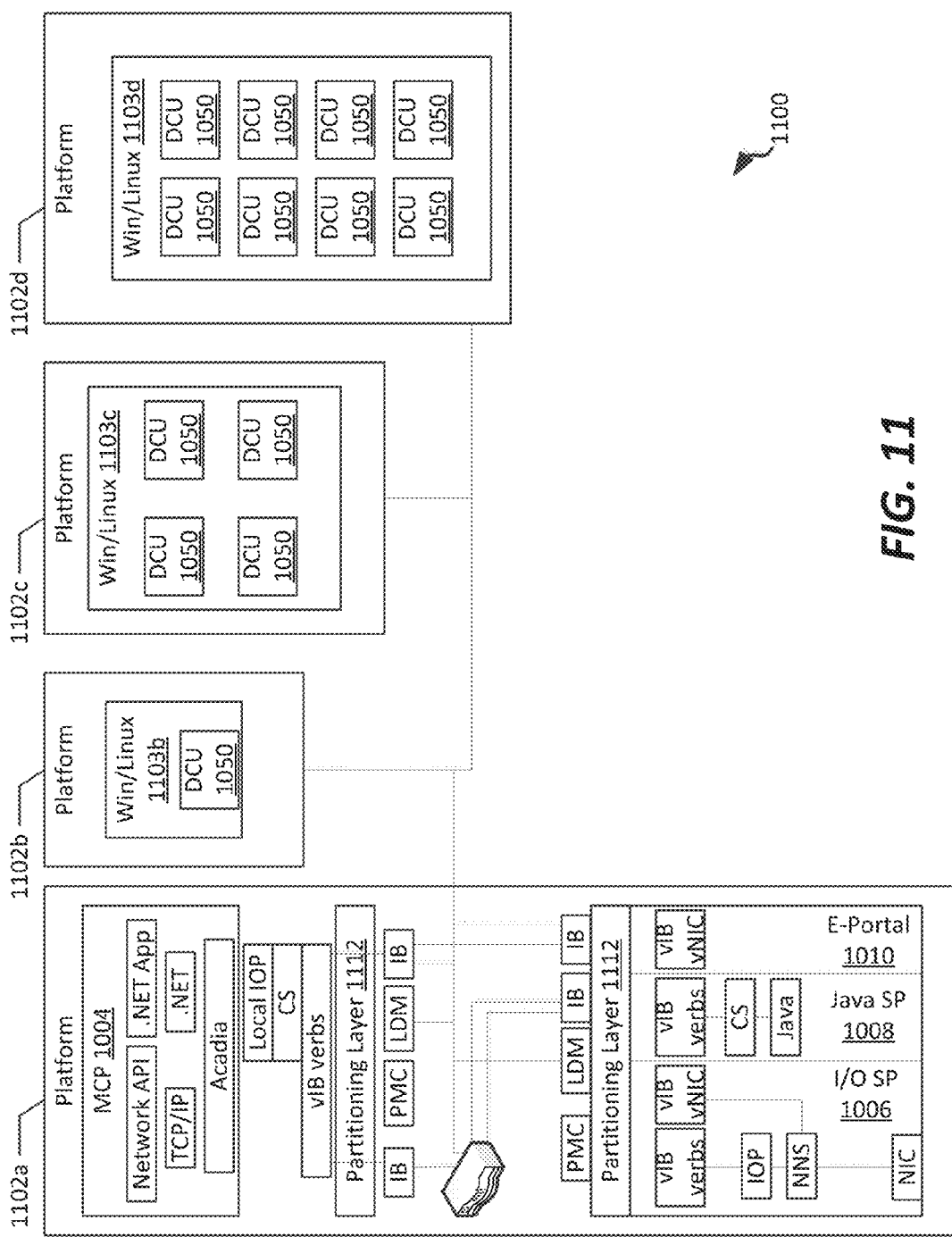
FIG. 11 illustrates an example arrangement in which distributable computational units can be used to redistribute portions of tasks or applications among heterogeneous computing systems.

Referring to FIGS. 9-11, a first mechanism by which computational complexity can be distributed throughout a computing fabric is depicted. The methods and systems of FIGS. 9-11 can be implemented in a hardware-based system, a virtualized system (e.g., as illustrated in FIGS. 1-8, above), or some combination thereof, as illustrated in the example embodiment of FIG. 11.

FIG. 9 illustrates an example flowchart of a method 900 for distributing computational units, according to example embodiments of the present disclosure. The method 900 generally includes an identification operation 902, which is used to identify one or more distributable procedures. Generally, the one or more distributable procedures are procedures that are easily made platform-independent, e.g., are processor-bound and memory-bound, such that the procedure does not require any I/O operations that rely on access to local data storage, and does not have specific dependencies upon operating system libraries or other features of the platform on which they are to execute. Example types of distributable procedures may be mathematical processes, such as data encoding, decoding, sorting, or other mathematical or data manipulation algorithms.

The method 900 includes, in the embodiment shown, a memory image operation 904 which builds a memory image that includes any memory space that may be allocated to the procedure, for example a block of memory, a stack space, register space, or other types of memory spaces that may be available to and allocated to the procedure, depending upon the architecture of the computing system on which the procedure is intended to execute. The method 900 further includes an encapsulation operation 906, which includes encapsulating the procedure, a system state, and an execution application into a packaged process that can be exported to a different computing system or partition.

In some embodiments, the packaged process can be constructed as a self-extracting executable that includes each of the procedure, the system state, and the execution application. The procedure includes the executable code written for execution on the source partition where it was originally intended to execute. Additionally, the system state includes a memory state of resources that are likely to be ready from or written to by the procedure, such as a stack, registers, pointers, and memory space allocated for use by the procedure. The execution application operates as a translation component for the procedure by decoding the instructions included in the executable code, determining the native operation(s) to be executed, and executing those instructions, thereby storing updated results in corresponding locations in the memory space stored on the destination system and associated with the procedure. The execution application also includes instructions that manage collection of the updated memory space at the end of execution of the procedure for returning that updated memory to the source, or original, system from which the procedure is distributed.

It is noted that, however, the destination computing system or partition in which the distributed computational unit will execute the procedure may utilize an entirely different instruction set architecture or memory configuration. Accordingly, the execution application can correspond in such examples to a translator or light version of an operating system and virtualization software, by managing memory read/writes to areas of memory in the destination system designated as corresponding to system memory, stack memory, registers, or other constructs that would otherwise be present on the source system (but which may or may not be present on the destination system, and in any event would not typically be overwritten for use by a distributed computational unit).

In some embodiments, the method 900 includes a transmission operation 908 for transmitting the distributed computational unit to a remote, target system (e.g., platform or partition) for execution. This can include, for example, communication of the distributed computational unit via a communication interface or low-latency interconnect among partitions, as discussed above in part II. Once received at the destination system, an extraction operation 910 extracts the encapsulated procedure, system state, and execution application, for example from a self-extracting executable. An execution operation 912 corresponds to operation of the execution application to translate and execute the instructions included in the encapsulated procedure and correspondingly updating the system state as reflected in memory. A result return operation 914 returns the results to a source computing system (e.g., partition or platform) to allow the memory and other system state of that system to be updated, such that the source computing system can subsequently continue execution as if it executed the distributed procedure itself.

Referring now to FIGS. 10A-10D, an example arrangement of computing systems in which the method 900 can be performed is illustrated, in general terms. In the embodiment shown, an overall system 1000 includes first and second computing system 1002*a-b*. The first and second computing system 1002*a-b* can be, in various embodiments, different platforms, different virtualized partitions on the same platform (e.g., guest partitions 26, 28 above), or some combination thereof. The first and second computing systems 1002*a-b* are communicatively interconnected, for example with a communication link between interfaces 1003*a-b*, respectively, of computing system 1002*a-b*. The communication link can be, for example, a low-latency interconnect arrangement as is discussed above in connection with FIGS.

1-8, a traditional TCP/IP-based communication link, or other data communication link.

In an example embodiment as shown, the first computing system 1002a, designated in this example as the source computing system from which a distributed computational unit will be generated, includes a processor 1004a, memory 1006a, and a working memory architecture, shown as stack 1008a. By way of contrast, the second computing system 1002b includes a processor 1004b, memory 1006b, and a working memory architecture, shown as register memory 1008b. As noted above, the computing systems 1002a-b may not just have different working memory arrangements, the memory addressing schemes of memories 1006a-b may be different, as well as the instruction sets executable by processors 1004a-b, or other features.

In the example shown in FIG. 10A, the memory 1004a stores an operating system 1010 that hosts execution of a distribution application 1012, as well as a task 1014, which represents the workload being executed on the system 1002a. In some embodiments, in particular those in which the task 1014 is hosted on a virtualized partition, virtualization software may be included in the system memory 1002a, or may otherwise take the place of some aspects of operating system 1010.

In the example shown in FIG. 10A, the second memory 1006b of the second computing system 1002b includes an operating system 1020, which may be different from the operating system 1010 and may execute on a different computing architecture. Furthermore, computing systems 1002a-b may have different peripheral components, I/O subsystems, or other features such that software executing on the first computing system 1002a may not readily be executable on the second computing system 1002b. Accordingly, traditional mechanisms for distributing entire tasks, or procedures associated with such tasks, may not readily be executed on the second computing system 1002b if written for execution on the first computing system 1002a.

In some cases, where the task 1014 becomes resource-intensive, it may be advisable to offload a portion of the resource utilization to a different computing system. Using the distributed computational units of the present disclosure, such offloading of resource utilization can occur on a high-granularity basis, e.g., for procedures contained within such a task that are identifiable as being "portable", or bound to a known set of computing resources. In some embodiments, a task or sub-task (e.g., a procedure) can be identified as portable if it is processor-bound and memory-bound, meaning that it can execute independently of other software or hardware features of the computing system (e.g., I/O or other systems). Accordingly, as illustrated in FIGS. 10B-10D, portions of the task can be offloaded to another computing system, such as computing system 1002b.

As seen in FIG. 10B, computing system 1002a can generate a distributed computational unit, shown as DCU 1050. DCU 1050 can include, for example, a portion of task 1014, such as procedure 1016a (of procedures 1016a-c, shown as part of task 1014), and captured memory resources required for execution of the procedure 1016a, for example at least a portion of a stack 1008a, shown as stack component 1022. The DCU 1050 also includes an executable code component 1052 generated by the distribution application 1012. It is noted that, in some embodiments, DCU 1050 is generated at least in part by the operating system 1010 of the computing system 1002a, which can assist distribution application 1012 by allocating memory for the DCU 1050, and can extract or update the stack 1008a based on changes to the stack component 1022 due to execution on the remote system.

In example embodiments, the portion of task 1014, in this case procedure 1016a, corresponds to a processor and memory-bound procedure that is associated with a knowable portion of memory. In the example shown, the procedure 1016a executes using only stack memory, with the memory being used by the procedure 1016a being at a top of the stack, which corresponds to stack component 1022. Accordingly, only the stack component 1022, rather than the entire stack 1008a, would need to be included in DCU 1050. For example, parameters, such as arrays of integers, could be passed on the stack component 1022. The stack component 1022 would contain descriptors which point to where the data for the arrays are located. The data in those arrays must also be read and encapsulated in the DCU 1050 so they can be passed to the remote execution environment.

It is noted that additional components may be included in DCU 1050 depending on the memory required to perform the procedure 1016a; in some cases, portions of system memory may be copied and included in the DCU 1050, particularly where such portions of system memory may be updated during execution of the procedure 1016a. Other components may be included in the DCU as well.

The executable code component 1052 can be, in various embodiments, a program executable on an intended destination computing system, such as second computing system 1002b. As such, the executable code component 1052 is written for execution on an instruction set architecture of that target computing system (e.g., second computing system 1002b), and not necessarily for the instruction set architecture of the source computing system (e.g., the first computing system 1002a). The executable code component 1052 is configured to be capable of interpreting the procedure 1016a, which is configured for execution on the instruction set architecture of the first computing system 1002a, such that the second computing system 1002b can perform corresponding instructions to those that would have been executed on the first computing system 1002a had the procedure 1016a been executed on the first computing system 1002a.

The executable code component 1052 also, based on the results of execution on the second computing system 1002b, interprets those results and updates a memory state of the associated memory components that were included in the DCU 1050, stored in a memory organization based on an architecture of the first computing system 1002a. As such, in various embodiments, depending on the specific features of the first and second computing system architectures, the executable code component 1052 may be required to append bits to results received from the second computing system 1002b for storage in a manner understandable to the first computing system 1002a, may be required to reverse-order such memory bits (e.g., from big-endian to little-endian, or vice versa), change numerical formats (e.g., based on different integer or floating point number storage formats), or otherwise reformat the data. In such cases, the received results, reconfigured to be understandable to the first computing system 1002a, are stored back in associated memory space, such as the stack component 1022 or other associated memory included in the DCU 1050. Such features, referred to in some circumstances as marshalling of received results, can be used to pass information across interfaces from one format to another format, in either a system-dependent or system-independent manner.

In example embodiments, the executable code component 1052 can correspond to a monitor portion of the S-Par secure partitioning and virtualization system available from Unisys Corporation of Blue Bell, Pa., such as the monitor features discussed above in connection with FIGS. 1-8, but including some additional features for management and return of memory resources from the target computing system to the originating computing system.

In the example shown in FIGS. 10B-10C, the DCU 1050 can be constructed as a self-extracting executable that, when executed causes extraction of the executable 1052, the procedure 1016*a*, and stack component 1022 into a system memory of a receiving computing system, shown as second computing system 1002*b*. The stack component 1022 can be constructed such that, in the case of emulated execution of an MCP-based system, a process is started and exits onto stack 1, via a return control word included in the stack for use upon completion of the procedure 1016*a*. When extracted, the executable code component 1052 can cooperate with operating system 1020 to allocate memory and load the stack image from the stack component 1022.

In example embodiments wherein the DCU 1050 is a standalone component, the DCU is a codefile pre-loaded into memory so that the processor can exit onto the stack component 1022 as loaded into memory for execution. If the DCU 1050 is a standard code segment, that segment is extracted from the codefile associated with the task 1014, and packaged into the DCU 1050 alongside allocated memory, or at least some identifier of a portion of memory that would be used by the procedure 1016*a* if allocated at the target computing system 1002*b*. In example embodiments, where the second computing system 1002*b* corresponds to an MCP-based system, a local ASD table can be created and pointed to a stack image represented by the stack component 1022.

The DCU 1050 can be implemented, for example, as an executable procedure of the form:

PROCEDURE DISTRIBUTEABLE_UNIT(A,B, OA, OB);
VALUE A,B; OUTPUT OA,OB;
REAL A,B,OA,OB;

In such a representation, presented in pseudocode above, the procedure DISTRIBUTABLE_UNIT corresponds to a call to the DCU 1050, while the A and B values correspond to inputs to the procedure, and OA and OB are output values. Hence, execution of the DCU 1050 can be self-contained, and can use definable output values (e.g., values and/or arrays of other data structures) as desired. As noted above, stack component 1022 and any other memory required for the DCU 1050 may include an initial execution point, initial stack image, initial data contents, and a representation of what form the output will take and where it needs to be delivered to. One or more post delivery actions may be included as well. Furthermore, in alternative embodiments, it is possible to just pass A and B, but remove the VALUE A,B and OUTPUT OA, OB altogether. If the parameters are not passed by value, then they are passed by name (or reference), and when the DISTRIBUTABLE_UNIT procedure completes, the values of A and B are prepared for reflection back into the memory of host 1 (1002*a*).

As seen in FIG. 10C, once in the system memory 1006*b* of the second computing system 1002*b*, the executable code component 1052 can direct execution of the procedure 1016*a* by translating its instructions for execution by the processor 1004*b*. In such embodiments, a return control word can be included in a stack segment 1020, and which indicates a location to which control is transferred upon exiting a particular procedure, such as procedure 1016*a* that is part of the DCI 1050. While the procedure 1016*a* is interpreted and executed, the executable code component 1052 also updates the stack component 1022 as needed. In the event that the second computing system 1002*b* is an MCP-based system, memory can be allocated, the ASD table updated, and the program would continue on the second computing system 1002*b*.

Once execution of the procedure 1016*a* is completed on the second computing system, the DCU 1050, optionally via the executable code component 1052, returns the stack component 1022 to the first computing system 1002*a*. The stack component 1022, now modified, can be used to update the stack 1008*a* and/or system memory as needed. An example of such completion is illustrated in FIG. 10D. This can correspond to, for example, storing the results to a known location and passing a pointer to that known location to the first computing system 1002*a*, which initiated the distribution of DCU 1050.

It is noted that, in cases where it is likely that the procedure 1016*a* (representing a processor and memory bound portion of a task 1014) will be executed multiple times, and where the procedure 1016*a* is not self-modifying (e.g., based on architectural or operating system constraints of the first computing system 1002*a*), it may be possible that the procedure 1016*a* may be called multiple times by a task; as such, in some embodiments, the DCU 1050 is persisted on the second computing system 1050, and may be configured to receive only a subportion of the contents of the DCU for subsequent execution. For example, in some cases, only the stack component 1022 may need to be provided from the first computing system 1002*a* to the second computing system 1002*b*.

Still further, it is noted that, in some cases, other portions of the task 1014, such as procedures 1016*b*-*c*, may require the results of procedure 1016*a* for proper execution. In other words, there are likely to be data dependencies among portions of a task 1014, such that non-migrated portions of the task may rely on updated data that is a result of execution of migrated portions of the task. Accordingly, in some embodiments, the distribution application 1012 can manage, alongside operating system 1012, whether such data dependencies exist, and if so, how long to wait for results from the DCU 1050, or whether to deem the distributed procedure to have failed, resulting in re-execution of the distributed procedure, either by the second computing system 1002*b*, or the first computing system 1002*a*, or another computing system different from the source or original target system.

FIG. 11 illustrates a further system 1100 that represents a particular embodiment in which distributed computational units can be used in connection with a virtualization environment as discussed above in connection with FIGS. 1-8. In system 1100, four different platforms 1102*a*-*d* are shown, implementing example instruction set architectures and system implementations, in which the distributed computational unit concepts of FIGS. 9 and 10A-D are depicted. In the example shown, a first platform 1102*a* represents a platform implementing a particular configuration of the para-virtualization systems described above in connection with FIGS. 1-8. For example, in the implementation as shown, the platform 1102*a* includes a plurality of virtualized partitions, including an MCP partition 1104, an I/O service partition 1106, a Java service partition 1108, and an e-portal service partition 1110. The platform 1102*a* includes a partitioning layer 1112, as well as a plurality of interconnection components allowing the partitions to communicate with one another as discussed above, such as virtual NICs. The MCP partition 1104 represents the operational partition from which primary workloads are executed. Partitions 1104-1110 cooperate to provide a segmented, virtualized system in which the MCP partition 1104 may execute a task, while the remaining partitions may execute service tasks, such as for I/O operations, java-specific operations, or portal-based operations.

In example embodiments, any of partitions 1104-1110 can distribute DCUs 1150 to remote systems for execution and return of results to the platform 1102*a*. It is noted that, because the MCP partition is more likely to include tasks that include processor-bound and memory-bound procedures; as such, it may be that DCUs 1150 are primarily (but not necessarily exclusively) distributed from the MCP partition 1104.

The second, third, and fourth platforms 1102*b-d*, respectively, represent example destinations to which DCUs can be distributed for execution from the first platform 1102*a*. In the embodiment shown, the second platform 1102*b* implements a Windows-based or Linux-based operating system, shown as partitions 1103*b-d*, and is illustrated as receiving a DCU 1150. Similarly, the third and fourth platforms 1102*c-d* illustrate other platforms implementing Windows-based or Linux-based operating systems, and which can receive and execute DCUs 1150 as well.

Overall, through use of an arrangement such as the system 1100 of FIG. 11, a user of a virtual platform or other specialized computing arrangement can be implemented in which workload variability can be addressed by offloading at least a portion of the tasks hosted by the virtual partition on a separate platform in the event that resources of the platform 1102*a* are limited, or distributed among other partitions. Accordingly, it is noted that distribution of computational tasks can allow users of virtualized systems to distribute portions of the tasks executed on those systems to other, non-virtualized systems, or to other partitions of the virtualized system, without instantiating new virtualized systems on different platforms. Additionally, and as discussed above, due to the flexibility with which computing tasks can be offloaded, such reassignment of computing tasks and/or procedures can be provided across natively executing systems as well.

V. Distributed I/O Operations

Referring to FIGS. 12-15, it is noted that, in addition to distributing computational tasks among computing systems, using some of the mechanisms discussed herein, and in particular the virtualization systems discussed above, various other types of tasks can be redistributed among computing platforms. For example, in the examples illustrated in FIGS. 12-15, I/O operations can be distributed among computing systems such that various I/O's, such as disk access, communications, peripheral device communications, or other I/O operations, can be redistributed among platforms.

In example embodiments discussed herein, the redistribution of I/O operations utilizes the example virtualization systems of the present disclosure, such as the system discussed above in connection with FIGS. 1-8 and as shown as platform 1102*a* of FIG. 11, in which computing platforms may include a plurality of partitions including a dedicated I/O partition that is configured to manage all I/O operations for the platform, including all partitions thereon. Such partitions can intercommunicate to manage I/O operations among platforms, as further discussed below.

Figure 12:
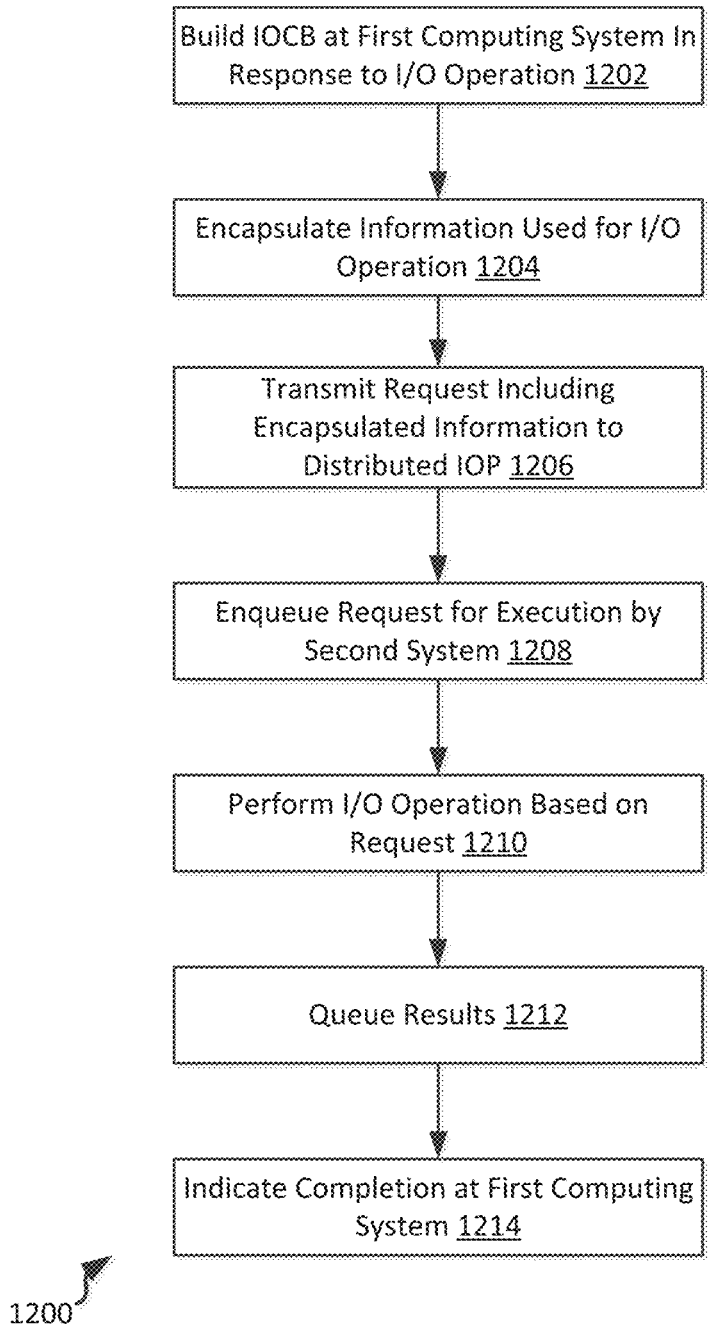
FIG. 12 illustrates a flowchart of a method for performing distributable I/O requests in a fabric computing environment from a source computing system, according to an example embodiment.

Referring now to FIG. 12, a flowchart of an example method 1200 for managing I/O operations in a distributed computing environment, according to an example embodiment of the present disclosure. Generally, method 1200 is performed, at least in part, by a computing system that is communicatively connected to a second computing system, such that either computing system can perform I/O operations as requested.

In the embodiment shown, a control block build operation 1202 controls building of an I/O control block at a computing system originating the I/O request. The I/O control block (IOCB) can be generated, for example, by an I/O service partition upon receipt of an I/O request from another partition in a virtualized computing system. This can include information used to specify a transfer of data, for example from a particular location in memory of address of a remote device. Generally, the IOCB describes everything the I/O subsystem may need to know about an I/O; in the case of fabric attached storage (storage that is not necessarily local at a platform but which includes files that are directly addressable within the fabric of computing systems, or "fabric-accessible files").

An encapsulation operation 1204 encapsulates the information in the IOCB, including any other information required to execute an I/O operation successfully, such as the source and destination computing systems of the IOCB, information regarding the location of the device associated with the I/O request, or any other information required.

A transmission operation 1206 transmits the IOCB and any other encapsulated information to a remote computing system that is capable of performing the I/O operation. The transmitting computing system also performs an enqueueing operation 1208, allowing the transmitting computing system's I/O service partition to track a status of the I/O operation. Upon completion of an execution operation 1210 at a remote system, the completed results are received from the remote system performing the I/O operation and queued for use by the requesting application, via queueing operation 1212. A completion indication operation 1214 indicates to the I/O service partition that the I/O operation has completed successfully, thereby allowing dequeueing of the I/O operation.

Figure 13:
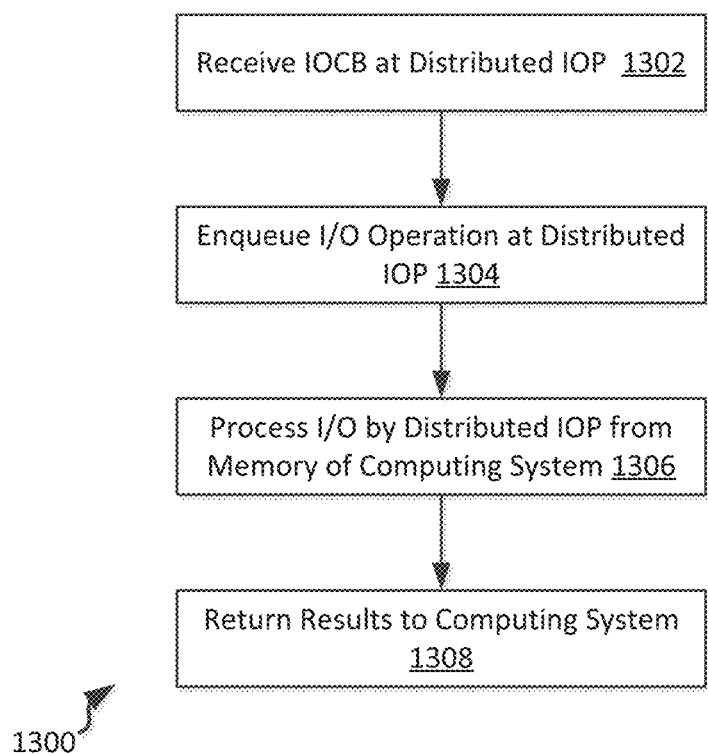
FIG. 13 illustrates a flowchart of a method for managing a distributable I/O request in a fabric computing environment at a remote computing system receiving the I/O request, according to an example embodiment.

Referring to FIG. 13, a flowchart of an example method 1300 for performing remote I/O operations in a distributed computing environment, according to an example embodiment. Generally, the method 1300 is performed at least in part by a distributed computing system that receives a request to perform a distributed I/O operation from a source of the I/O request. In other words, method 1300 is performed from the perspective of a receiving I/O service partition remote from the source I/O service partition performing the method 1200 of FIG. 12, above, and can be performed by a distributed I/O processor of such a service partition.

In the embodiment shown, the method 1300 includes a control block receipt operation 1302, which corresponds to receiving an IOCB or other information from a source computing system that may be required to perform a requested I/O operation. An enqueue operation 1304 enqueues the received I/O request for execution by the associated hardware or interface.

A processing operation 1306 performs the I/O operation requested by the I/O request. This can include, for example, performing one or more read or write operations to a file. For example, this can be performed via any of a number of mechanisms or interfaces, such as a remote direct memory access (RDMA) operation performed by the distributed processor that receives the I/O request for execution. The results of such a processing operation 1306 can optionally be queued and serviced, for example by returning a pointer to the results (or the results themselves) in a return operation 1308.

It is noted that, during operation of the methods 1200, 1300, the computing system originating the I/O request can continue execution of other tasks while a destination computing system receives, manages, and handles the I/O operations as indicated in the request. Accordingly, the computing system that originates the I/O request does not consume as many resources as would otherwise be required for I/O operations.

In some embodiments, the I/O operation can be a file access request. For example, and as discussed in further detail below, the I/O operation can relate to a "fabric-accessible" file, which corresponds to a file having a location that is uniquely identifiable or addressable across a plurality of partitions and platforms. In some such embodiments, the file identified by the file access request can be designated as a fabric-accessible file, for example by identifying the file both based on its name and address on a particular platform, but by the name and location of the platform as well. In example embodiments, the file can be sequential sequence of bytes, such as, for example, a stream file.

It is further noted that, to select the remote system to which the I/O request is transmitted, it may be optimal to transmit that I/O request to a remote system that hosts data, memory, or the I/O device to which the request is directed. For example, a file I/O (e.g., read or write) may be performed by the computing platform hosting the disk on which the file is stored. Other arrangements may be possible as well, for example hosting special-purpose peripheral devices at a particular platform, and offloading I/O requests to that remote computing system or platform.

Figure 14:
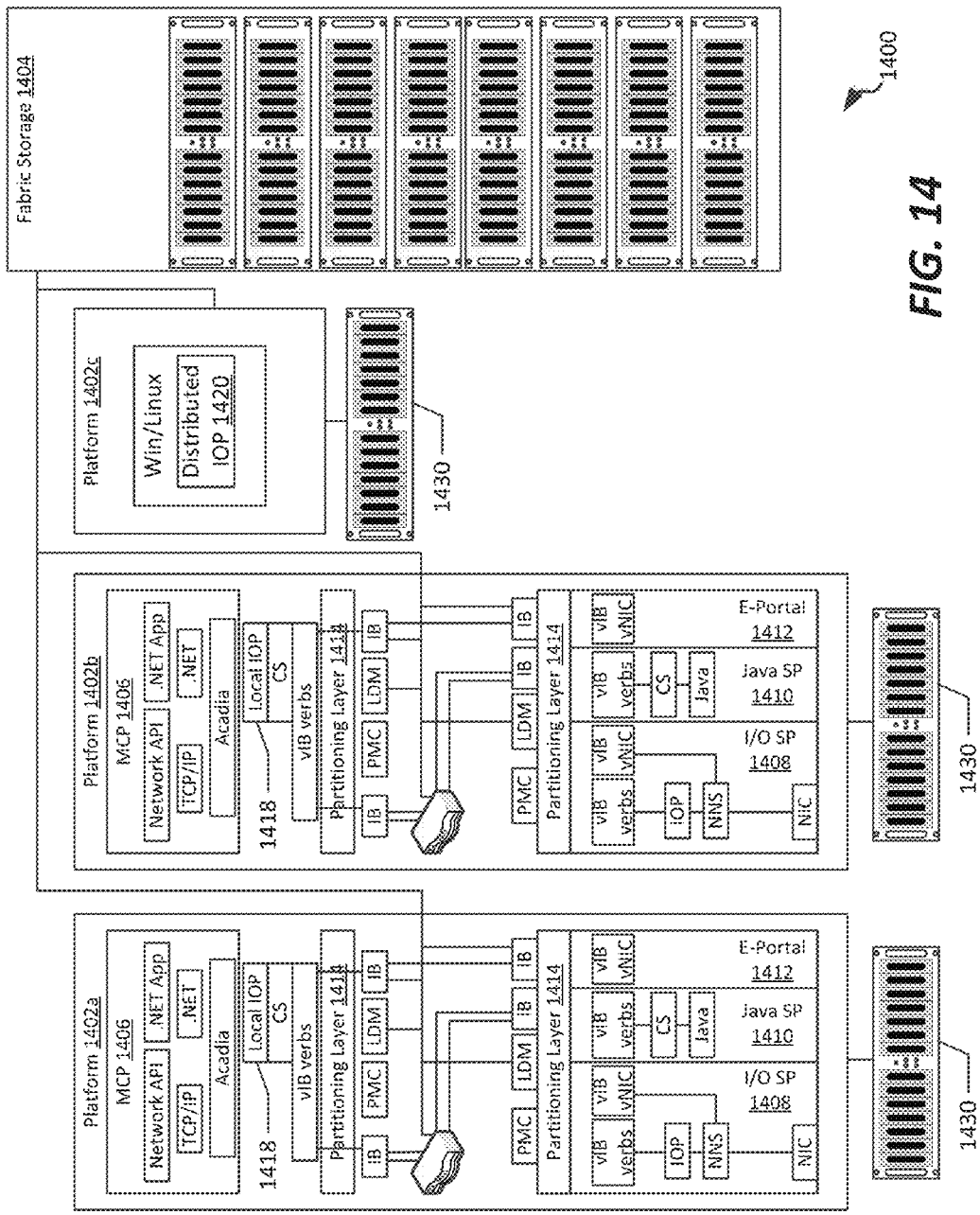
FIG. 14 illustrates an arrangement in which distributable I/O requests may be handled, including remote file systems and fabric addressable files, according to an example embodiment.

Referring now to FIG. 14, an example arrangement 1400 in which distributed I/O operations may be executed based on I/O requests received from a particular platform. In the example shown, a plurality of platforms 1402*a-c* are illustrated, and communicatively connected to each other and to a fabric storage system 1404.

Each of the plurality of platforms 1402*a-c* can take a variety of forms. In the embodiment shown, platforms 1402*a-b* are illustrated as hosting virtualized partitions, including respective MCP partitions 1406, as well as special purpose partitions including an I/O service partition 1408, a java service partition 1410, and an e-portal service partition 1412. Each of the partitions includes, among other features, a virtual network connection for intercommunication with other partitions and/or systems. The platform also includes underlying software, such as partitioning layers 1414 and interconnect modules 1416 allowing for point-to-point RDMA access among the platforms 1402*a-b*. Operation of such partitions, and interconnect technologies, can be implemented as discussed above in connection with FIGS. 1-8.

The platforms 1402*a-b* also include I/O processors, or IOPs 1418, which manage I/O requests that issue from each of the partitions, and for execution/management by the I/O service partition 1408 of the corresponding platform 1402*a-b*. It is noted that, in connection with the embodiments discussed herein, management by the I/O service partition may include directing the I/O request to a remote I/O service partition or remote IOP for handling.

By way of contrast, platform 1402*c* is illustrated as hosting a Windows-based or Linux-based system on which a distributed I/O processor, or distributed IOP 1420, can execute. The distributed IOP 1420 operates analogously to the IOPs 1418 of the MCP partitions 1418 of platforms 1402*a-b*, for management and handling of I/O operations, and distribution of such operations to I/O service partitions 1408 associated with storage of files.

Each of the platforms 1402*a-c* can be communicatively connected to local storage 1430, which can correspond to a dedicated set of disks or other local storage devices useable by the platform for either dedicated local data storage or storage of fabric-accessible files. As such, each of the platforms 1402*a-c* can act as a distributor of I/O requests to a remote platform, or can act as a recipient of such I/O requests for fabric-accessible files stored in the local storage 1430. Similarly, fabric storage 1404 can be configured to provide bulk, fabric-accessible file storage locations that can be accessed by any of the IOPs 1418, 1420 of the platforms 1402*a-c*. In the case of fabric-accessible files stored at fabric storage 1404, such IOPs 1418, 1420 can access such files as though in local storage. In other words, if a local IOP is present on a platform associated with storage (e.g., in the case of local storage 1430), I/O requests are routed to that IOP in a manner consistent with FIGS. 12-13, above. However, where no IOP may be present, such as in the case of the fabric storage 1404, each IOP must manage file access, locks, and read/write operations from the remote location, rather than distributing the I/O request to a remote IOP.

It is noted that, based on this example arrangement 1400, it may be possible for applications hosted by one operating system to easily access filed stored with and managed by a computing system using a different operating system as though those files are in local storage. This avoids much overhead that would otherwise be involved in the connectivity and file access process.

Referring now to FIGS. 15A-D, an example distributed I/O process is illustrated consistent with the arrangement discussed above in connection with FIGS. 12-13, and which can be performed in the arrangement 1400 or other analogous networked systems with which distributed I/O processing can be accomplished.

Figure 15A:
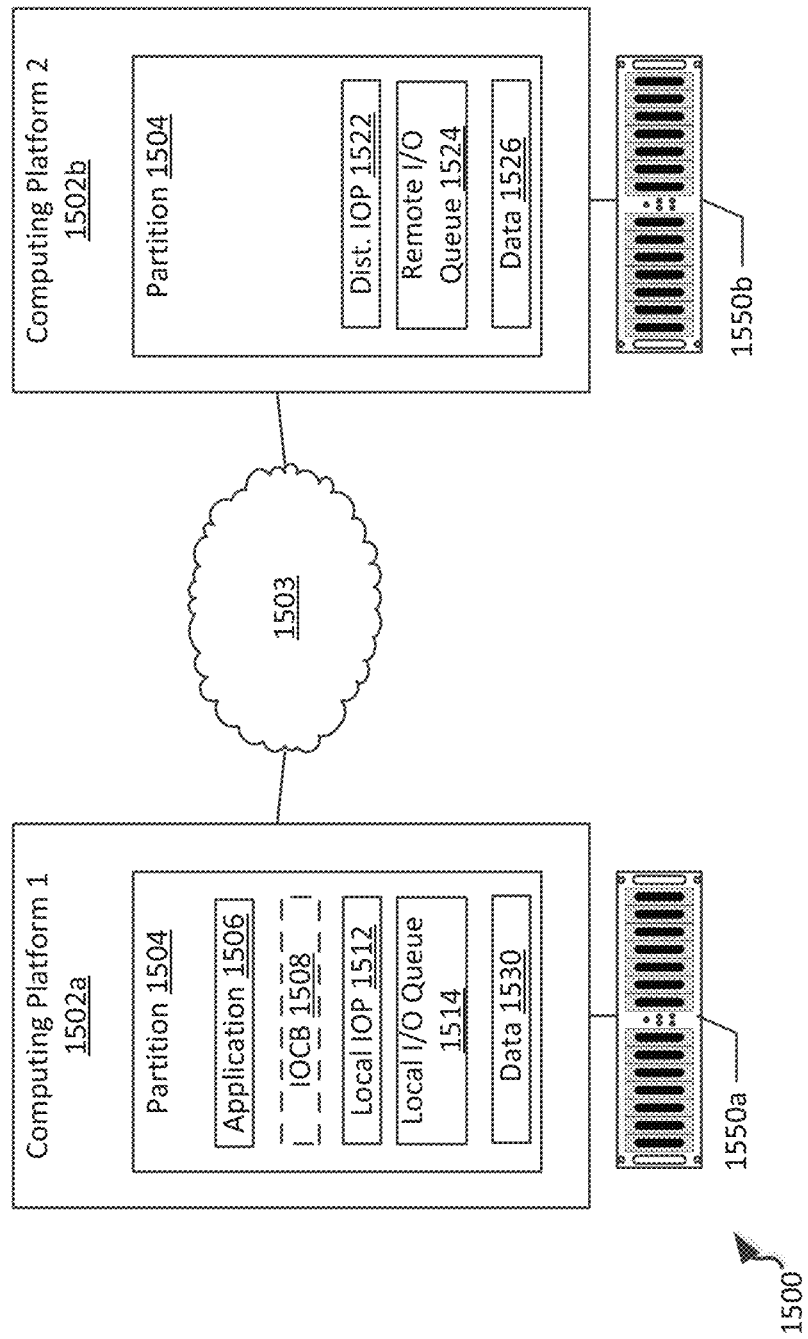
FIGS. 15A-D illustrate a sequence of operations in an arrangement illustrating first and second computing platforms and distributable I/O requests within a fabric computing environment, according to an example embodiment.
Figure 15B:
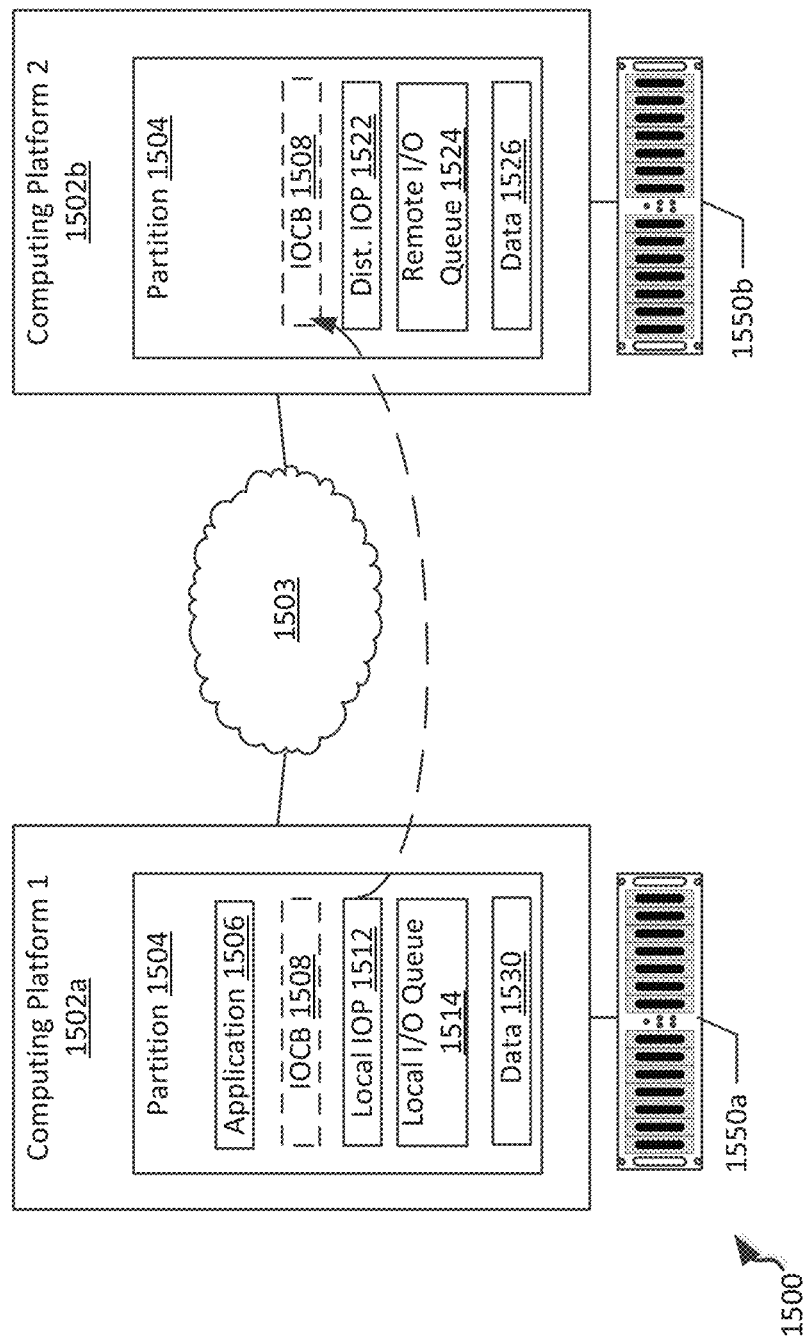

In the example shown in FIG. 15A, computing platforms 1502*a-b* are illustrated, each of which has a partition 1504 located thereon. In the example shown, the computing platforms 1502*a-b* are interconnected via a network 1503. A partition 1504 of a first computing platform 1502*a* may host an application 1506, which may request file read or write access, or otherwise include instructions which would implicate an I/O process. Both computing platforms 1502*a-b* include file storage devices, shown as devices 1550*a-b*, respectively, which correspond to disks or other storage devices accessible via I/O requests.

When such an I/O request is issued from the application 1506, an I/O control block (IOCB 1508) is built by the local operating system, and added to a queue 1510 associated with a local IOP 1512. The local IOP 1512 recognizes the I/O request as being associated with a fabric file, and in particular a fabric file that is stored at a remote computing system. Accordingly, local IOP 1512 transmits the IOCB to the remote computing platform hosting the file, in this case computing platform 1502*b* (seen in FIG. 15B), and enqueues the I/O request in a local I/O queue 1514.

Figure 15C:
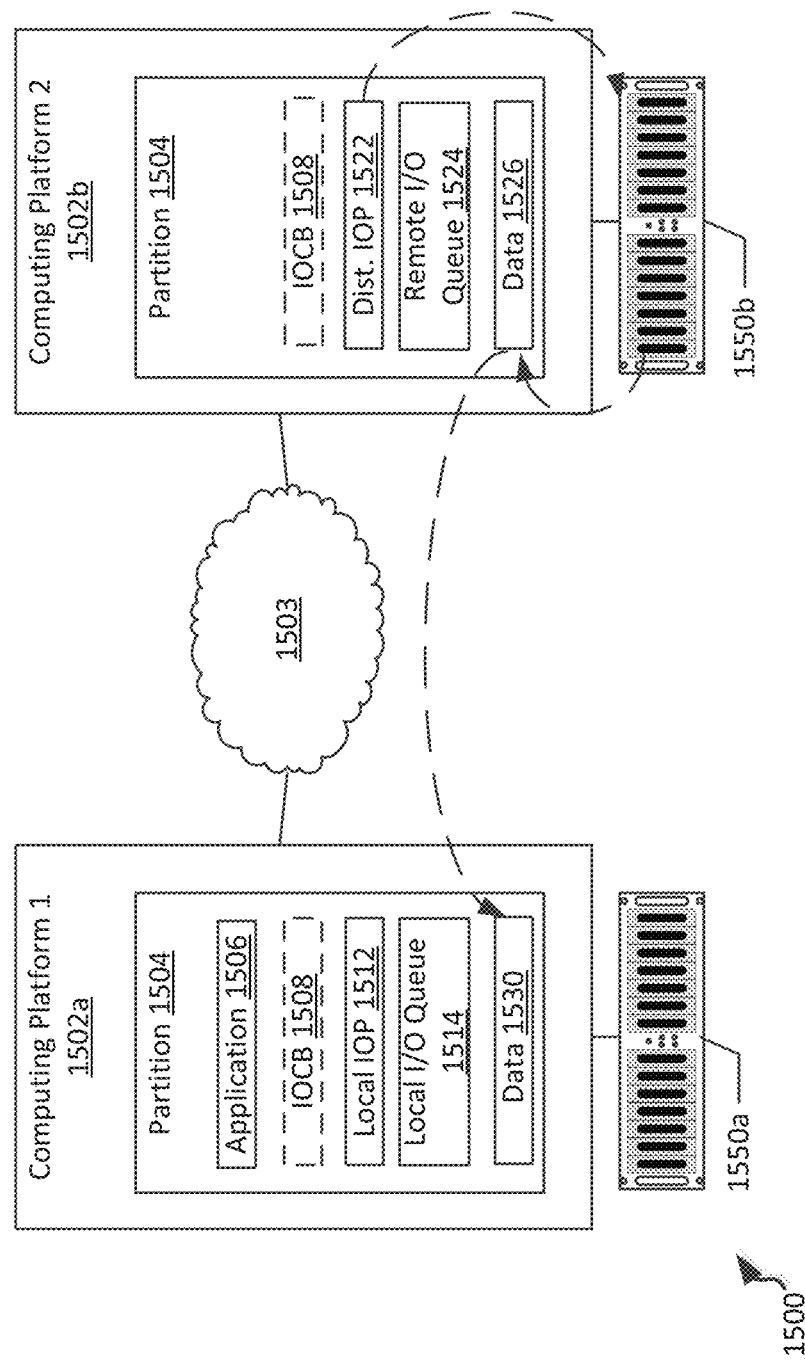
Figure 15D:
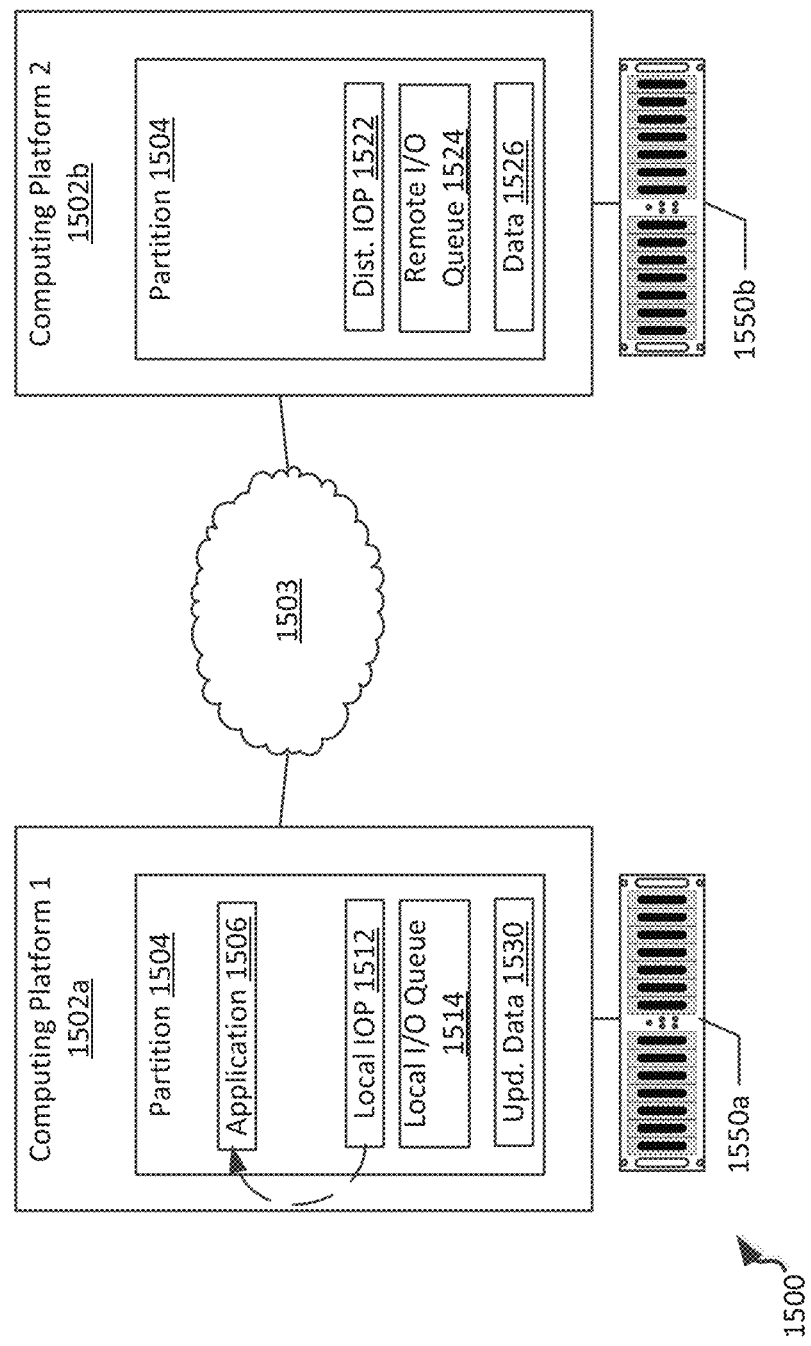

As illustrated in FIGS. 15A-D, computing platform 1502*b* includes a distributed IOP 1522, a remote I/O queue 1524, and remote data 1526 (e.g., remote results queue). As seen in FIG. 15C, the distributed IOP 1522, upon receipt of the IOCB 1508, can locally enqueue the IOCB in remote I/O queue 1524 until it is ready to process that I/O request. At that time, the distributed IOP 1522 uses the IOCB 1508 to access files from storage 1550*b*. The distributed IOP 1522 would transfer data from storage 1550*b* to memory 1526 of that distributed IOP 1522, which could then transfer the data to memory 1530 associated with the local IOP 1512, e.g., in the case of a read operation.

At this time, in the case of a file read, retrieved data can be analyzed to determine if a read of the file has been successful. If successful the operating system in partition 1504 of computing system 1502*a* can be used to finish I/O processing, and allow the application 1506 to continue execution. If, for some reason, the file access is not successful, notification can be provided to the distributed IOP 1522, which can manage local data read errors as would be conventional; once such data errors are corrected, the requesting computing system 1502*a* could be notified to resubmit an I/O request, or notified that the read or write has failed. Other error handling issues are handled similarly, with a local IOP managing file access and I/O errors associated with local storage 1550*a-b*. It is noted that, in the case of fabric storage, such as is shown in FIG. 14, a requesting IOP may manage I/O errors, since the fabric storage device may not include an IOP for handling such error events.

VI. Distributed File Access

Figure 16:
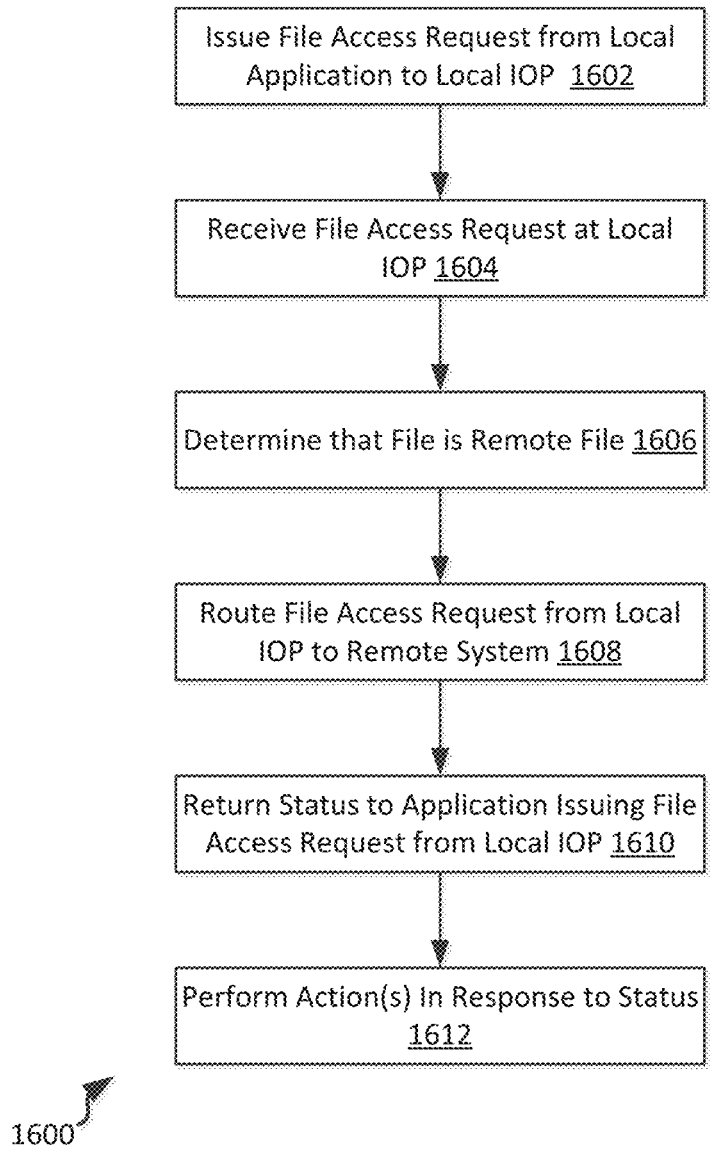
FIG. 16 illustrates a flowchart of a method for distributing file access requests within a fabric-addressable file system, according to an example embodiment.

Referring to FIGS. 16-17, example file access mechanisms are discussed in greater detail. Such file access mechanisms generally correspond closely to the I/O requests noted above in connection with FIGS. 12-15, but include specific error handling mechanisms for managing such failed read or write operations in the context of a fabric storage system that may be used in a continuous computing environment.

In the example illustrated in FIG. 16, a flowchart of a method 1600 for file access is illustrated in connection with example embodiments of the present disclosure. In the example shown, the method can be performed by a system or component receiving an I/O request that identifies a remote file as associated with the request. This can be, for example, a distributed partition or IOP that is associated with a fabric-accessible file, or other analogous arrangement.

It is noted that in some embodiments, for example those in which the computing systems of the present disclosure implement an MCP-based computing system, data access is accomplished by way of file access requests. Accordingly, in the example method 1600 as shown, a file access request issuance operation 1602 issues a file access request from a local application executing within a source partition, and delivers that file access request to a local IOP. The file access request can, in various embodiments, correspond to an open file request, a seek, read, write, delete, info, or other type of file access request.

A file access request handling operation 1604 receives and handles the file access request at a local I/O processor (IOP) of the platform on which the file access request is issued. The local IOP then determines that the fabric-accessible file is in fact a remote file via a remote file determination operation 1606. The local IOP executes a routing operation 1608 to route the file access request to a proper partition and platform hosting the fabric-accessible file identified by the file access request. A return operation 1610 returns a status of the file (e.g., opened, accessed, with data, written to, closed, error status, etc.)

From the return operation 1610, depending upon the results of the returned status, one or more additional actions may be performed by the computing system (action operation 1612), or may be assumed to be performed by a remote system. For example, in the event no error has occurred, processing can continue normally. However, when an error has occurred, the distributed IOP handling the file access request locally may attempt to recover from the error. In such cases, the distributed IOP may attempt to recover the error, for example using one or more backup or error recovery mechanisms available at the computing platform of that distributed IOP. Accordingly, in such cases, a warning status may be returned to the local IOP from the distributed IOP, indicating that the error occurred but was corrected. In some cases, the remote IOP can also provide a log of the error that occurred, as well as a mechanism by which the error was corrected. In other cases, an error may not be correctable, and accordingly, the remote IOP can only return log information regarding the error, but is unable to provide the data as requested (e.g., in the case of a file read operation).

FIGS. 17A-D illustrate an arrangement 1700 in which operation of the method 1600 is illustrated. In the example shown, two computing systems, shown as first computing system 1702*a* and second computing system 1702*b*, are communicatively connected via a network 1704. Each of the first and second computing systems 1702*a-b* have corresponding file storage systems 1706*a-b*.

Figure 17A:
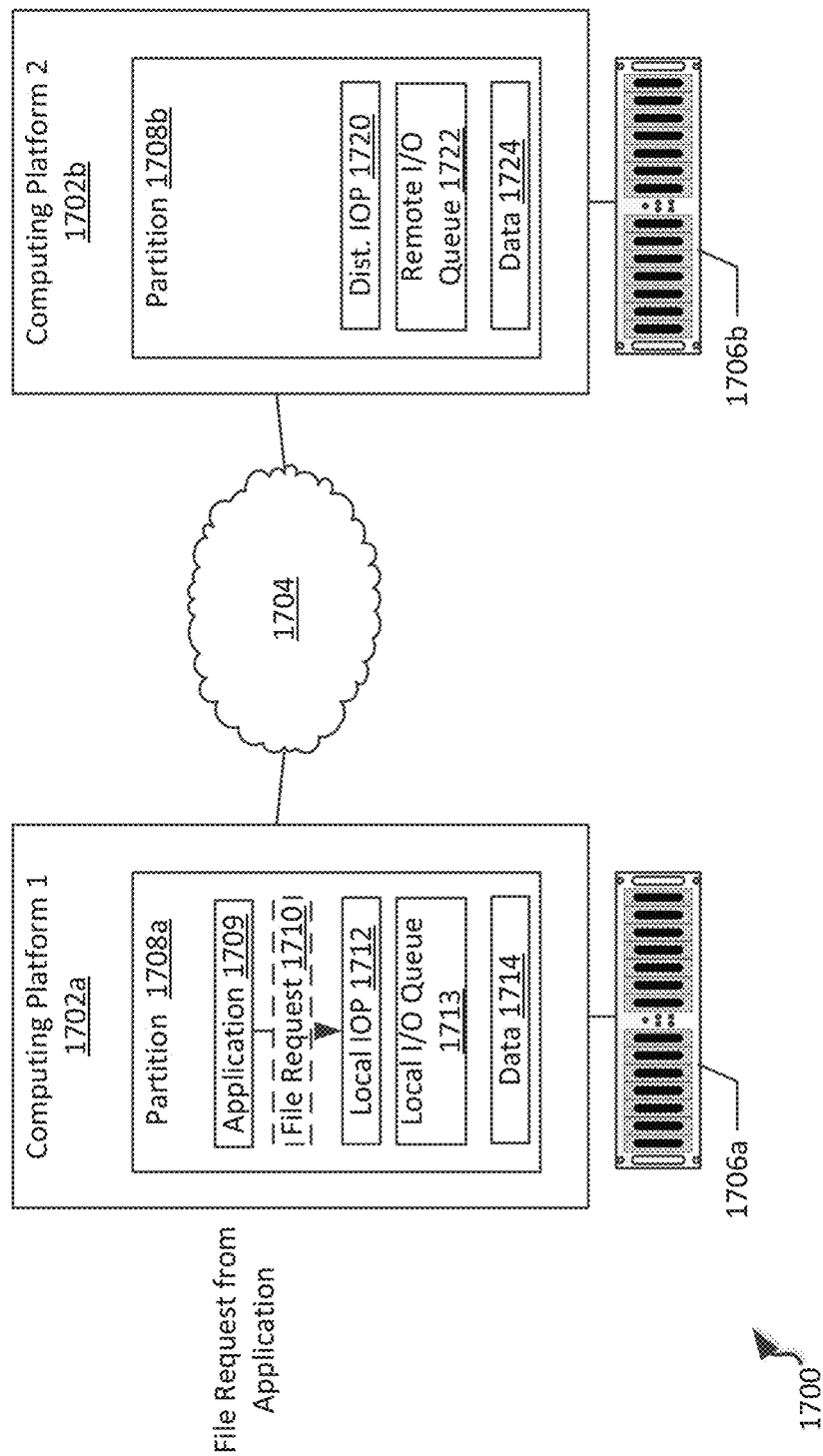
FIGS. 17A-D illustrate a sequence of operations in an arrangement illustrating first and second computing platforms and distributable file access requests within a fabric computing environment, according to an example embodiment.
Figure 17B:
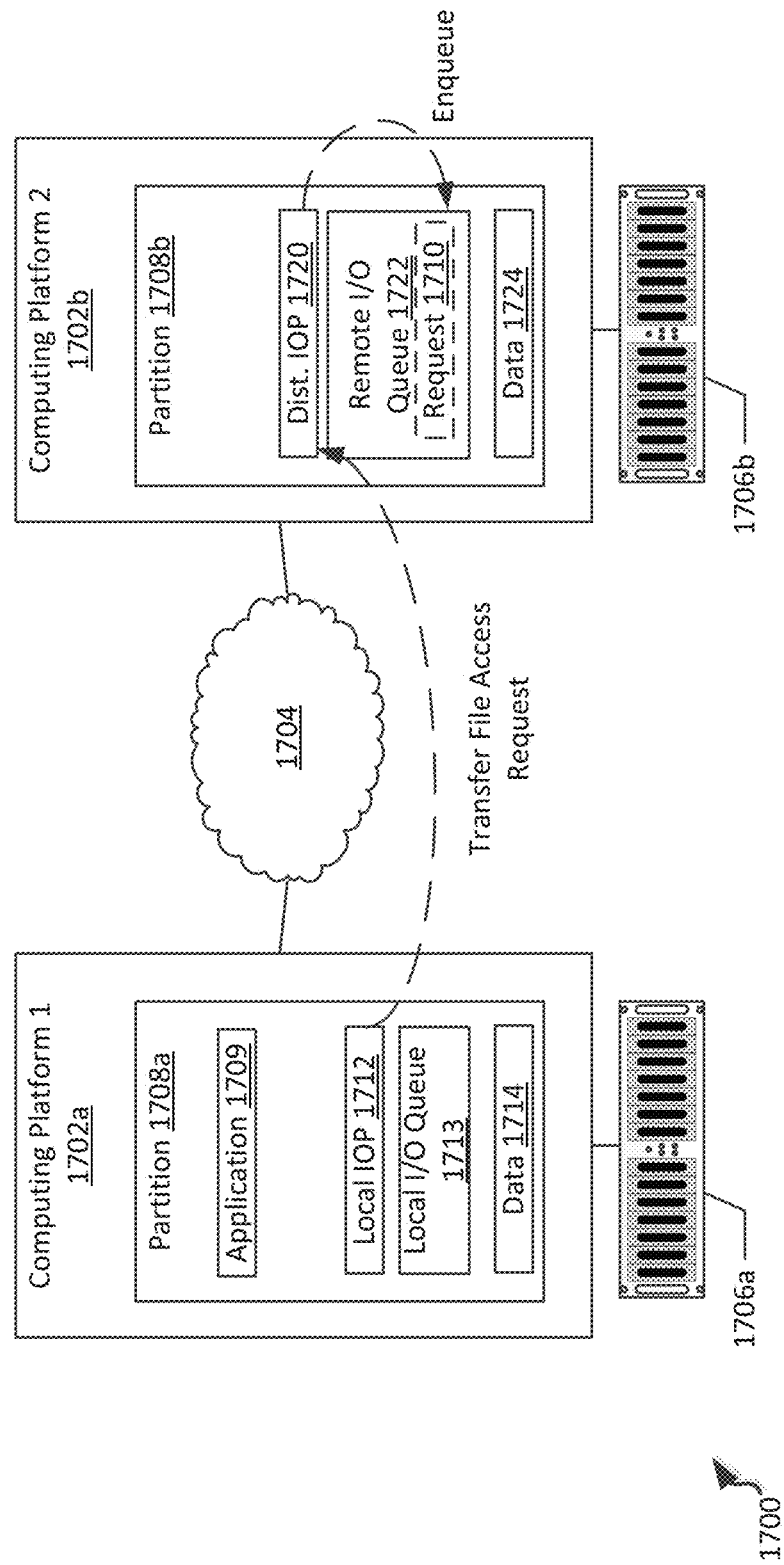

As illustrated in FIG. 17A, a partition 1708*a* on the first computing system 1702*a* includes an application 1709 that issues a file access request 1710 to a local I/O processor, IOP 1712. The local IOP 1712 determines that the file access request 1710 refers to a file in file storage system 1706*b*, associated with the second computing system 1702*b*, rather than in file storage system 1706*a*. Accordingly, and as illustrated in FIG. 17B, the local IOP 1712 routes the file access request to a distributed IOP 1720 within a separate partition 1708*b*, which queues the file access request in a remote queue 1722. Optionally, the local IOP also queues the file request in a local I/O queue 1713, so that the local IOP 1712 can track completion of the file access request when it receives returned status or results from the distributed IOP 1722.

Figure 17C:
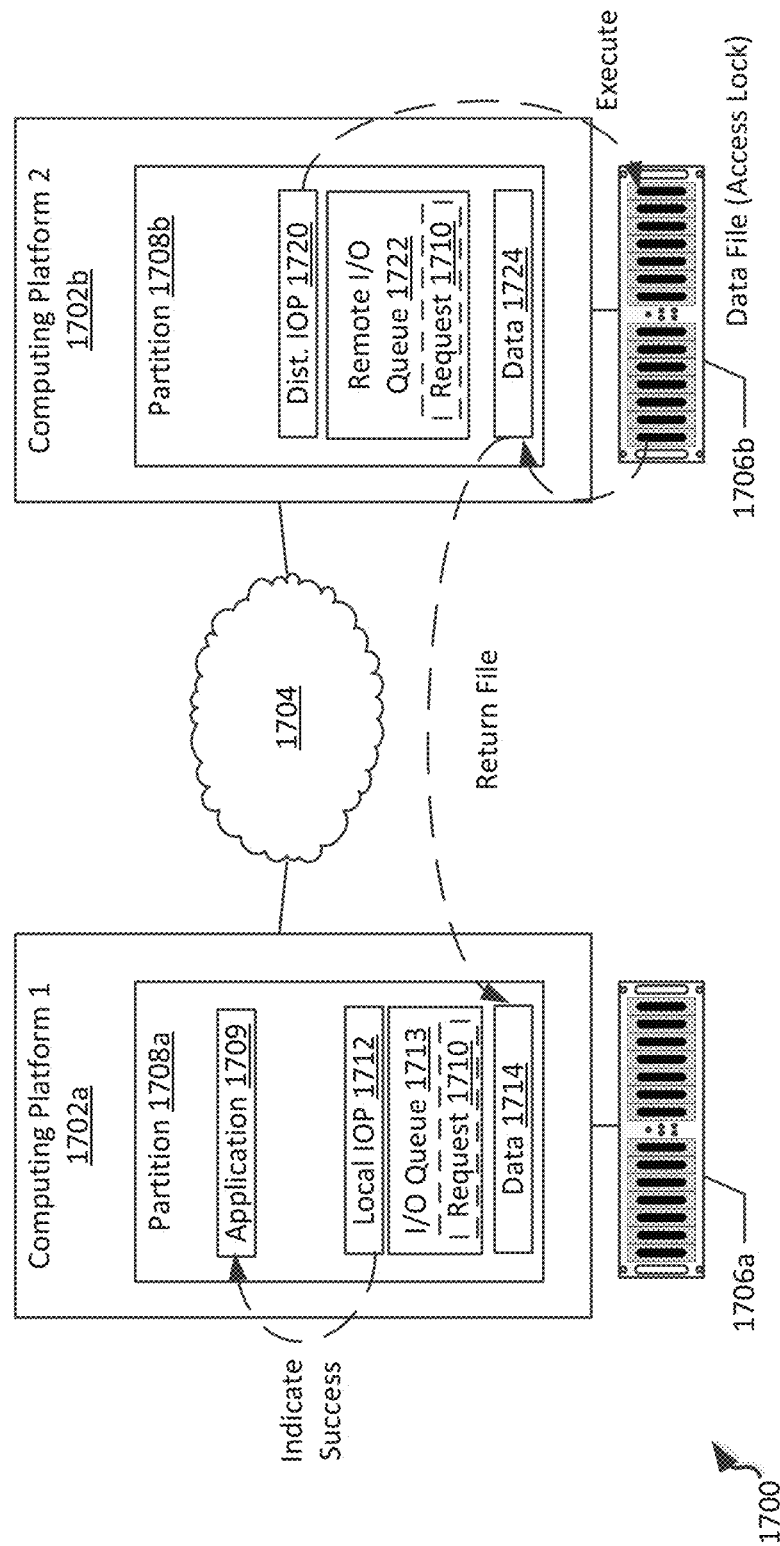

As illustrated in FIG. 17C, the distributed IOP 1722 accesses the file in the file storage system 1706*b*, and returns a status to the local IOP indicating success in accessing the file. The file is also returned to the first computing system 1702*a*, and the file request can then be dequeued from the local and remote I/O queues 1713, 1722. Optionally, if file access is a success, the file as stored in file storage system 1706*b* is indicated as locked, for example either by the distributed IOP 1722 or by storing a status bit associated with the file. The local IOP then indicates success in accessing the fabric-accessible file to the application 1709.

Figure 17D:
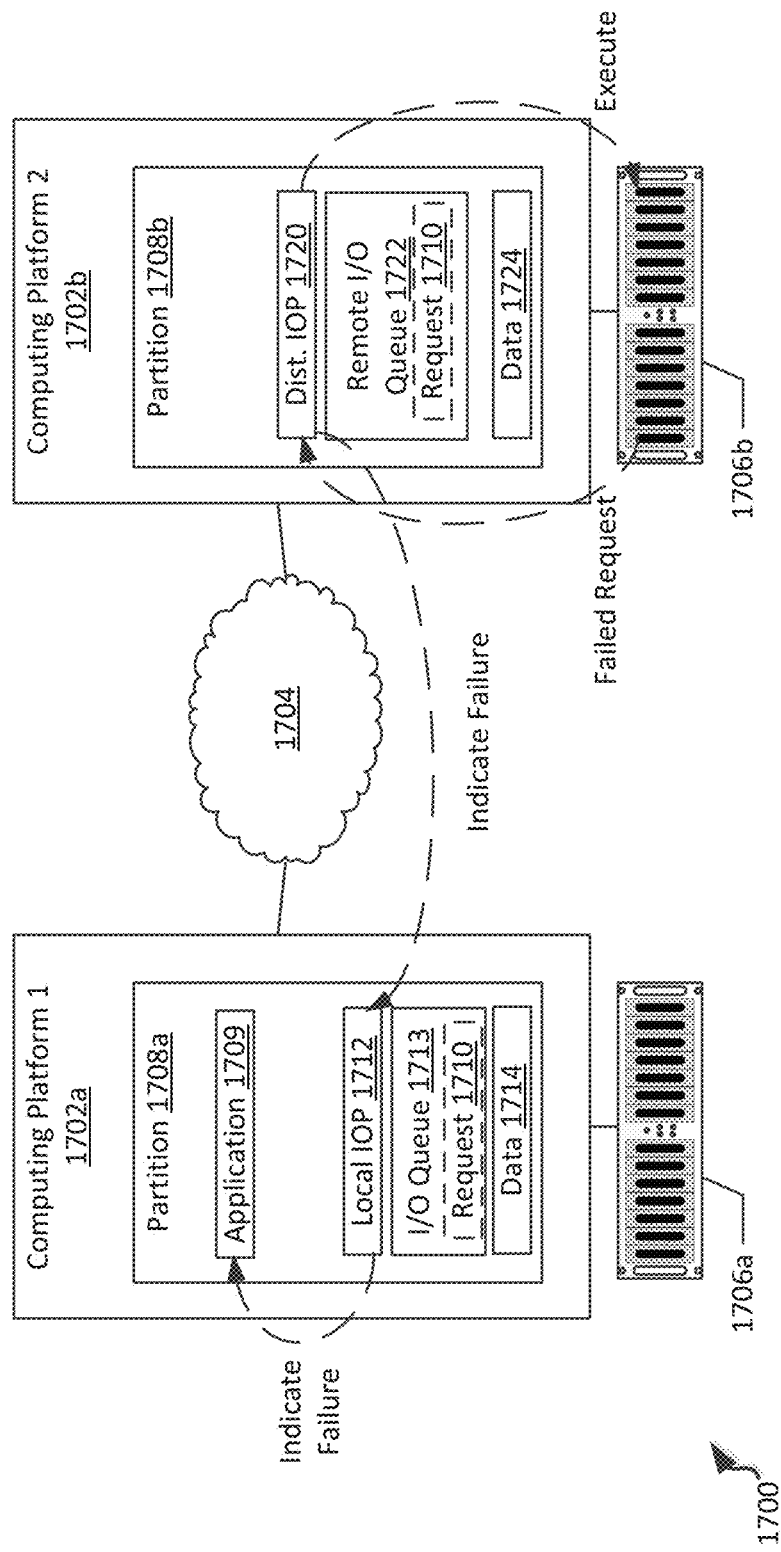

As illustrated in FIG. 17D, in the case the file access request performed by the distributed IOP 1722 fails. In particular, in the case that the file access in file storage system 1706*b* is not successful, the distributed IOP 1722 receives an indication of a failed access. The distributed IOP 1722 may then retry the file access, or in the event of a failure, may cause an operating system within partition 1708*b* to log the failed access attempt. The distributed IOP then transmits an appropriate status to the local IOP 1712 (e.g., failed and correctable or uncorrectable, and including the data if correctable), and optionally sharing the log created within partition 1706*b*, from data memory 1724. The file requested can optionally be copied into local data memory 1714. Once complete, the file access request can be dequeued from the local and remote I/O queues 1713, 1722.

Overall, referring to FIG. 16 as well as FIGS. 17A-D, and as is apparent from the above description, it is noted that regardless of whether the file requested by the application 1709 is a local file or a fabric accessible file stored at a remote or distributed system, the local IOP 1712 provides the interface to the application 1709 in each case, such that, to the application, there is no difference between accesses of each file. As such, fabric-accessible files can be used, for example in connection with remote and/or virtualized systems, for file access in an arrangement that is obscured from applications requesting and/or consuming that data, including operating systems and/or applications executing thereon.

VII. Continuous Computing

Referring now to FIGS. 18-23, it is noted that, in some cases, additional flexibility regarding the types of tasks or features that can be distributed across computing systems may be desired. In such embodiments, it may be advisable to use commodity hardware and systems capable of compatible execution. Accordingly, referring to FIGS. 18-23, additional example embodiments are illustrated that represent further continuous and distributed computing arrangements. In general, the examples of FIGS. 18-23 illustrate ways in which tasks, portions of tasks, or other workloads could be migrated among computing systems or partitions of a distributed, virtualized computing system, in a manner that provides improved portability of those executable tasks, while reducing the amount of information that may be required to be transmitted relative to the distributed computational units described above.

As further described below, methods and systems for redistribution of tasks across partitions and platforms are described, as well as failure detection and recovery mechanisms that allow for improved continuous computing arrangements. As are further described below, tasks can be exported to different partitions for execution, and, if errors in execution occur, the task may fail (or be recovered) without requiring failure of the partition in which that task is performed. Accordingly, recovery time from such failures on either hardware or virtualized systems may be reduced.

Figure 18:
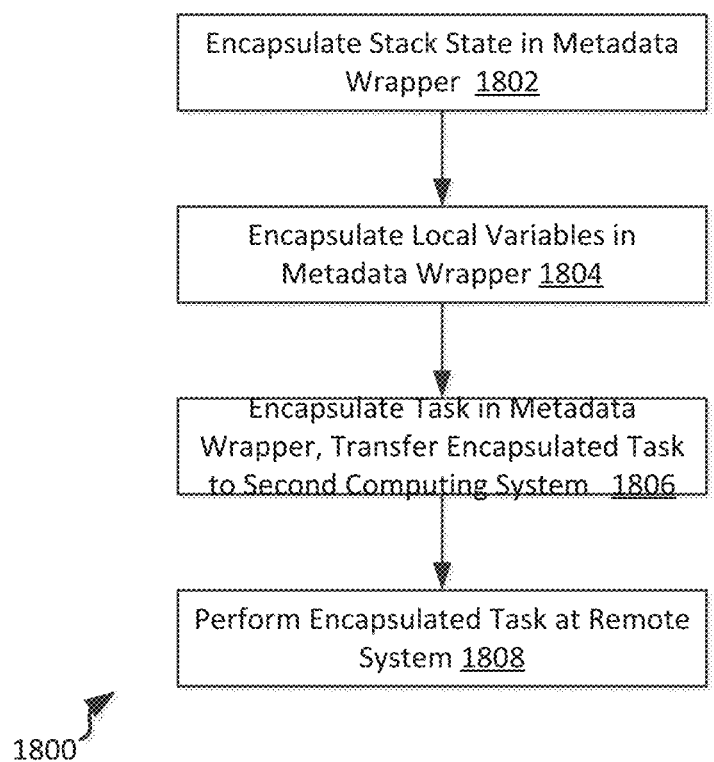
FIG. 18 illustrates a flowchart of a method for distributing tasks and/or applications within a fabric computing environment to provide continuous computational availability, according to an example embodiment.

Referring first to FIG. 18, a flowchart of an example method 1800 for executing a continuous computing task in a distributed computing environment is shown. The method 1800 can be performed, for example, in a distributed, virtualized environment such as that discussed above in connection with FIGS. 1-8.

Generally, the method 1800 is performed relative to tasks that are identified as being capable of being moved from a first computing platform or partition to a second platform or partition, where both platforms or partitions have a compatible architecture. For example, both platforms may be capable of executing instructions in a common instruction set or language, and move resulting data in the same way. Once a task is identified and designated to be offloaded from a particular platform or partition, in the example shown, a plurality of encapsulation operations 1802-1806 are executed. The stack encapsulation operation 1802 encapsulates a stack state in a metadata wrapper, while the variable encapsulation operation 1804 encapsulates local variables in a metadata wrapper. Similarly, a task encapsulation operation 1806 encapsulates the task itself, including instructions and data from memory, in a metadata wrapper.

In general, the metadata wrappers applied in operations 1802-1806 define a relationship between the data being wrapped and an architecture and state of the computing system on which that data is stored and/or executed. In some cases, the metadata wrappers can define a relationship between a first architecture of a source computing system and a second architecture of a destination computing system, to the extent such architectures have minor differences in execution or instruction sets. For example, in the case of the stack encapsulation operation 1802, the encapsulation can include information about the stack components being encapsulated, such as the size addresses, order of the stack, and any other local variables present on an originating partition that may be required on a destination partition for proper operation of the task. Similarly, the variable encapsulation operation 1804 labels each variable in memory that is intended to be used by the task, as well as any addresses where the task expects the variable to be stored, a name, size, data type or other characteristics of each variable or other data definitions. Likewise, the task encapsulation operation 1806 includes labels associated with the task instructions, such as an instruction set used, amount of memory required, addresses expected to be used by the task, operating system resources required of the task for proper execution (e.g., to ensure correct interrupts or other operating system handling mechanisms are available).

In example embodiments, the variable encapsulation operation 1804 uses XML to describe the data being sent. For example, a word on the stack may contain a reference to a specific instruction where control must be returned to (like when returning from a call), but it is abstracted such that a proper reference can be constructed when reconstituted in the target machine.

It is noted that encapsulation of each of the stack state, local variables, and task can take any of a number of forms. In an example embodiment, the encapsulation can be accomplished using a markup language labeling format, such as by storing the task and associated data in an XML file. An example of such a data file is illustrated in FIG. 20, described in further detail below.

Once the task, associated variables, and stack are encapsulated, the encapsulated information is transferred to a second computing system in a transfer operation. The second computing system corresponds to an intended destination system for the task to be distributed for execution. In example embodiments, transfer occurs in conjunction with the task encapsulation operation 1806; in alternative embodiments, this can occur separately and subsequently to task encapsulation. An execution operation 1810 corresponds to execution of the distributed task as the receiving computing system.

Figure 19A:
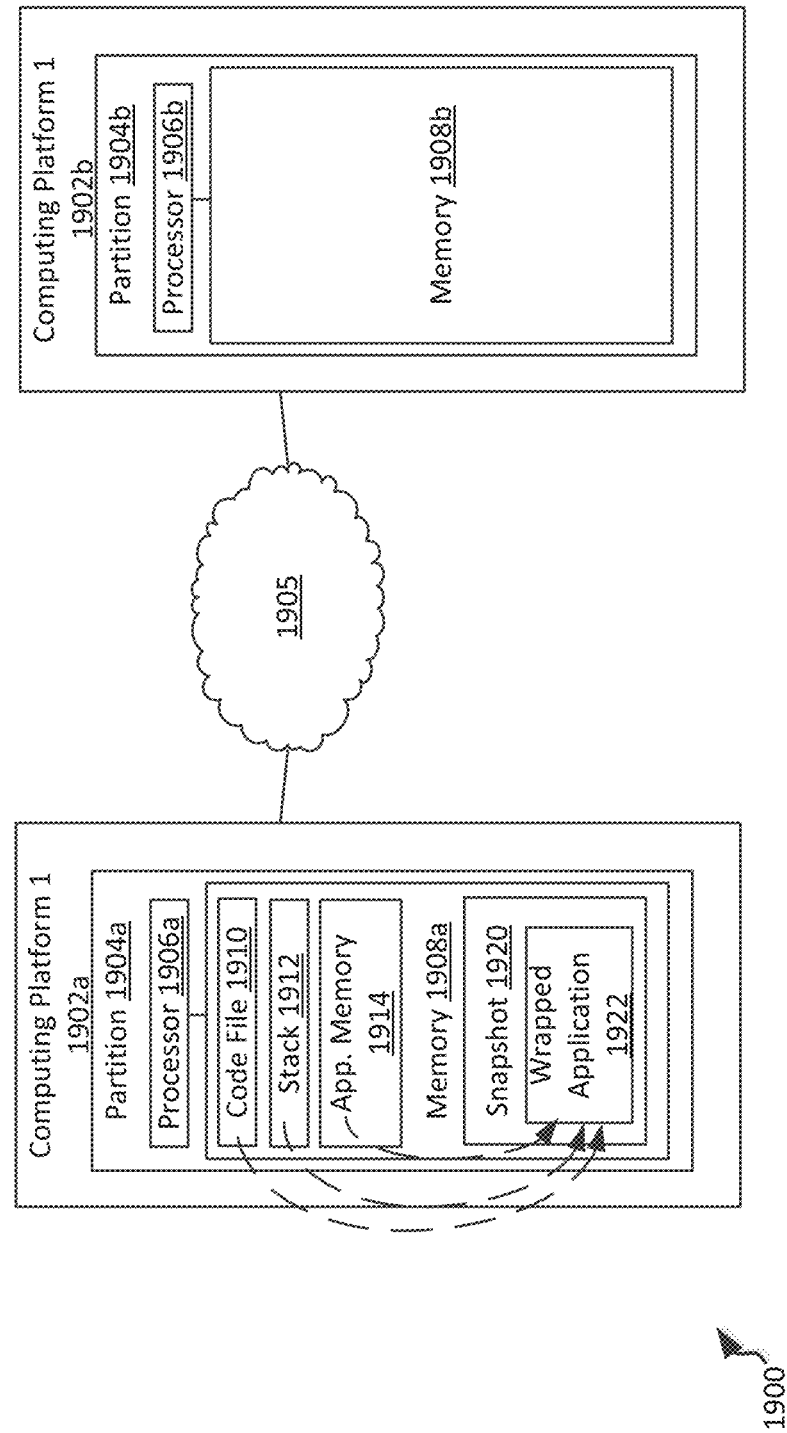
FIGS. 19A-C illustrate a sequence of operations in an arrangement illustrating first and second computing platforms and task migration among those computing platforms within a fabric computing environment, according to an example embodiment.
Figure 19B:
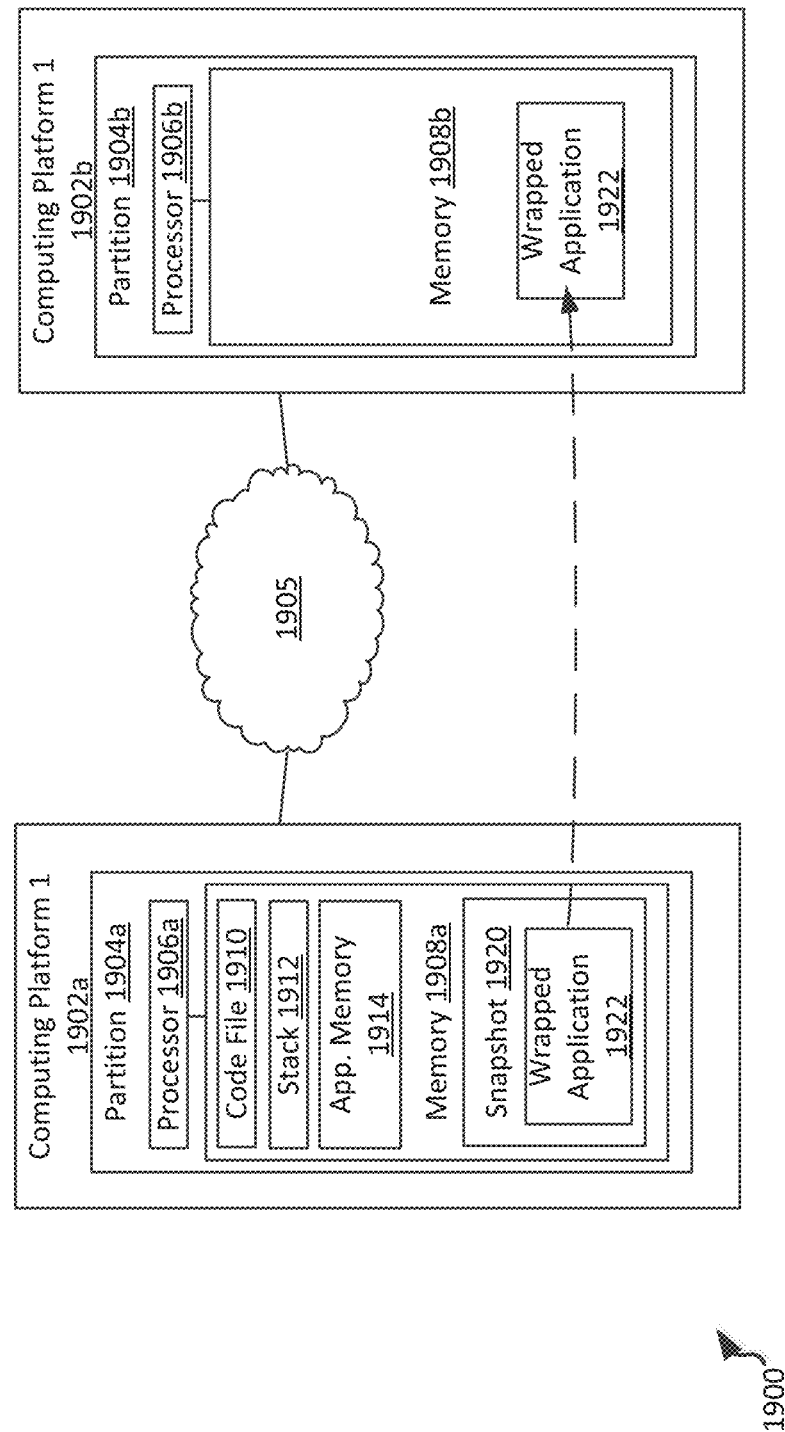
Figure 19C:
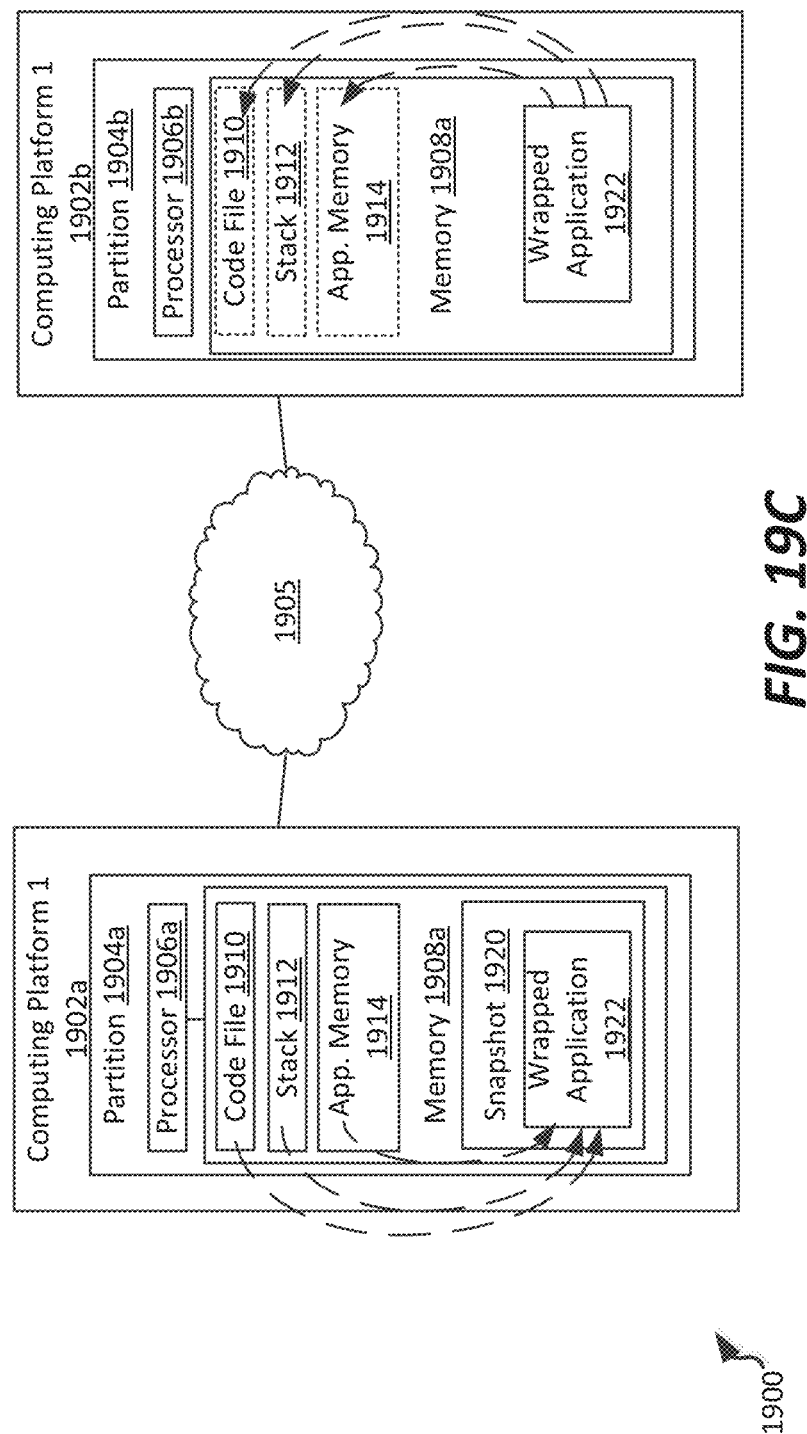

Referring to FIGS. 19A-C, an example illustration of migration of a task is illustrated. In general, capturing a state of a task to move that task to a remote system allows the task to move among heterogeneous host computing systems while maintaining all state information. Although discussed as heterogeneous systems, the systems among which the task can be distributed generally include compatible instruction set architectures or are capable of hosting virtualization systems having compatible instruction set architectures (e.g., having at least a base of instructions that are common among the two architectures).

As seen in FIG. 19A, each of computing systems 1902*a-b* have partitions 1904*a-b* instantiated thereon, respectively, and are communicatively interconnected, for example via a network 1905. Each partition is allocated a processor 1906*a-b* as well as corresponding memory 1908*a-b*, respectively. In the example shown, processor 1906*a* executes an application, for example from a code file 1910, using stack memory 1912 for temporary system calculations and application memory 1914 for local variables used by the application for execution. In the embodiment shown, an encapsulation operation encapsulates, in a collection of data 1920, a "wrapped" code file 1922 in bytestream form. The wrapped code file 1922 corresponds to an XML-annotated bytestream of instructions and data executable on the second computing system 1902*b*, via processor 1906*b*.

In FIG. 19B, the wrapped code file 1922 is transferred to memory 1908b of the second partition 1904b of the second computing system 1902b. The wrapped code file 1922 then is populated into the memory 1908b of the second computing system 1902b, as allocated to partition 1904b, shown in FIG. 19C. Because the application is placed into a state analogous to its state on the first computing system 1902a, the code file 1910 can then be directly executed within the partition 1908b as if it were executing on computing system 1902a.

Referring to FIG. 20, an example schematic illustration of a wrapped file 2000 that is distributed from a source computing system to a destination computing system at which the task is to be performed. Generally, the wrapped file can define a wrapped bytestream or code file representing application instructions, and is annotated using a markup language to identify the various portions of that application, as well as any resources required of the application. For example, in the wrapped file 2000 as shown, the markup language metadata describing the application that is wrapped can define the source system, a source processor (including its instruction set architecture and version of instructions it executes, if applicable), a name and location of the application, as well as instructions included in that application, a memory space that the application expects to operate within, including at least a portion of a stack in a current stack state, as would be available to the application, and a memory space and contents of memory available to the application. It is noted that other types of tags, for example to identify a particular manner of resource utilization, workload priority, or other features of a particular task or application could be identified by the wrapping metadata included in the file 2000.

It is noted that the workload migration arrangement discussed above has a number of advantages over existing systems, and in particular existing virtualization systems. For example, in many existing virtualization systems, an entire partition can be migrated between platforms; however, once that partition is running and has instantiated within it a number of applications, those applications are not separable. In other words, the partition itself can be migrated to a different platform, but the applications on that partition cannot be separately migrated to other partitions in a straightforward manner. Accordingly, if maintenance needs to be performed on the partition (e.g., updating an operating system or virtualization engine associated with that partition), typically the partition would need to be recreated, or at the very least the partition would need to be halted and execution of all applications hosted on that partition would be interrupted.

Using the task migration concepts discussed herein, it is noted that various tasks could be migrated off of a partition, such that the partition could be updated while those tasks continue execution on a different partition. The tasks could then be restored to the original partition, or to a different partition, as desired. Still further, by subsequently performing such updates on the remaining partitions 2002b-c, it may be possible to do a full system update while avoiding even a momentary halt in execution of tasks within the fabric.

Furthermore it is noted that, because tasks can readily be redistributed among partitions and their state captured at any particular moment in time during execution, additional error recovery or debug techniques can be performed using the wrapped applications discussed herein. Accordingly, FIGS. 21-23 illustrate some example arrangements for maintenance and error recovery that utilize the task wrapping and other continuous computing concepts described herein.

Referring now to FIGS. 21A-D, an arrangement 2100 is shown illustrating migration of tasks across platforms, including migration of tasks off a platform to allow for updates to that platform while the tasks continue execution on other platforms. In the arrangement 2100 as illustrated, a plurality of platforms 2102a-c are depicted, and connected to fabric storage 2104. The platforms 2012a-c each have a plurality of tasks executing thereon. Although not specifically depicted, the platforms 2012a-c can also include one or more partitions associated with computing resources of those partitions and hosting the tasks as shown in one or more such partitions. Example arrangements in which such partitions are formed are discussed above in connection with FIGS. 1-8.

Figure 21A:
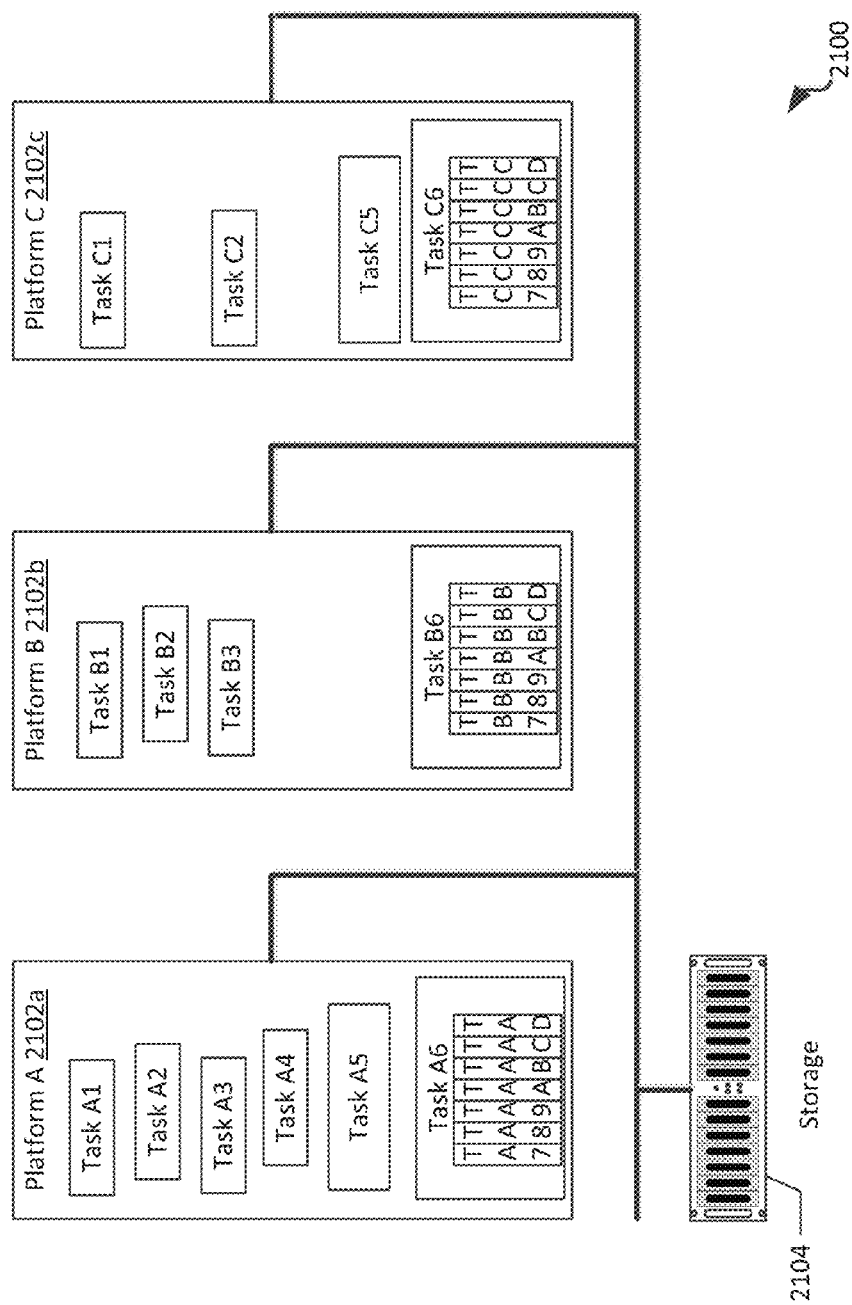
FIGS. 21A-D illustrate a sequence of operations in an arrangement illustrating virtualized fabric computing platforms and partitions, as well as task migration among those computing platforms within a fabric computing environment, according to an example embodiment.
Figure 21B:
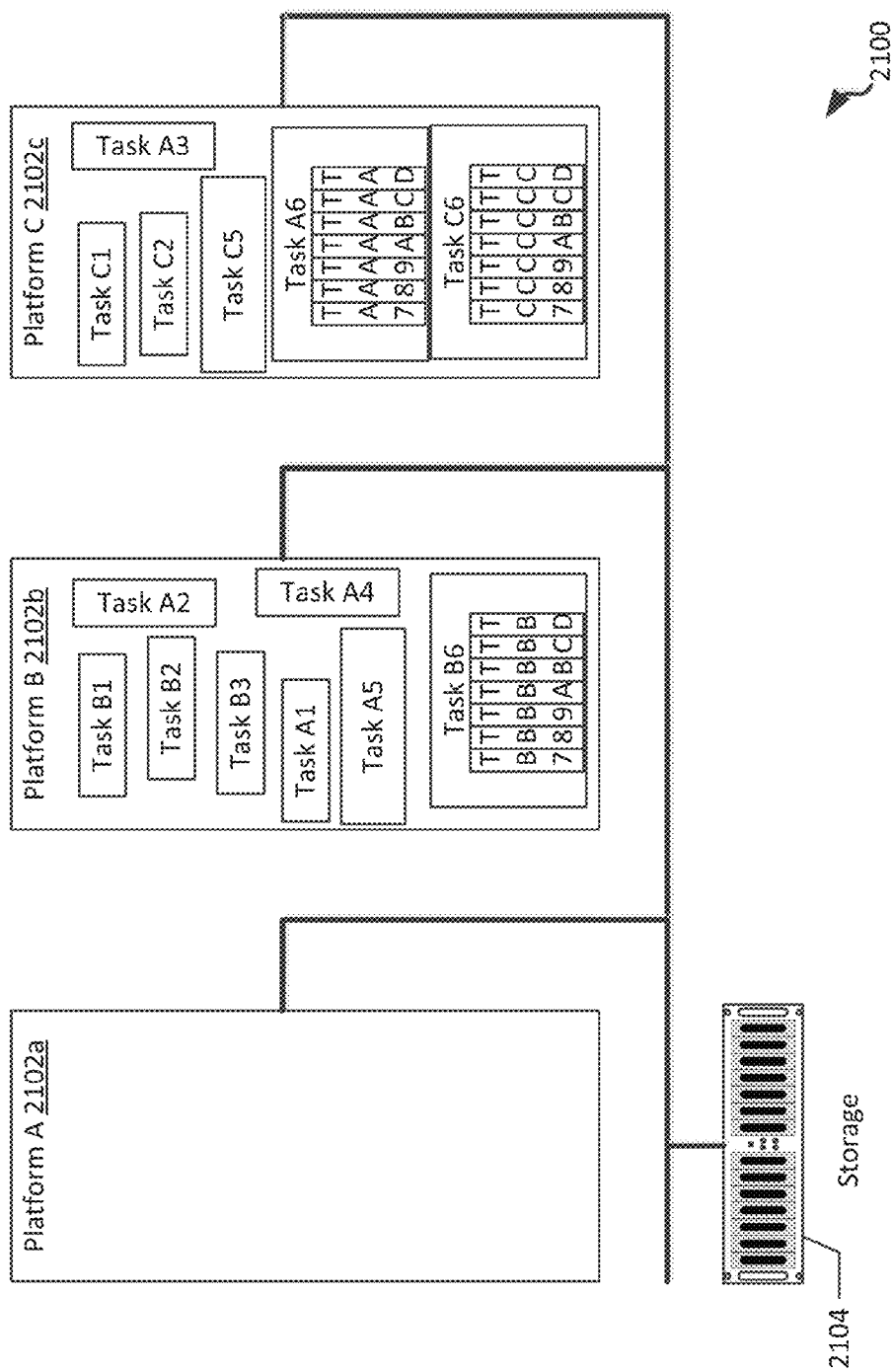
Figure 22:
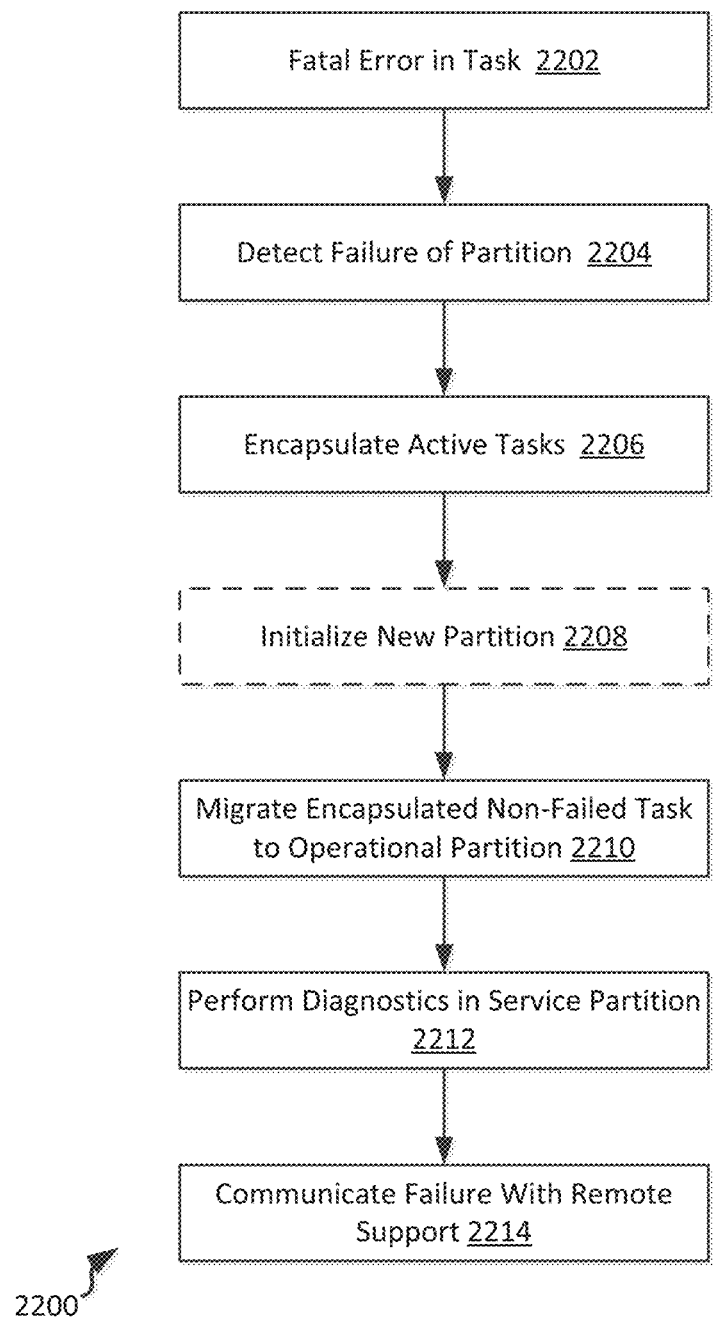
FIG. 22 illustrates a flowchart of a method for error recovery and debug using the task or application wrapping features of FIGS. 18-21, according to an example embodiment.

In the example shown in FIG. 21A, each of the platforms 2102a-c host their own tasks, such that platform A 2102a hosts tasks A1-A6, platform B 2102b hosts tasks B1-B6, and platform C 2102c hosts tasks C1-C6. Other numbers or arrangements of tasks could be used as well. As seen in FIG. 21B, each of the tasks of any of the platforms, in this case platform A 2102a, can be wrapped and transferred to a different platform. In the example shown, tasks A1-A2, and A4 are transferred to platform B 2102b, while tasks A3 and A6 are transferred to platform C 2102c. Accordingly, it is noted that tasks from platform A 2102a can be redistributed across multiple platforms.

Figure 21C:
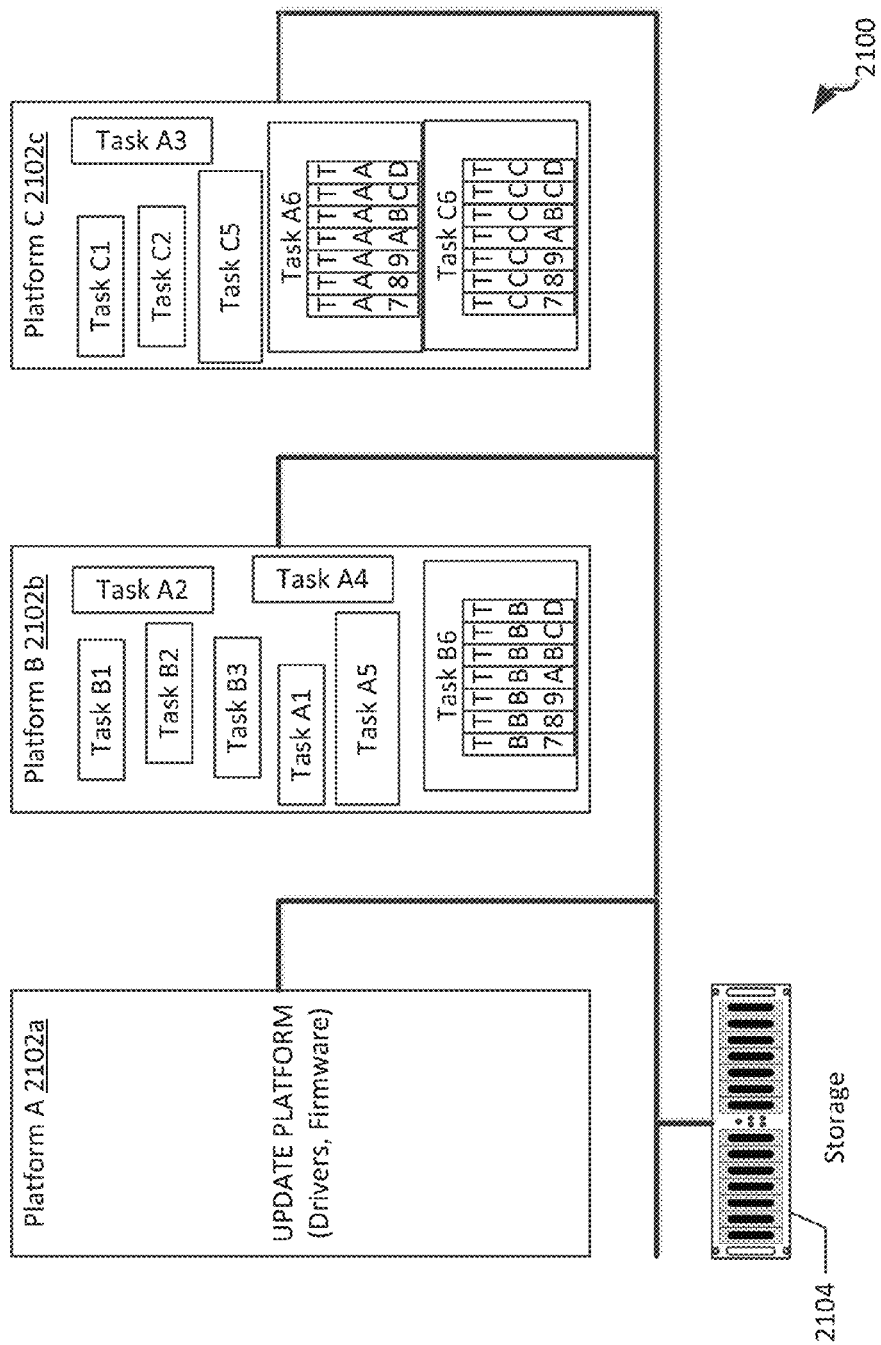
Figure 21D:
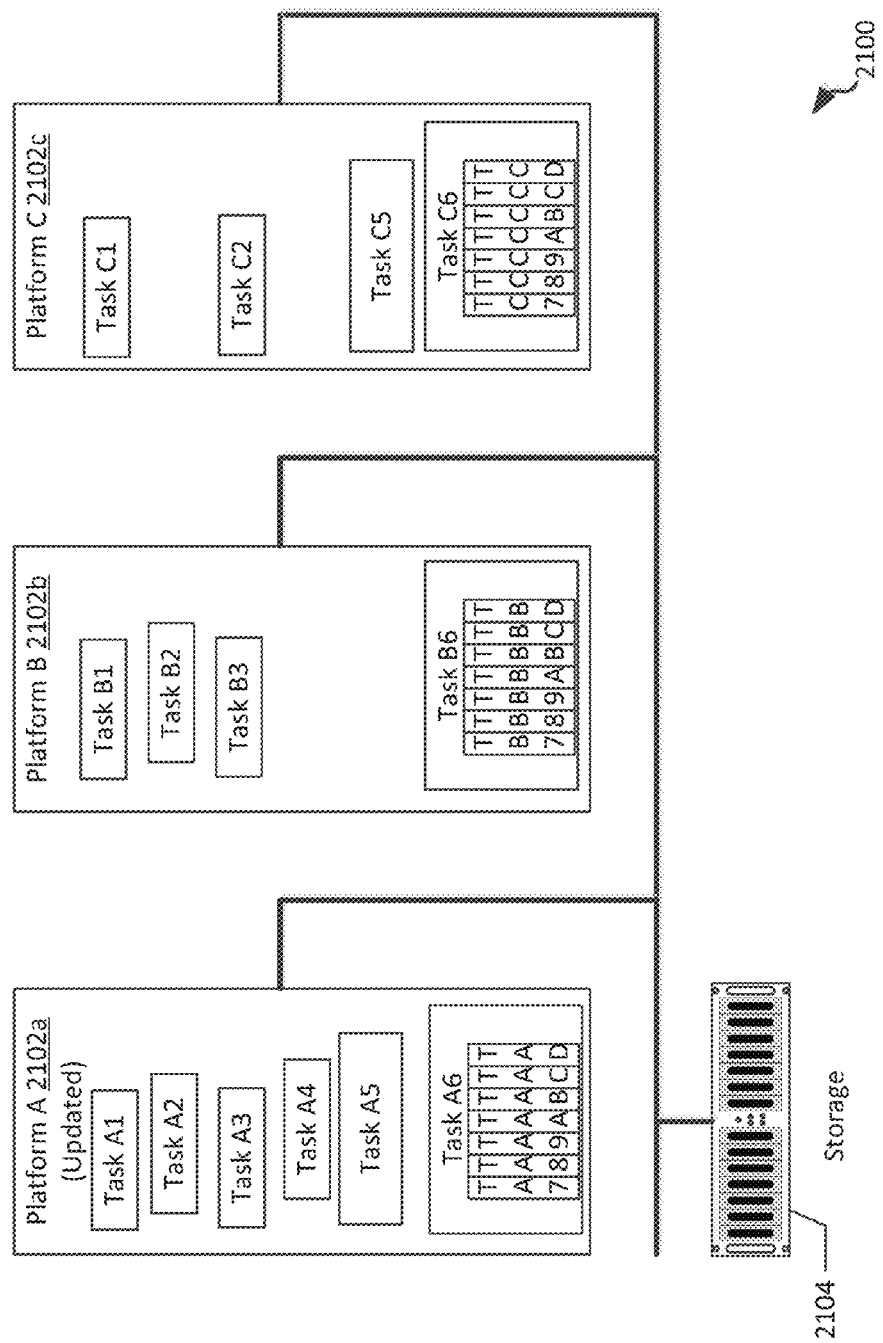

At this stage, and as shown in FIG. 21C, the host software for platform A 2102a can be updated, for example to update a firmware or operating system installation of that platform. Concurrently, tasks A1-A6 can continue executing on platforms B-C 2102b-c. Once the firmware or operating system is updated, tasks A1-A6 could optionally be migrated back to platform A 2102a, as seen in FIG. 21D.

Of course, in alternative arrangements, the tasks A1-A6, or tasks of the other platforms, could be redistributed at will. Additionally, other platforms could be added to the arrangement 2100 as computing needs arise, and tasks from any of the existing platforms 2102a-c could be migrated to that new platform.

Referring to FIGS. 18-21 generally, it is noted that the migration of tasks across platforms can be done relatively efficiently when compatible computing architectures are used. In particular, and as compared to the distributed computational units described above in connection with FIGS. 9-11, there is no requirement that an execution engine be made available for translating program instructions for execution on different instruction set architectures. Rather, because each of the platforms use a compatible set of resources, the platforms can use metadata to define a mapping across platforms to ensure that a platform receiving a task or application can recreate the state of the task or application as it was provided on the source platform. Furthermore, rather than distributing a complete task for execution on a remote system "start to finish", the continuous computing arrangement provided by wrapped applications can include a current instruction pointer alongside the memory and stack state, such that execution of the application or task can resume execution of that task or application at the time that the wrapping occurred.

Consistent with the disclosure of FIGS. 18-21, in some embodiments, the systems and methods described herein can be used for applications other than firmware or operating system updates. For example, wrapped applications or workloads could be relocated to other platforms having greater computational resources available, or for better data locality (for example if an application regularly accesses fabric-accessible files or other data stored in association with a particular platform).

Referring to FIGS. 18-21, it is noted that, in some cases, it may be difficult to directly port tasks or applications between systems, for example because a return control word may differ in its target address upon completion of the application, and which may not be guaranteed to return to the same point on different platforms having different installed software bases. However, if the task or application is quiesced and saved, including the return control word, the quiescing of the task or application will cause it to delink from open libraries as part of the task encapsulation process, and therefore all references are relative to the code file associated with that application. The quiesced application can then become less self-referencing, by relinking to libraries or files on the destination itself prior to continuing execution. As such, it may be possible to effectively quiesce and encapsulate various applications as needed, which can be useful for debug and troubleshooting, as well as ensuring continuous execution.

In a further particular example application of the task and application wrapping features described herein, FIGS. 22-23 illustrate an example of error handling and recovery on a partition, according to an example embodiment. FIG. 22 illustrates a flowchart of a method 2200 for performing such error recovery, while FIGS. 23A-D illustrate an arrangement 2300 in which a schematic sequence of an example error recovery process is depicted. Such errors can include, for example, an error within the application executing, or an error within the system overall that causes a fatal error.

Referring now to FIG. 22, the method 2200 generally can include encapsulating failed or non-failed tasks in the event of a fatal error in a task on a particular partition. The method includes an occurrence of a fatal error in a particular task on a partition, shown as operation 2202.

The method 2202 may also include a failure detection operation 2204, which corresponds to a particular partition or supervisory process detecting a failure of a task executing within the partition. The failure can be, for example, a failure of execution of the application, or a failure of a partition in which the application executes. That failure could be based, for example, on a hardware or software failure of the platform on which the partition resides.

A task encapsulation operation 2206 captures a state of an application executing within a partition at a time when the failure has occurred. The task encapsulation operation 2206 can, in some embodiments, simply by a post-failure execution of the task encapsulation operation 2202; however, in some cases, the task encapsulation operation 2206 may need to be performed by a separate platform from the one in which the failure occurred, in particular if the failure was due to a hardware malfunction. Accordingly, in some embodiments, the task encapsulation operation 2206 can be performed by a special purpose partition, such as a service partition executing on the same platform or a different platform from the partition on which the error occurred. In some embodiments, the task encapsulation operation 2206 can be performed periodically or on a scheduled basis, such that a state of a task at different execution points may be stored in a database or other repository in case needed in the future.

In the event the error resulted in a halted or corrupted partition, an optional partition initialization operation 2208 initializes a new partition, for example to allow for migration of tasks or applications from the failed partition. The partition initialization operation 2208 can initialize a new partition either on the same platform or a new platform, for hosting the tasks associated with the failed partition. In example embodiments, the new partition that is initialized can be on a standby platform included in cases where high reliability and availability is particularly critical.

A migration operation 2210 migrates any encapsulated tasks, or wrapped applications at a particular point in time during execution that were saved and not implicated by the error causing failure of the partition, to a different partition to allow those tasks to continue execution. Upon migrating such tasks, the tasks can be re-initiated, such that they continue execution on the new partition to which they are distributed.

A diagnostics operation 2212 can generate one or more diagnostic messages for review by an administrator of the distributed, virtualized fabric computing system. For example, the diagnostics operation 2212 can determine a last successfully encapsulated task either prior to or after a detected failure of the partition on which the task was originally executing. Additionally, a communication operation 2214 can communicate the diagnostic messages to a remote system, for example to allow for tracing an error, debugging, or otherwise notifying systems administrators and/or support personnel of the error.

It is noted that, because the wrapped tasks are created based on the task and associated metadata, it may be possible to capture less data and still capture a state of the task or application at the time of the error because a full memory dump of memory available to the partition may not be needed. Additionally, although there may be data dependencies that are not apparent based on the task state at the last wrapping instance, it may be possible to detect an error readily based on a state as captured in the metadata, which would only otherwise be present in raw memory data previously.

Referring now to FIGS. 23A-D, an arrangement 2300 is shown in which a sequence of operations may be performed according to FIG. 22, such that errors occurring in a partition can be recovered from and/or captured for debug or troubleshooting purposes.

In the example shown in FIG. 23, the arrangement 2300 includes platforms A-C, shown as platforms 2302a-c, each of which has corresponding tasks A1-A6, B1-B6, and C1-C6, respectively, executing thereon. Each of the platforms 2302a-c are communicatively interconnected to each other and to a fabric storage system 2304, which is configured to store fabric-addressable files. Optionally the fabric storage system 2304 can be configured to maintain one or more encapsulated versions of tasks executing on the platforms 2302a-c, for example in a database 2306. As noted above, the encapsulated tasks can be captured periodically, upon occurrence of a particular event (e.g., an error or event indicative of a likely error).

Figure 23A:
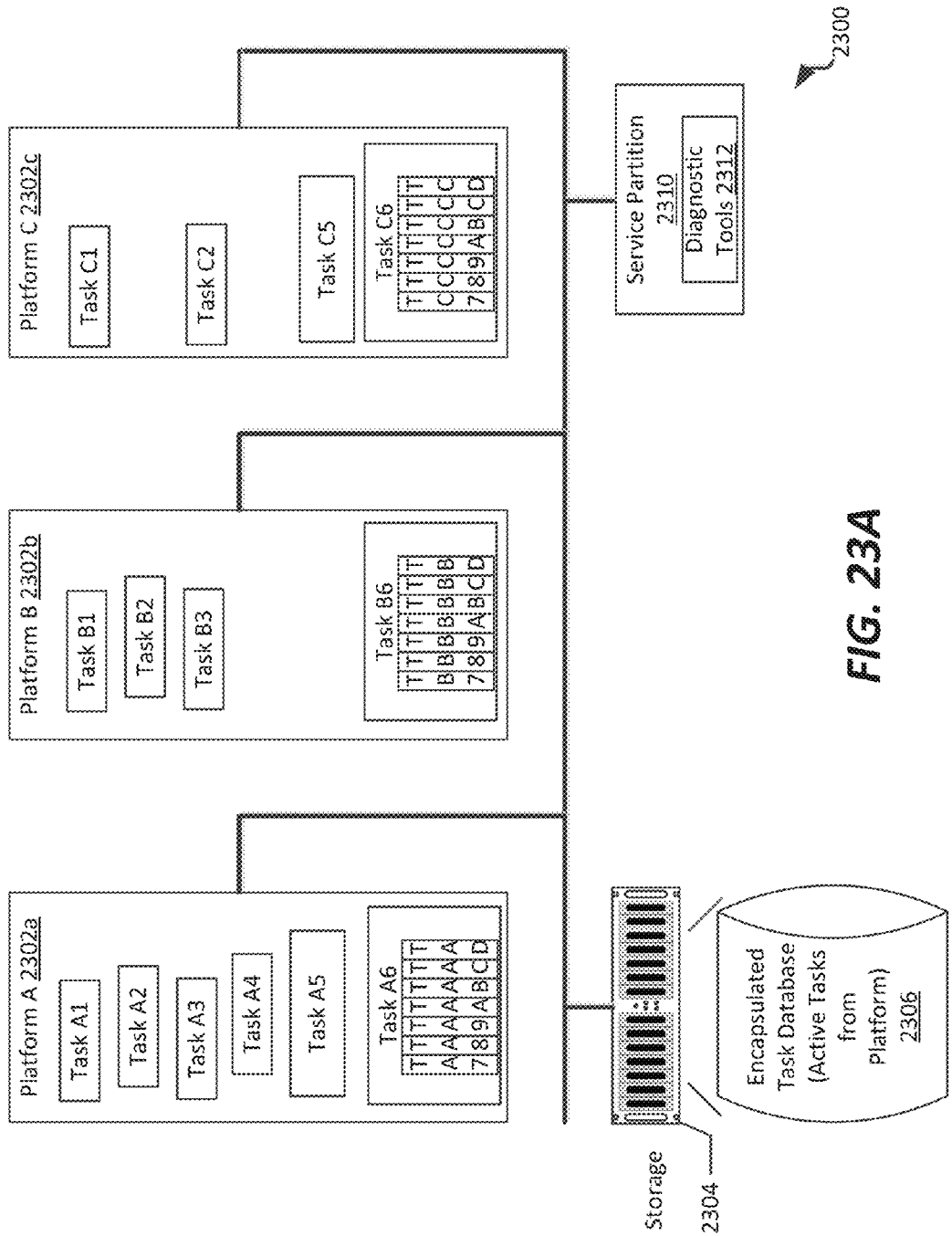
FIGS. 23A-D illustrate a sequence of operations illustrating an example error recovery and debug process using the task or application wrapping features of FIGS. 18-21, according to an example embodiment.

In example embodiments such as that shown in FIG. 23A, a service partition 2310, which may be located on either a common platform as the tasks monitored or on a separate partition, can manage the task encapsulation process. For example, in the embodiment shown, the service partition 2310 includes diagnostic tools 2312 which can be used to detect errors or analyze encapsulated tasks to determine how an error has occurred, or can communicate with platforms 2302a-c to determine when an error has occurred to direct capture of one or more post-error encapsulated tasks.

In example embodiments, the diagnostic tools 2312 can be used, either locally or by a remote, centralized administrator to root cause errors that may occur, for example by using a history of a state of a task and comparing that history (e.g., by way of encapsulation) to corresponding signatures in encapsulated tasks indicative of an error. Accordingly, difficult-to-detect errors can be traced and detected by comparison of historical operation to historical operation of other erroneously-executing or properly-executing tasks to determine where erroneously-executing tasks diverge from the properly-executing tasks.

Figure 23B:
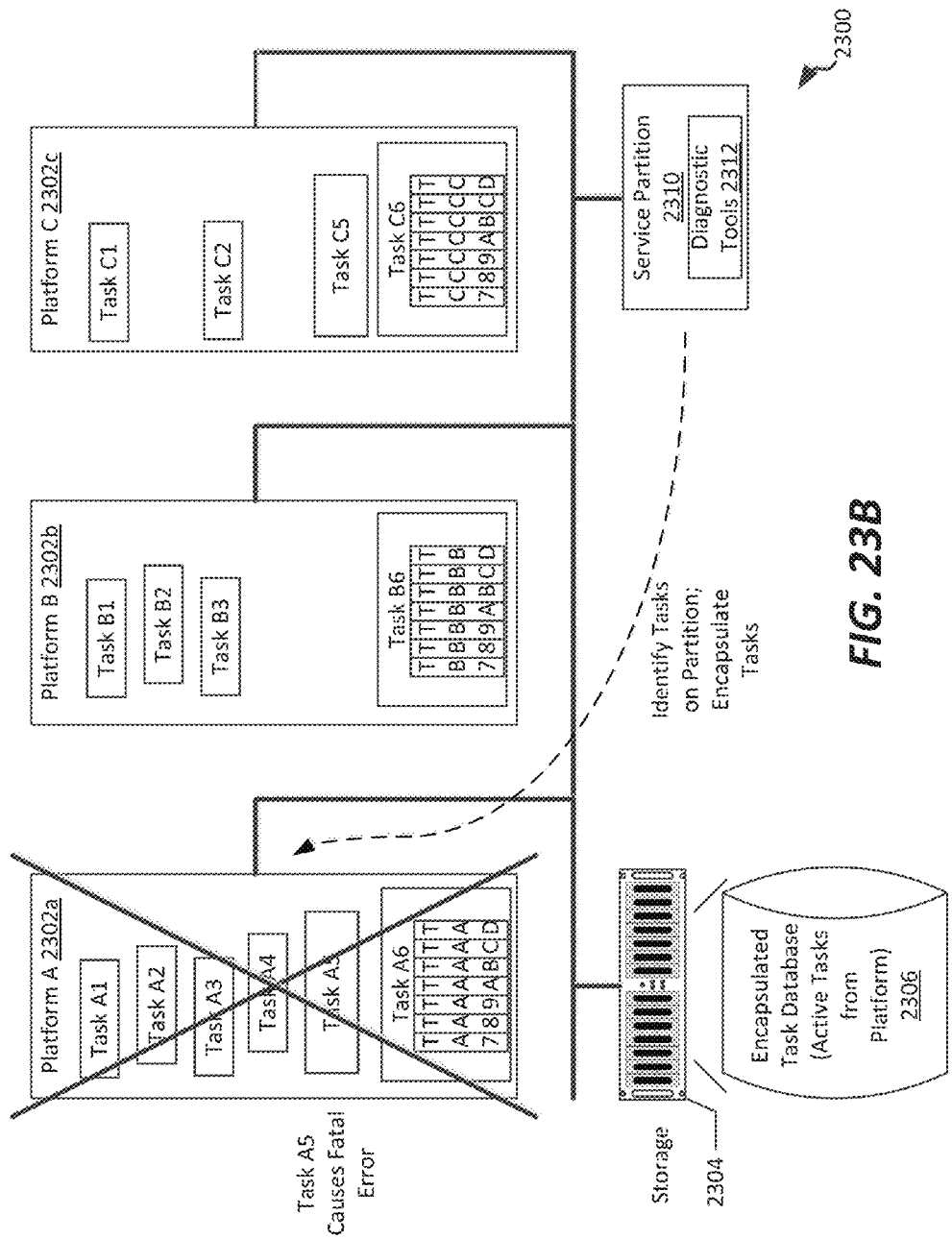

As seen in FIG. 23B, an example error is depicted in which one of the tasks on a partition, in this example task A5 on platform 2302a, triggers a fatal error on that platform. In this instance, operation of the platform 2302a halts, and the service partition 2310 is notified of the fatal error by the operating system or virtualization software of that platform, or alternatively, by the platform's non-response to a periodic polling operation performed by the service partition 2310.

Once the service partition 2310 detects the error, it can trigger encapsulation of each of the tasks A1-A6 executing on the platform, including those tasks that would otherwise execute properly, as well as the task A5 in which the error occurred. Such encapsulated tasks can be stored in database 2306.

Figure 23C:
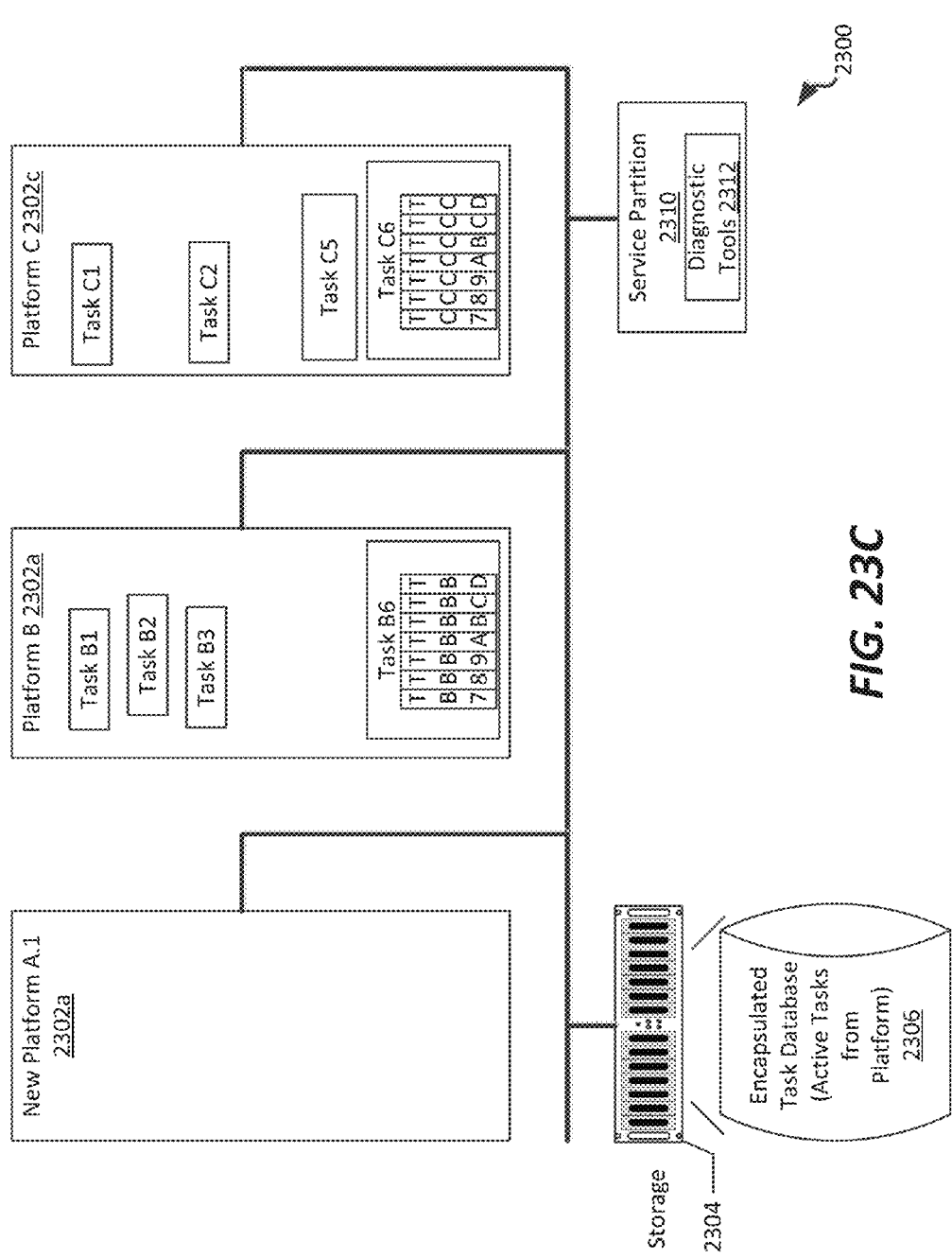
Figure 23D:
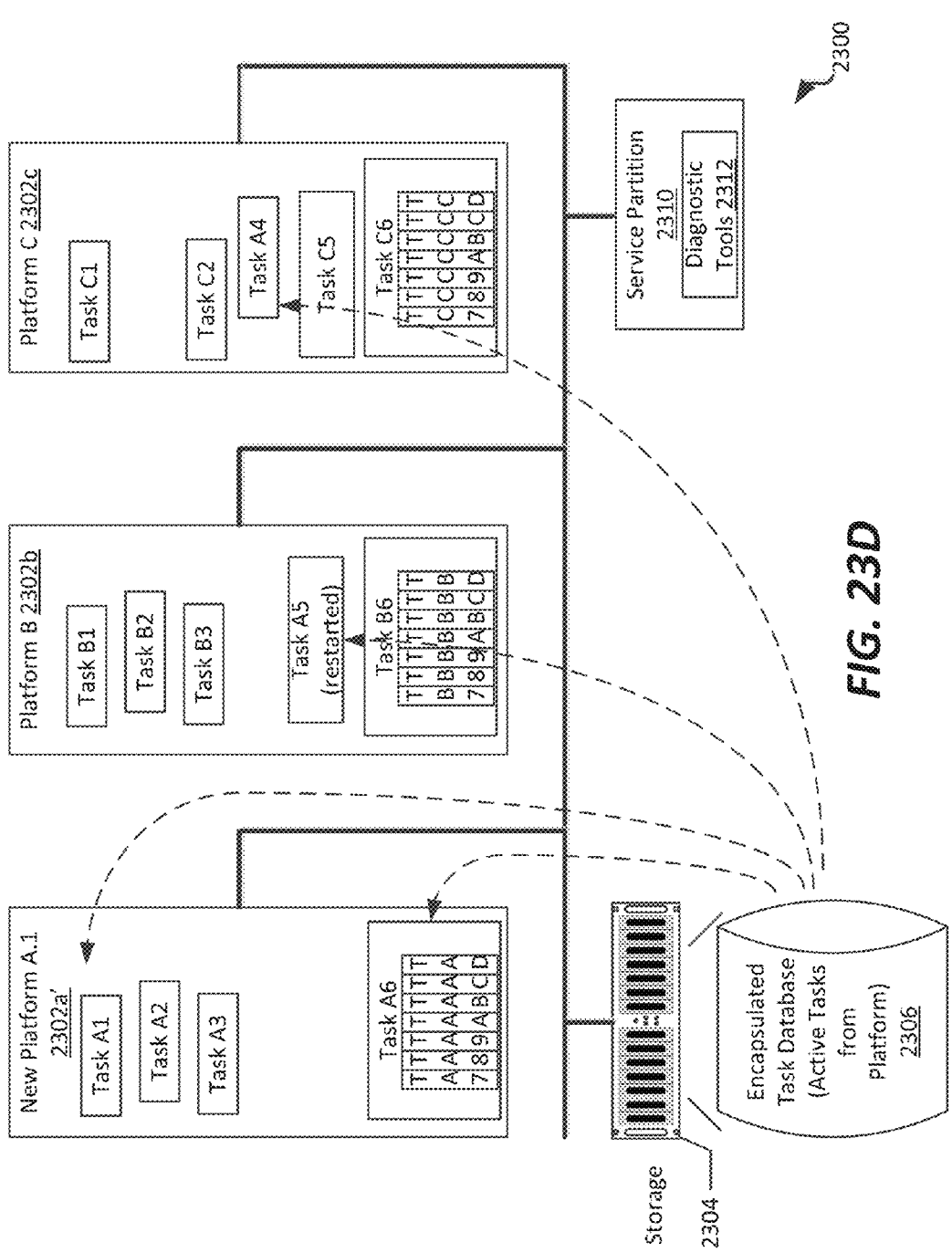

As illustrated in FIG. 23C, once such snapshots are captured, the failed platform 2302a can be reinstantiated and/or replaced with new hardware, shown as platform 2302a'. Furthermore, as illustrated in FIG. 23D, the captured tasks A1-A6 can be distributed to the reinitialized or replaced version of platform 2302a, or to other platforms within the fabric. As illustrated in FIG. 23D, tasks A1-A4 and A6 can continue execution normally from where the error occurred, while task A5, which resulted in the error, can be restarted, thereby avoiding restart of the process at an execution point after which the error occurred.

Referring to FIGS. 18-23, it is noted that various alternative implementations are possible as well. For example, in cases where a footprint of a task or application is very large, a wrapping or task encapsulation operation may take substantial time. In such cases, an administrator could opt to configure a memory mirroring arrangement in which case, when a task is encapsulated, the mirror is halted, or broken, and stored as a copy of a memory image at a particular execution point. When the remaining task components are wrapped (e.g., stack state, instruction pointer, and other resources), the wrapped task and memory can be stored and mirroring can resume.

Furthermore, in some cases where a task to be migrated utilizes one or more shared libraries, such libraries could be captured and included within the encapsulated task itself. Such libraries could be captured analogously to the quiescing operation noted above, and migrated with the task for execution on a destination system. When reinstantiated at a destination system, the task could use the re-instantiated library, which may, in such cases, be mirrored to or otherwise synchronized with the original version of the shared library to avoid orphaning the task using the library. Still other special cases can be similarly managed, in accordance with the continuous computing, encapsulation, and task migration features described herein.

Still referring to FIGS. 18-23, using encapsulation to assess and address failures in tasks allows administrators to diagnose the failures, root cause those failures and validate a fix for such failures. In example scenarios, a service partition can be configured to move tasks out of a "dead" partition onto other systems. Care must be taken to ensure that processing is not repeated, to avoid reprocessing of transactions that may be shared across tasks, to ensure double processing does not occur.

It is further noted that, using the continuous computing concepts described herein, it is possible to maintain operations of tasks flexibly across platforms independently of the partitions on which those tasks are distributed. Furthermore, when combined with the virtualization concepts and flexible and distributed I/O and file access features discussed above, the continuous computing systems described herein can be used to migrate tasks across platforms and partitions as needed to ensure continuous execution of such tasks, applications, or other workloads. It is noted that other advantages, such as easily managed error detection and debug, are provided as well. Other advantages are present as well, in accordance with the claims and description provided herein.

The above specification, examples and data provide a complete description of the manufacture and use of the composition of the invention. Since many embodiments of the invention can be made without departing from the spirit and scope of the invention, the invention resides in the claims hereinafter appended.

The invention claimed is:

1. A continuous computing system comprising:
a plurality of communicatively interconnected computing systems; a workload including a plurality of tasks executing on a first computing system of the plurality of communicatively interconnected computing systems;
a task management system executing on at least one of the plurality of communicatively interconnected computing systems, the task management component configured to encapsulate a task of the plurality of tasks with a current system state of the first computing system, wherein encapsulating the task includes associating metadata defining an association between the task and resources of the first computing system;
wherein the task management system is configured to transfer the encapsulated task to a second computing system among the plurality of communicatively interconnected computing systems for execution, the metadata used to associate the task with resources of a second computing system;
wherein the first computing system has a first architecture and the second computing system has a second architecture different from but compatible with the first architecture; and
wherein the metadata defines an association between the first architecture and the second architecture.

2. The continuous computing system of claim 1, wherein the task management system transfers the encapsulated one or more tasks to the second computing system based on a utilization of the second computing system relative to a utilization of the first computing system.

3. The continuous computing system of claim 1, wherein the plurality of communicatively interconnected computing systems are homogeneous computing systems.

4. The continuous computing system of claim 1, wherein one or more of the plurality of communicatively interconnected computing systems comprise virtual computing systems.

5. The continuous computing system of claim 1, wherein the one or more tasks comprise less than the entire workload.

6. The continuous computing system of claim 1, wherein the task management component is configured to encapsulate a second task of the plurality of tasks with a current system state of the first computing system and transfer the encapsulated second task to a third computing system among the plurality of communicatively interconnected computing systems for execution.

7. The continuous computing system of claim 1, wherein the task management component is configured to periodically encapsulate each of the plurality of tasks included in the workload.

8. The continuous computing system of claim 7, wherein, upon a determination that an error occurred in at least one of the tasks, the task management component is capable of restoring a failed task to a last known good execution point using a previously encapsulated version of the failed task.

9. The continuous computing system of claim 8, wherein, upon a determination that the error occurred in at least one of the tasks, the task management component is capable of restoring each of the tasks to the last known good execution point.

10. The continuous computing system of claim 1, wherein each of the plurality of computing systems comprises a communicatively interconnected virtual computing system executing in a computing fabric.

11. The continuous computing system of claim 1, wherein the current system state of the first computing system comprises a stack state and a state of one or more local variables used in executing the one or more tasks.

12. The continuous computing system of claim 1, wherein encapsulating the task includes associating metadata with instructions included in the task, a memory state of the first computing system at a time of execution of the task, and a definition of system features of the first computing system.

13. The continuous computing system of claim 1, further comprising:
a second workload including a second plurality of tasks executing on the second computing system;
wherein the task management component is configured to encapsulate a second task included in the second plurality of tasks with a current system state of the second computing system;
wherein the task management system is configured to transfer the encapsulated second task of the second plurality of tasks to a different computing system among the plurality of communicatively interconnected computing systems for execution.

14. The continuous computing system of claim 13, wherein the different computing system comprises the first computing system.

15. The continuous computing system of claim 13, wherein each of the plurality of tasks includes a plurality of procedures.

16. A method of maintaining continuous computing in a fabric of communicatively interconnected computing systems, the method comprising:

encapsulating at least one task included in a workload executing on a first computing system of a fabric of communicatively interconnected computing systems with a current system state of the first computing system, the workload including a plurality of tasks,
wherein encapsulating the at least one task includes associating metadata defining an association between the task and instructions included in the task, a memory state of the first computing system at a time of execution of the task, and a definition of system features of the first computing system; and
transferring the encapsulated at least one task to a second computing system in the fabric of communicatively interconnected computing systems;
wherein the first computing system has a first architecture and the second computing system has a second architecture different from but compatible with the first architecture; and
wherein the metadata defines an association between the first architecture and the second architecture.

17. The method of claim 16, further comprising encapsulating each of the plurality of tasks of the workload.

18. The method of claim 17, further comprising transferring each of the encapsulated tasks to the second computing system.

19. The method of claim 18, wherein transferring each of the encapsulated tasks to the second computing system is based on a detected failure of the first computing system.

20. The method of claim 17, further comprising transferring at least one of the encapsulated tasks to a third computing system different from the first and second computing systems.

21. The method of claim 16, wherein the current system state of the first computing system comprises a stack state and a state of one or more local variables used in executing the at least one task.

22. The method of claim 16, wherein transferring the encapsulated at least one task to the second computing system occurs in response to detecting an error in the first computing system.

23. The method of claim 16, wherein encapsulating at least one task comprises mapping I/O operations associated with the task to an I/O processor of the second computing system.

24. The method of claim 23, wherein the I/O operations include file access operations associated with fabric-accessible files.

* * * * *